United States Patent
Tonisson et al.

(10) Patent No.: US 9,177,388 B2
(45) Date of Patent: Nov. 3, 2015

(54) METHOD, SYSTEM AND APPARATUS FOR DETERMINING A HASH CODE REPRESENTING A PORTION OF AN IMAGE

(71) Applicant: CANON KABUSHIKI KAISHA, Tokyo (JP)

(72) Inventors: Alan Valev Tonisson, Beecroft (AU); Barry James Drake, Thornleigh (AU); Scott Alexander Rudkin, Chatswood (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 104 days.

(21) Appl. No.: 13/864,639

(22) Filed: Apr. 17, 2013

(65) Prior Publication Data
US 2013/0279806 A1    Oct. 24, 2013

(30) Foreign Application Priority Data
Apr. 20, 2012 (AU) ................. 2012202352

(51) Int. Cl.
*G06K 9/34* (2006.01)
*G06T 7/20* (2006.01)
*G06F 17/30* (2006.01)

(52) U.S. Cl.
CPC ........ *G06T 7/2033* (2013.01); *G06F 17/30247* (2013.01); *G06F 17/30271* (2013.01)

(58) Field of Classification Search
None
See application file for complete search history.

(56) References Cited

U.S. PATENT DOCUMENTS

| | | | |
|---|---|---|---|
| 4,193,115 A * | 3/1980 | Albus | 706/41 |
| 5,654,761 A * | 8/1997 | Jung | 375/240.16 |
| 2002/0085011 A1* | 7/2002 | Choi et al. | 345/557 |
| 2006/0136402 A1* | 6/2006 | Lee | 707/3 |
| 2006/0256888 A1* | 11/2006 | Nissani (Nissensohn) | 375/267 |
| 2009/0190676 A1* | 7/2009 | Nissani (Nissensohn) | 375/260 |
| 2011/0225153 A1* | 9/2011 | Haseyama | 707/736 |
| 2012/0069024 A1* | 3/2012 | Saund | 345/440 |

OTHER PUBLICATIONS

Jongmin Baek et al., "Some Useful Properties of the Permutohedral Lattice for Gaussian Filtering," Stanford University: Palo Alto, California, 2009, pp. 1-14.

Andoni, A and Indyk, P; "Near-Optimal hashing algorithms for approximate nearest neighbour in high dimensions", Communications of the ACM, vol. 51, No. 1, pp. 117-122, Jan. 2008.

(Continued)

*Primary Examiner* — Bhavesh Mehta
*Assistant Examiner* — Feng Niu
(74) *Attorney, Agent, or Firm* — Canon USA, Inc. IP Division

(57) ABSTRACT

A method of determining a hash code representing a portion of an image, is disclosed. A Delaunay region (e.g., 450) enclosing an image feature point (e.g., 210) representing at least the portion of the image is determined. The Delaunay region is determined from A* lattice points. A mapping transforming the Delaunay region to a predetermined canonical form is determined A point of the Delaunay region is received. The received point defines a plane containing the A* lattice points of the Delaunay region excluding the received point. A normal of the plane is determined by setting at least two co-ordinates of the normal to predetermined non-zero values, the two co-ordinates being selected according to the determined mapping. The hash code representing a portion of the image is determined according to a distance determined using the normal.

6 Claims, 43 Drawing Sheets

(56) References Cited

OTHER PUBLICATIONS

Datar, M; Immorlica, N; Indyk, P; Mirrokni, V; "Locality-sensitive hashing scheme based on p-stable distributions", SCG'04, Jun. 9-11, pp. 253-262, 2004, (ACM 1-58115-885-7/4/0006).

Joly, A; Buisson, O; "A posteriori multi-probe locality sensitive hashing", MM'08 Oct. 26-31, pp. 209-218, 2008, (ACM 978-1-60558-303-7/08/10).

Indyk, P, and Motwani, R; "Approximate nearest neighbors: towards removing the curse of dimensionality." in Proceedings of the thirtieth annual ACM symposium on Theory of computing, pp. 1-20, Dec. 1999.

Kise, K; Noguchi, K; and Iwamura, M; "Memory efficient recognition of specific objects with local features." in Pattern Recognition, 2008. ICPR 2008. 19th International Conference on, pp. 1-4. IEEE, 2008.

Andoni, A; and Indyk, P. "Near-optimal hashing algorithms for approximate nearest neighbor in high dimensions." in Foundations of Computer Science, 2006. FOCS'06, 47th Annual IEEE Symposium on, pp. 459-468. IEEE, 2006.

Aly, M; Munich, M; Perona, P; "Indexing in large scale image collections: Scaling properties, parameter tuning, and benchmark", pp. 1-35 (2010).

Kise, K; Noguchi, K; and Iwamura; M. "Simple representation and approximate search of feature vectors for large-scale object recognition." Proc. BMVC2007 (2007): 182-191.

Lv, Q; Josephson, W; Wang, Z; Charikar, M; and Li, K. "A Time-Space Efficient Locality Sensitive Hashing Method for Similarity Search in High Dimensions", pp. 1-11, Technical report, 2006.

Tuytelaars, T; and Schmid, C; "Vector quantizing feature space with a regular lattice." in Computer Vision, 2007. ICCV 2007. IEEE 11th International Conference on, pp. 1-8. IEEE, 2007.

Jégou, H; Amsaleg, L; Schmid, C; and Gros, P; "Query adaptive locality sensitive hashing." in Acoustics, Speech and Signal Processing, 2008. ICASSP 2008. IEEE International Conference on, pp. 825-828. IEEE, 2008.

Paulevé, L; "Euclidean lattices for high dimensional indexing and searching." (2008).

Baek, J; and Adams, A;. "Some Useful Properties of the Permutohedral Lattice for Gaussian Filtering." Technical Report, Stanford University: Palo Alto, California (2009); pp. 1-14.

Adams, A; Baek, J; and Davis, M; "Fast High-Dimensional Filtering Using the Permutohedral Lattice." in Computer Graphics Forum, vol. 29, No. 2, pp. 753-762., Blackwell Publishing Ltd, 2009.

Panigrahy, R; "Entropy based nearest neighbor search in high dimensions." in Proceedings of the seventeenth annual ACM-SIAM symposium on Discrete algorithm, pp. 1186-1195. ACM, 2008.

Lv, Q; Josephson, W; Wang, Z; Charikar, M; and Li, K; "Multi-probe LSH: efficient indexing for high-dimensional similarity search." in Proceedings of the 33rd international conference on Very large data bases, pp. 950-961. VLDB Endowment, 2007.

\* cited by examiner

|  | E0 | E1 | E2 | E3 | E4 | E5 | E6 |
|---|---|---|---|---|---|---|---|
| $n = 2$ | 3 | 6 | 12 | 18 | 27 | 36 | 48 |
| $n = 8$ | 9 | 18 | 36 | 63 | 108 | 171 | 270 |
| $n = 16$ | 17 | 34 | 68 | 119 | 204 | 323 | 510 |
| $n = 24$ | 25 | 50 | 100 | 175 | 300 | 475 | 750 |
| $n = 32$ | 33 | 66 | 132 | 231 | 396 | 627 | 990 |

Fig. 29

| Workload | Index method | Insertion speed (seconds per image) | Recall speed (seconds per query) | Index memory (Gbytes) | Accuracy (rank-1) |
|---|---|---|---|---|---|
| ½ million images 1042 million vectors | Kise (improved) | 0.19 | 12.5 | 36 | 99-100% good quality queries<br>94% webcam queries<br>98% crop-4-4 queries<br>48% crop 8-4 queries |
| | A* V:D | 0.23 | 97.9 | 48 | 99-100% good quality queries<br>85% webcam queries<br>91% crop 4-4 queries<br>46% crop 8-4 queries |
| | A* Balanced V:D | 0.29 | 52.8 | 44 | 99-100% good quality queries<br>82% webcam queries<br>93% crop 4-4 queries<br>45% crop 8-4 queries |
| | A* V:E4 | 0.22 | 1.8 | 57 | 99-100% good quality queries<br>92% webcam queries<br>99% crop 4-4 queries<br>60% crop 8-4 queries |

Fig. 32

METHOD, SYSTEM AND APPARATUS FOR DETERMINING A HASH CODE REPRESENTING A PORTION OF AN IMAGE

REFERENCE TO RELATED PATENT APPLICATION(S)

This application claims the benefit under 35 U.S.C. §119 of the filing date of Australian Patent Application No. 2012202352, filed 20 Apr. 2012, hereby incorporated by reference in its entirety as if fully set forth herein.

TECHNICAL FIELD

The present disclosure relates to high-dimensional similarity searching and, in particular, to the field of content-based image searching.

BACKGROUND

Many methods have been proposed for content-based image searching, particularly where a database of images is large, and where a query image is a distorted version of a requested database image.

Many of the proposed methods of content-based image searching use feature vectors. A feature vector is an array of numbers that represents a portion of an image. When a new feature vector is received, the feature vector is often useful for retrieving similar feature vectors from a database. The similar feature vectors represent images similar to the image associated with the received feature vector.

When a database of images is small and a similarity function is fast to compute, an exhaustive search method can be used. An exhaustive search computes similarity between a query vector associated with a query image and each record in a database. Such an exhaustive search is too slow for many applications, particularly once the size of the database becomes large.

One of the problems with content-based image searching is how to quickly find, in a database, those feature vectors that match a feature vector of a query image.

Hash-based strategies provide image retrieval methods that are closest to being both fast and accurate. Hash-based methods involve computing a hash code for each vector in a database, and using the hash code to associate records within the database with entries in a hash table. At query time, a hash code is computed for a query vector and the hash code is used to quickly find matching records in the hash table. For such a method to be effective, a 'locality sensitive' hash function may be used. A locality sensitive hash function returns the same hash code for vectors that are close to each other. A locality sensitive hash function partitions a feature space into regions, where each region is associated with a particular hash code.

One problem that exists with hash-based image retrieval methods is that for any hash function there will always be two vectors that are close but return different hash codes. This problem occurs when the two vectors are located on either side of a partition boundary and leads to the problem of false-negative matches. False-negative matches occur when the image retrieval method fails to find similar vectors because the respective hash codes of the similar vectors are different. Hash perturbation methods overcome such false-negative problems by performing multiple probes per query. The multiple probes are performed by perturbing the hash code of the query point to that of a nearby hash code.

A lattice-based hash generates multiple probes using lattice geometry. In a lattice-based hash, hash codes for registration are created from points in a high dimensional lattice. The query hash codes are determined by finding a Delaunay region containing the query point, and computing a hash code for each lattice point at the vertex of the Delaunay region. The A* lattice is typically used for lattice-based hash methods.

Methods exist for balancing hash codes used for registration by a lattice-based hash. Such methods determine a set of candidate hash codes and select the hash code with the fewest existing registrations. The candidate hash codes are selected from the vertices of the Delaunay region surrounding a feature vector. A lattice point is selected as a candidate for registration, only if the database point is sufficiently far from the plane containing all other lattice points in the Delaunay region.

Calculating the distance of a point to a plane defined by a set of points which lie on the plane is also a well-known problem. Typically, the problem is decomposed into two steps: first, a normal to the plane is calculated, then the dot product of the normal vector and a vector from the plane to the point is calculated. However, while the dot product is easily performed in arbitrary dimensions, the determination of the normal is not. When the plane is in three (3) dimensions, the cross product can be used. However there is no generalisation of the cross product to four (4) or more dimensions.

One common method of calculating a normal in arbitrary dimensions is to use SVD ("Singular Value Decomposition") to find null space of a matrix formed using points on the plane. First, a matrix is formed in which each row is a point on the plane. Next, the SVD of the matrix is calculated. Finally, the normal is obtained by reading out the last row of the V matrix.

While the SVD method is applicable to any arrangements of points, in any number of dimensions, the SVD method is a costly operation. Efficient implementations have a computational complexity of $O(n^3)$ where n is dimensionality of the feature vectors. Therefore, the distance calculation is slow in high dimensions, and as a result, registrations are slow.

Thus, a need exists to provide an improved method and system for determining the distance to the plane formed by A* points.

SUMMARY

It is an object of the present invention to substantially overcome, or at least ameliorate, one or more disadvantages of existing arrangements.

According to one aspect of the present disclosure, there is provided a method of determining a hash code that represents a portion of an image, the method comprising:

determining a Delaunay region enclosing an image feature point representing at least the portion of the image, the Delaunay region being determined from A* lattice points;

determining a mapping transforming the Delaunay region to a predetermined canonical form;

receiving a point of the Delaunay region, the received point defining a plane containing the A* lattice points of the Delaunay region excluding the received point; and determining a normal of the plane by setting at least two co-ordinates of the normal to predetermined non-zero values, the two co-ordinates being selected according to the determined mapping; and determining the hash code representing a portion of the image according to a distance determined using the normal.

According to another aspect of the present disclosure, there is provided an apparatus for determining a hash code that represents a portion of an image, the apparatus comprising:

means for determining a Delaunay region enclosing an image feature point representing at least the portion of the image, the Delaunay region being determined from A* lattice points;

means for determining a mapping transforming the Delaunay region to a predetermined canonical form;

means for receiving a point of the Delaunay region, the received point defining a plane containing A* lattice points of the Delaunay region excluding the received point; and means for determining a normal of the plane by setting at least two co-ordinates of the normal to predetermined non-zero values, the two co-ordinates being selected according to the determined mapping; and means for determining the hash code representing a portion of the image according to a distance determined using the normal.

According to still another aspect of the present disclosure, there is provided a system for determining a hash code that represents to a portion of an image, the system comprising:

a memory for storing data and a computer program;

a processor coupled to said memory for executing said computer program, said computer program comprising instructions for:

determining a Delaunay region enclosing an image feature point representing at least the portion of the image, the Delaunay region being determined from A* lattice points;

determining a mapping transforming the Delaunay region to a predetermined canonical form;

receiving a point of the Delaunay region, the received point defining a plane containing the A* lattice points of the Delaunay region excluding the received point; and determining a normal of the plane by setting at least two co-ordinates of the normal to predetermined non-zero values, the two co-ordinates being selected according to the determined mapping; and determining the hash code representing a portion of the image according to a distance determined using the normal.

According to still another aspect of the present disclosure, there is provided a non-transitory computer readable medium having a computer program stored thereon for determining a hash code that represents a portion of an image, the program comprising:

code for determining a Delaunay region enclosing an image feature point representing at least the portion of the image, the Delaunay region being determined from A* lattice points;

code for determining a mapping transforming the Delaunay region to a predetermined canonical form;

code for receiving a point of the Delaunay region, the received point defining a plane the A* lattice points of the Delaunay region excluding the received point; and code for determining a normal of the plane by setting at least two co-ordinates of the normal to predetermined non-zero values, the two co-ordinates being selected according to the determined mapping;

code for determining the hash code representing a portion of the image according to a distance determined using the normal.

According to still another aspect of the present disclosure, there is provided a method of retrieving feature vectors located within a predetermined search radius, the feature vectors being associated with lattice points of a multidimensional A* lattice, the method comprising:

receiving a query vector representing a feature vector to be matched by feature vectors associated with lattice points of the multidimensional A* lattice;

locating a first plurality of lattice point of the multidimensional A* lattice that form an enclosing region around the query vector;

determining a canonical mapping between at least one of the lattice points of the enclosing region and a canonical representation of the enclosing region;

selecting a second plurality of lattice points using the canonical mapping, the second plurality of lattice points being located within the predetermined search radius of a lattice hole of the enclosing region and being distinct to the first plurality of lattice points, wherein the search radius defines feature vectors associated with lattice points of the multidimensional A* lattice that are considered a match to the query vector; and retrieving feature vectors from the first and second plurality of lattice points as matching feature vectors.

According to still another aspect of the present disclosure, there is provided an apparatus for retrieving feature vectors located within a predetermined search radius, the feature vectors being associated with lattice points of a multidimensional A* lattice, the apparatus comprising:

means for receiving a query vector representing a feature vector to be matched by feature vectors associated with lattice points of the multidimensional A* lattice;

means for locating a first plurality of lattice point of the multidimensional A* lattice that form an enclosing region around the query vector;

means for determining a canonical mapping between at least one of the lattice points of the enclosing region and a canonical representation of the enclosing region;

means for selecting a second plurality of lattice points using the canonical mapping, the second plurality of lattice points being located within the predetermined search radius of a lattice hole of the enclosing region and being distinct to the first plurality of lattice points, wherein the search radius defines feature vectors associated with lattice points of the multidimensional A* lattice that are considered a match to the query vector; and retrieving feature vectors from the first and second plurality of lattice points as matching feature vectors.

According to still another aspect of the present disclosure, there is provided a system for retrieving feature vectors located within a predetermined search radius, the feature vectors being associated with lattice points of a multidimensional A* lattice, the system comprising:

a memory for storing data and a computer program;

a processor coupled to said memory for executing said computer program, said computer program comprising instructions for:

receiving a query vector representing a feature vector to be matched by feature vectors associated with lattice points of the multidimensional A* lattice;

locating a first plurality of lattice point of the multidimensional A* lattice that form an enclosing region around the query vector;

determining a canonical mapping between at least one of the lattice points of the enclosing region and a canonical representation of the enclosing region;

selecting a second plurality of lattice points using the canonical mapping, the second plurality of lattice points being located within the predetermined search radius of a lattice hole of the enclosing region and being distinct to the first plurality of lattice points, wherein the search radius defines feature vectors associated with lattice points of the multidimensional A* lattice that are considered a match to the query vector; and retrieving feature vectors from the first and second plurality of lattice points as matching feature vectors.

According to still another aspect of the present disclosure, there is provided a non-transitory computer readable medium having a computer program stored thereon for retrieving feature vectors located within a predetermined search radius, the feature vectors being associated with lattice points of a multidimensional A* lattice, the program comprising:

code for receiving a query vector representing a feature vector to be matched by feature vectors associated with lattice points of the multidimensional A* lattice;

code for locating a first plurality of lattice point of the multidimensional A* lattice that form an enclosing region around the query vector;

code for determining a canonical mapping between at least one of the lattice points of the enclosing region and a canonical representation of the enclosing region;

code for selecting a second plurality of lattice points using the canonical mapping, the second plurality of lattice points being located within the predetermined search radius of a lattice hole of the enclosing region and being distinct to the first plurality of lattice points, wherein the search radius defines feature vectors associated with lattice points of the multidimensional A* lattice that are considered a match to the query vector; and retrieving feature vectors from the first and second plurality of lattice points as matching feature vectors.

Other aspects of the invention are also disclosed.

BRIEF DESCRIPTION OF THE DRAWINGS

One or more embodiments of the invention will now be described with reference to the following drawings, in which:

FIG. 29 is a table showing the number of probes resulting from one arrangement, for some selected dimensionalities and some selected numbers of shells;

FIG. 32 is a table showing accuracy and timing results when one arrangement is used for a content based image retrieval task;

DETAILED DESCRIPTION INCLUDING BEST MODE

Figure 1:
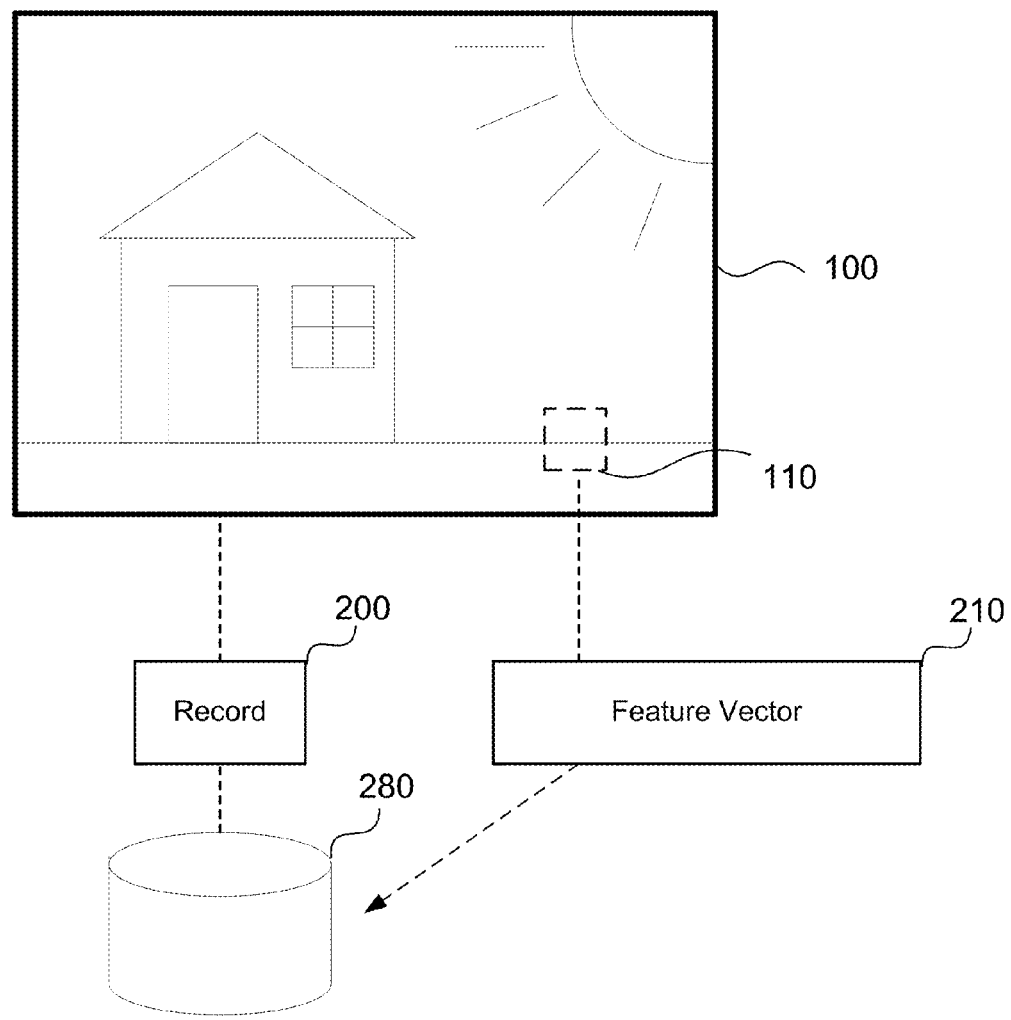
FIG. 1 is a representation of an image, image portion, and feature vector associated with an image portion.

Where reference is made in any one or more of the accompanying drawings to steps and/or features, which have the same reference numerals, those steps and/or features have for the purposes of this description the same function(s) or operation(s), unless the contrary intention appears.

The present disclosure relates to storage and retrieval of records. The described arrangements may be used in a retrieval system to create and access a hash table for efficiently retrieving records associated with n-dimensional feature vectors, where the vectors of the retrieved records are located within a specified balancing radius of a given query vector. The described arrangements are particularly useful when false-negatives are costly. The retrieval system described here may be used to minimise false-negatives when the balancing radius is known at the time that the system is configured.

As described below, a registration phase relates to the storage of one or more records. A query phase relates to retrieval of one or more of the stored records, in accordance with search criteria. The registration phase generates a hash code for a feature vector based on the feature vector and a present state of the hash table. The registration phase then associates a record associated with the feature vector with the generated hash code in the hash table. The query phase identifies those hash codes that are used by vectors that satisfy search criteria.

A retrieval system configured in accordance with the present disclosure may be implemented to store and retrieve records associated with images, wherein each image is associated with a feature vector and a record. The feature vector may be used as a key for storing the corresponding record. The record contains information relating to the image. The information may include, for example, but is not limited to, the corresponding feature vector, the image, a portion of the image, a sub-sampled version of the image, owner information, access information, printing information, or any combination thereof.

A retrieval system configured in accordance with the present disclosure may also be implemented for non-imaging applications, such as the retrieval of text, a portion of text, or a paper-fingerprint. A paper finger-print is an image of paper fibre structure of a page that can be used to uniquely identify a piece of paper.

A method, system, and computer program product for linking a hash code to a portion of an image is described below. The method selects a plurality of lattice points in a multidimensional lattice to form a smallest enclosing region about a feature vector representing the portion of the image. The method determines a lattice point from the selected plurality of lattice points according to distribution criteria. The determined lattice point is common to the smallest enclosing region and a region adjacent to the smallest enclosing region located within a balancing radius distance of the feature vector. When the feature vector is located within the balancing radius of a query vector the feature vector is considered a match. The method assigns the feature vector to the determined lattice point and stores a link between a hash code associated with the determined lattice point and the portion of the image.

A hash table storage and retrieval method, system, and computer program product is also described below. The hash table retrieval method performs a registration phase to store at least one record in a hash table and a query phase to retrieve at least one of the stored records from the hash table. For each of the stored records, the registration phase generates a hash code for a feature vector associated with the record, based on the feature vector and a present state of a hash table, and associates the record with the generated hash code in the hash table. The query phase identifies hash codes for the hash table that are associated with feature vectors that satisfy search criteria and retrieves at least one record assigned to at least one of the identified hash codes.

Figure 15A:
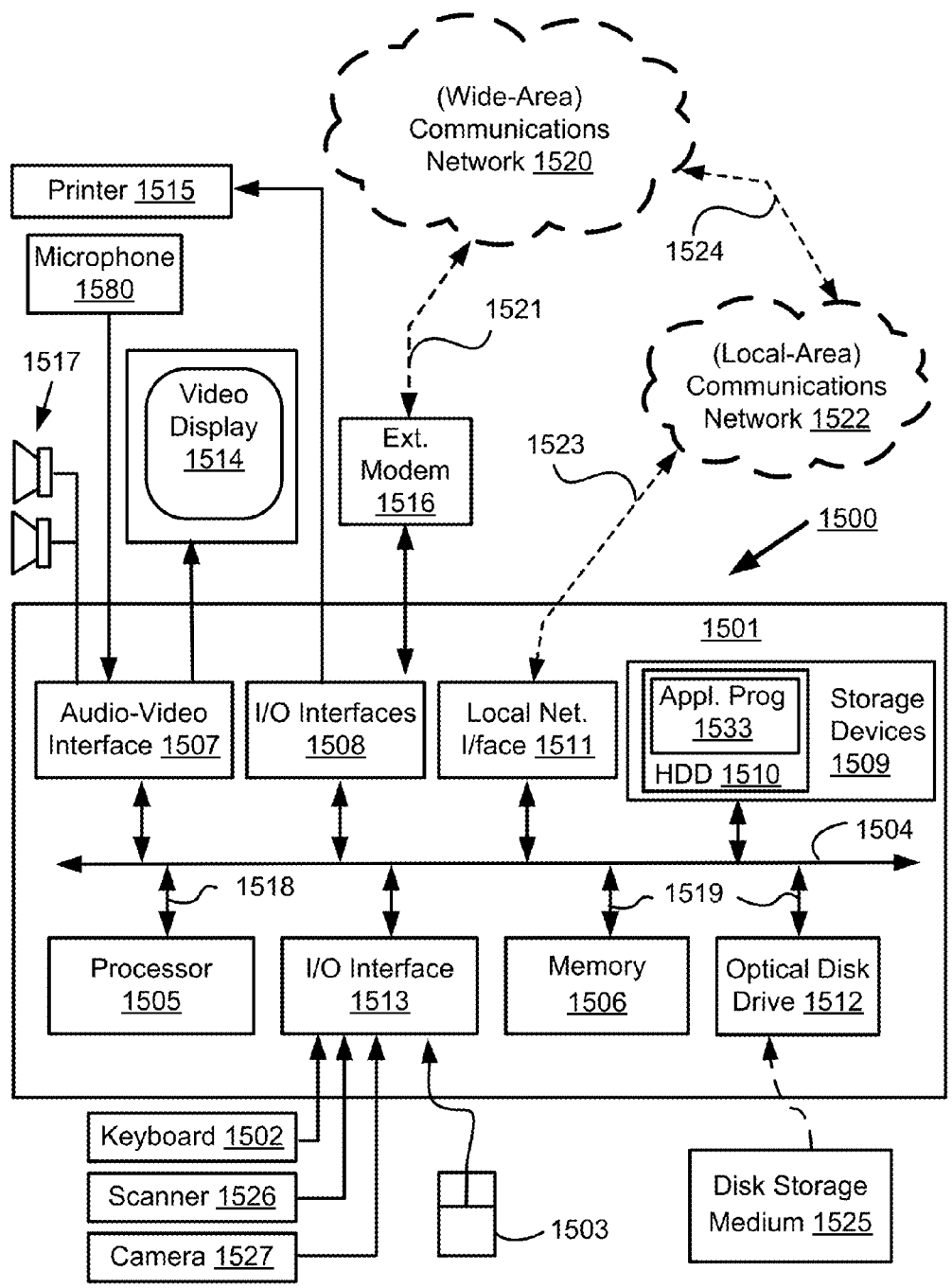
FIGS. 15A and 15B form a schematic block diagram of a general purpose computer system upon which arrangements described can be practiced.
Figure 15B:
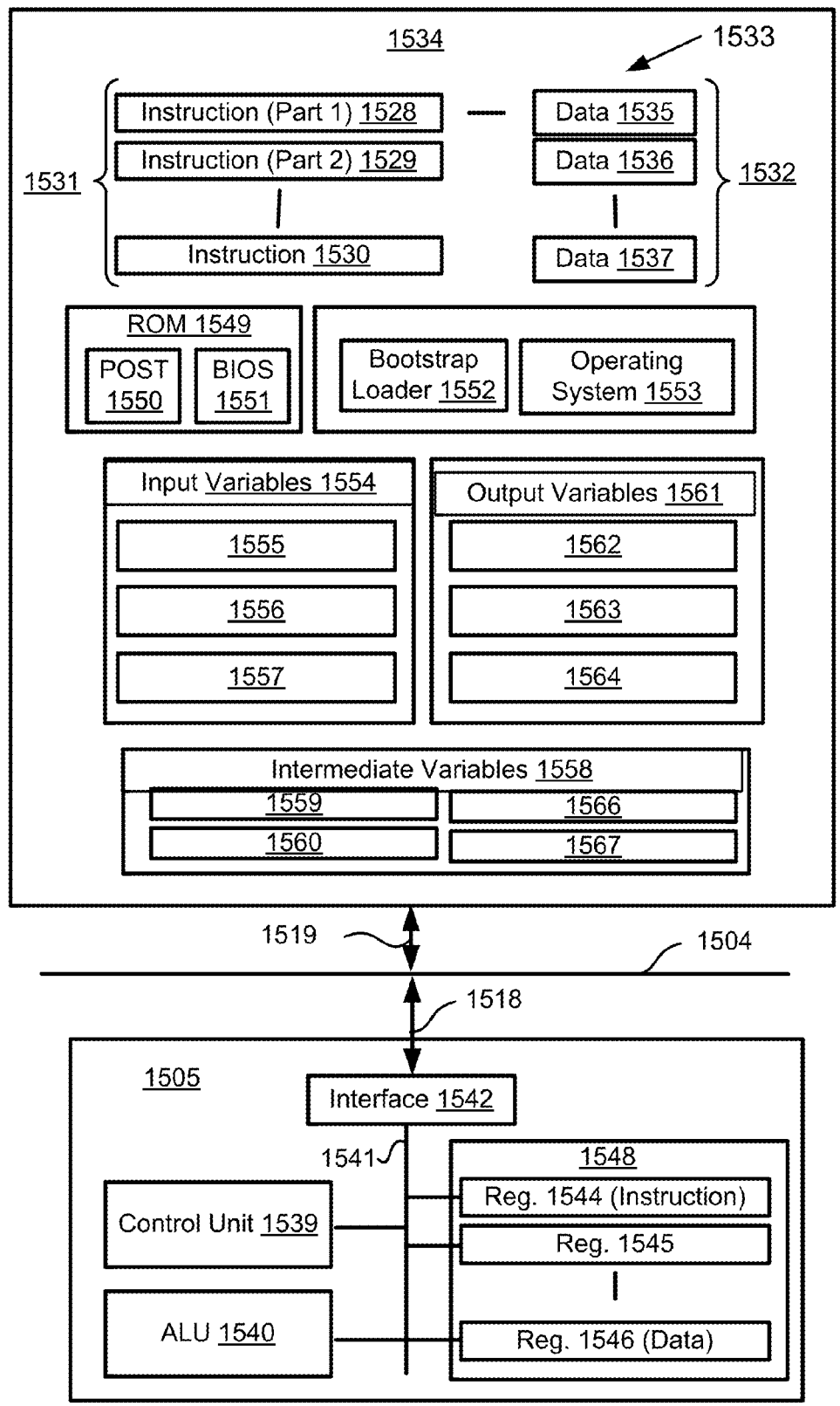

FIGS. 15A and 15B depict a general-purpose computer system 1500, upon which the various arrangements described can be practised.

As seen in FIG. 15A, the computer system 1500 includes: a computer module 1501; input devices such as a keyboard 1502, a mouse pointer device 1503, a scanner 1526, a camera 1527, and a microphone 1580; and output devices including a printer 1515, a display device 1514 and loudspeakers 1517. An external Modulator-Demodulator (Modem) transceiver device 1516 may be used by the computer module 1501 for communicating to and from a communications network 1520 via a connection 1521. The communications network 1520 may be a wide-area network (WAN), such as the Internet, a cellular telecommunications network, or a private WAN. Where the connection 1521 is a telephone line, the modem 1516 may be a traditional "dial-up" modem. Alternatively, where the connection 1521 is a high capacity (e.g., cable) connection, the modem 1516 may be a broadband modem. A wireless modem may also be used for wireless connection to the communications network 1520.

The computer module 1501 typically includes at least one processor unit 1505, and a memory unit 1506. For example, the memory unit 1506 may have semiconductor random access memory (RAM) and semiconductor read only memory (ROM). The computer module 1501 also includes an number of input/output (I/O) interfaces including: an audio-video interface 1507 that couples to the video display 1514, loudspeakers 1517 and microphone 1580; an I/O interface 1513 that couples to the keyboard 1502, mouse 1503, scanner 1526, camera 1527 and optionally a joystick or other human interface device (not illustrated); and an interface 1508 for the external modem 1516 and printer 1515. In some implementations, the modem 1516 may be incorporated within the computer module 1501, for example within the interface 1508. The computer module 1501 also has a local network interface 1511, which permits coupling of the computer system 1500 via a connection 1523 to a local-area communications network 1522, known as a Local Area Network (LAN). As illustrated in FIG. 15A, the local communications network 1522 may also couple to the wide network 1520 via a connection 1524, which would typically include a so-called "firewall" device or device of similar functionality. The local network interface 1511 may comprise an Ethernet circuit card, a Bluetooth™ wireless arrangement or an IEEE 802.11 wireless arrangement; however, numerous other types of interfaces may be practiced for the interface 1511.

The I/O interfaces 1508 and 1513 may afford either or both of serial and parallel connectivity, the former typically being implemented according to the Universal Serial Bus (USB) standards and having corresponding USB connectors (not illustrated). Storage devices 1509 are provided and typically include a hard disk drive (HDD) 1510. Other storage devices such as a floppy disk drive and a magnetic tape drive (not illustrated) may also be used. An optical disk drive 1512 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1500.

The components 1505 to 1513 of the computer module 1501 typically communicate via an interconnected bus 1504 and in a manner that results in a conventional mode of operation of the computer system 1500 known to those in the relevant art. For example, the processor 1505 is coupled to the system bus 1504 using a connection 1518. Likewise, the memory 1506 and optical disk drive 1512 are coupled to the system bus 1504 by connections 1519. Examples of computers on which the described arrangements can be practised include IBM-PC's and compatibles, Sun Sparcstations, Apple Mac™ or alike computer systems.

The described methods may be implemented using the computer system 1500 wherein the processes of FIGS. 1 to 14 and 16 to 42, to be described, may be implemented as one or more software application programs 1533 executable within the computer system 1500. In particular, the steps of the described methods are effected by instructions 1531 (see FIG. 15B) in the software 1533 that are carried out within the computer system 1500. The software instructions 1531 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 1533 is typically stored in the HDD 1510 or the memory 1506. Thus, for example, the software 1533 may be stored on an optically readable disk storage medium (e.g., CD-ROM) 1525 that is read by the optical disk drive 1512. The software is loaded into the computer system 1500 from the computer readable medium, and then executed by the computer system 1500. A computer readable medium having such software or computer program recorded on the computer readable medium is a computer program product. The use of the computer program product in the computer system 1500 preferably effects an advantageous apparatus for implementing the described methods.

In some instances, the application programs 1533 may be supplied to the user encoded on one or more CD-ROMs 1525 and read via the corresponding drive 1512, or alternatively may be read by the user from the networks 1520 or 1522. Still further, the software can also be loaded into the computer system 1500 from other computer readable media. Computer readable storage media refers to any non-transitory tangible storage medium that provides recorded instructions and/or data to the computer system 1500 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 1501. Examples of transitory or non-tangible computer readable transmission media that may also participate in the provision of software, application programs, instructions and/or data to the computer module 1501 include radio or infra-red transmission channels as well as a network connection to another computer or networked device, and the Internet or Intranets including e-mail transmissions and information recorded on Websites and the like.

The second part of the application programs 1533 and the corresponding code modules mentioned above may be executed to implement one or more graphical user interfaces (GUIs) to be rendered or otherwise represented upon the display 1514. Through manipulation of typically the keyboard 1502 and the mouse 1503, a user of the computer system 1500 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1517 and user voice commands input via the microphone 1580.

FIG. 15B is a detailed schematic block diagram of the processor 1505 and a "memory" 1534. The memory 1534 represents a logical aggregation of all the memory modules (including the HDD 1509 and semiconductor memory 1506) that can be accessed by the computer module 1501 in FIG. 15A.

When the computer module 1501 is initially powered up, a power-on self-test (POST) program 1550 executes. The POST program 1550 is typically stored in a ROM 1549 of the semiconductor memory 1506 of FIG. 15A. A hardware device such as the ROM 1549 storing software is sometimes referred to as firmware. The POST program 1550 examines hardware within the computer module 1501 to ensure proper functioning and typically checks the processor 1505, the memory 1534 (1509, 1506), and a basic input-output systems software (BIOS) module 1551, also typically stored in the ROM 1549, for correct operation. Once the POST program 1550 has run successfully, the BIOS 1551 activates the hard disk drive 1510 of FIG. 15A. Activation of the hard disk drive 1510 causes a bootstrap loader program 1552 that is resident on the hard disk drive 1510 to execute via the processor 1505. This loads an operating system 1553 into the RAM memory 1506, upon which the operating system 1553 commences operation. The operating system 1553 is a system level application, executable by the processor 1505, to fulfil various high level functions, including processor management, memory management, device management, storage management, software application interface, and generic user interface.

The operating system 1553 manages the memory 1534 (1509, 1506) to ensure that each process or application running on the computer module 1501 has sufficient memory in which to execute without colliding with memory allocated to another process. Furthermore, the different types of memory available in the system 1500 of FIG. 15A must be used properly so that each process can run effectively. Accordingly, the aggregated memory 1534 is not intended to illustrate how particular segments of memory are allocated (unless otherwise stated), but rather to provide a general view of the memory accessible by the computer system 1500 and how such is used.

As shown in FIG. 15B, the processor 1505 includes a number of functional modules including a control unit 1539, an arithmetic logic unit (ALU) 1540, and a local or internal memory 1548, sometimes called a cache memory. The cache memory 1548 typically includes a number of storage registers 1544-1546 in a register section. One or more internal busses 1541 functionally interconnect these functional modules. The processor 1505 typically also has one or more interfaces 1542 for communicating with external devices via the system bus 1504, using a connection 1518. The memory 1534 is coupled to the bus 1504 using a connection 1519.

The application program 1533 includes a sequence of instructions 1531 that may include conditional branch and loop instructions. The program 1533 may also include data 1532 which is used in execution of the program 1533. The instructions 1531 and the data 1532 are stored in memory locations 1528, 1529, 1530 and 1535, 1536, 1537, respectively. Depending upon the relative size of the instructions 1531 and the memory locations 1528-1530, a particular instruction may be stored in a single memory location as depicted by the instruction shown in the memory location 1530. Alternately, an instruction may be segmented into a number of parts each of which is stored in a separate memory location, as depicted by the instruction segments shown in the memory locations 1528 and 1529.

In general, the processor 1505 is given a set of instructions which are executed therein. The processor 1105 waits for a subsequent input, to which the processor 1505 reacts to by executing another set of instructions. Each input may be provided from one or more of a number of sources, including data generated by one or more of the input devices 1502, 1503, data received from an external source across one of the networks 1520, 1502, data retrieved from one of the storage devices 1506, 1509 or data retrieved from a storage medium 1525 inserted into the corresponding reader 1512, all depicted in FIG. 15A. The execution of a set of the instructions may in some cases result in output of data. Execution may also involve storing data or variables to the memory 1534.

The disclosed arrangements use input variables 1554, which are stored in the memory 1534 in corresponding memory locations 1555, 1556, 1557. The arrangements produce output variables 1561, which are stored in the memory 1534 in corresponding memory locations 1562, 1563, 1564. Intermediate variables 1558 may be stored in memory locations 1559, 1560, 1566 and 1567.

Referring to the processor 1505 of FIG. 15B, the registers 1544, 1545, 1546, the arithmetic logic unit (ALU) 1540, and the control unit 1539 work together to perform sequences of micro-operations needed to perform "fetch, decode, and execute" cycles for every instruction in the instruction set making up the program 1533. Each fetch, decode, and execute cycle comprises:

(a) a fetch operation, which fetches or reads an instruction 1531 from a memory location 1528, 1529, 1530;

(b) a decode operation in which the control unit 1539 determines which instruction has been fetched; and (c) an execute operation in which the control unit 1539 and/or the ALU 1540 execute the instruction.

Thereafter, a further fetch, decode, and execute cycle for the next instruction may be executed. Similarly, a store cycle may be performed by which the control unit 1539 stores or writes a value to a memory location 1532.

Each step or sub-process in the processes of FIGS. 1 to 14 is associated with one or more segments of the program 1533 and is performed by the register section 1544, 1545, 1547, the ALU 1540, and the control unit 1539 in the processor 1505 working together to perform the fetch, decode, and execute cycles for every instruction in the instruction set for the noted segments of the program 1533.

The described methods may alternatively be implemented in dedicated hardware such as one or more integrated circuits performing the functions or sub functions of the methods. Such dedicated hardware may include graphic processors, digital signal processors, or one or more microprocessors and associated memories.

Figure 14A:
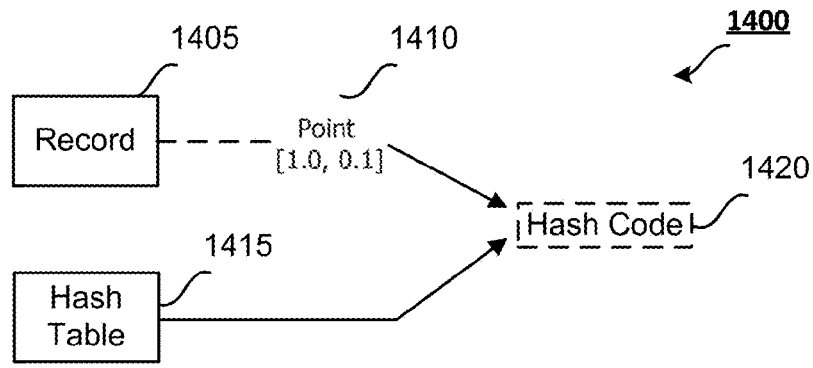
FIGS. 14A, 14B, and 14C show registration and query phases of a retrieval system.

FIG. 14A shows a record 1405 and an associated feature vector 1410 in the form of a point [1.0, 0.1]. The registration phase generates a hash code 1420 for the feature vector 1410 based on the co-ordinates of the point and the present state of a hash table 1415.

Figure 14B:
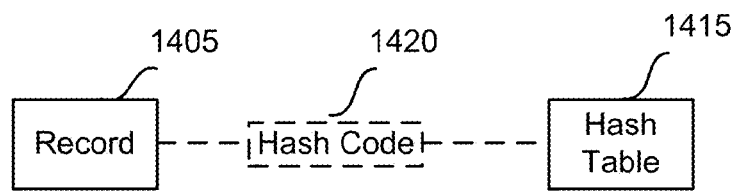

FIG. 14B shows the record 1405 being associated with the generated hash code 1420 in the hash table 1415.

Figure 14C:
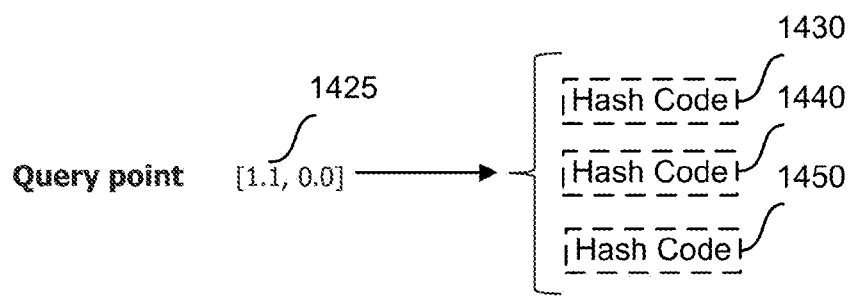

FIG. 14C shows the query phase in which a query vector 1425 in the form of a point [1.1, 0.0] is used to identify those hash codes 1430, 1440, 1450 in the hash table 1415 that are used by points that match the query vector 1425. The present disclosure defines a hash function using an A* lattice. The A* lattice can be defined in terms of the A lattice family. The lattice $A_n$ may be defined in accordance with Equation (1) as follows:

$$A_n = \{p \in Z^{(n+1)} | \Sigma_i p_i = 0\} \quad (1).$$

where $A_n$ is an n-dimensional lattice, that is embedded in $R^{(n+1)}$, a n+1 dimensional Euclidean space, to make the coordinates integers. The dual of $A_n$ is $A_n^*$, similarly embedded inside the same n-dimensional subspace, the subspace consisting of points whose coordinates sum to zero. The dual lattice $A_n^*$ is the set of vectors (in the n-dimensional subspace) whose dot product with each vector in $A_n$ is an integer. The dual lattice $A_n^*$ may be defined in accordance with Equation (2) as follows:

$$A_n^* = \{p \in R^{(n+1)} | \Sigma_i p_i = 0, \forall q \in A_n, (p \cdot q)/(n+1) \in Z\} \quad (2).$$

When a record with an associated feature vector is received, a nearby lattice point is chosen and used to determine a hash code for the vector. A nearby lattice point is a point in the lattice that corresponds to a corner of the Delaunay region containing the vector. Given an arbitrary but particular lattice, each Delaunay region of the lattice will have corners that are within some predetermined range of each other. Therefore, a nearby lattice point is a point in the lattice that is within some predetermined range of the vector. However, not every lattice point within some predetermined range of the vector is a "nearby lattice point". The hash code is linked to the lattice point and may be used to determine the lattice point. The hash code may also be determined from the lattice point. The hash code and the lattice point represent the same information and may be used interchangeably. In one arrangement, the lattice point is the hash code. Another arrangement applies a function to the lattice point to determine the hash code. The record is associated with the hash code using a hash table configured within the memory 1506 and/or hard disk drive 1510. When a query vector is received, the lattice points at the corners of the enclosing Delaunay region are located, and a query hash code is determined corresponding to each of the located lattice point. The hash table is used to retrieve the records associated with each query hash code.

FIG. 1 shows an image 100 that is associated with a record 200. The record 200 may be stored in a hash table in a database 280. The database 280 may be configured, for example, within the hard disk drive 1510. The record 200 contains information relating to the image 100. The image 100 is processed by an image feature extractor, such as 'Scale Invariant Feature Transform' (SIFT), to identify a region 110 of the image 100 from which to determine a feature vector 210 associated with the image 100. The feature vector 210 may then be stored in the database 280 and associated with the image record 200.

An image record (e.g., 200) may contain information about an image. For example, the image record 200 may record pixel values of the image in some format, such as JPEG, or a file name or resource locator for accessing the image. The image record 200 may contain ownership details or information about processes involving the image. For example, the image record 200 may contain information relating to who printed the image, or where and when the image was printed. The image record 200 may record a feature vector, or some compressed version of the feature vector, or some identifier indicating the feature vector.

Figure 2:
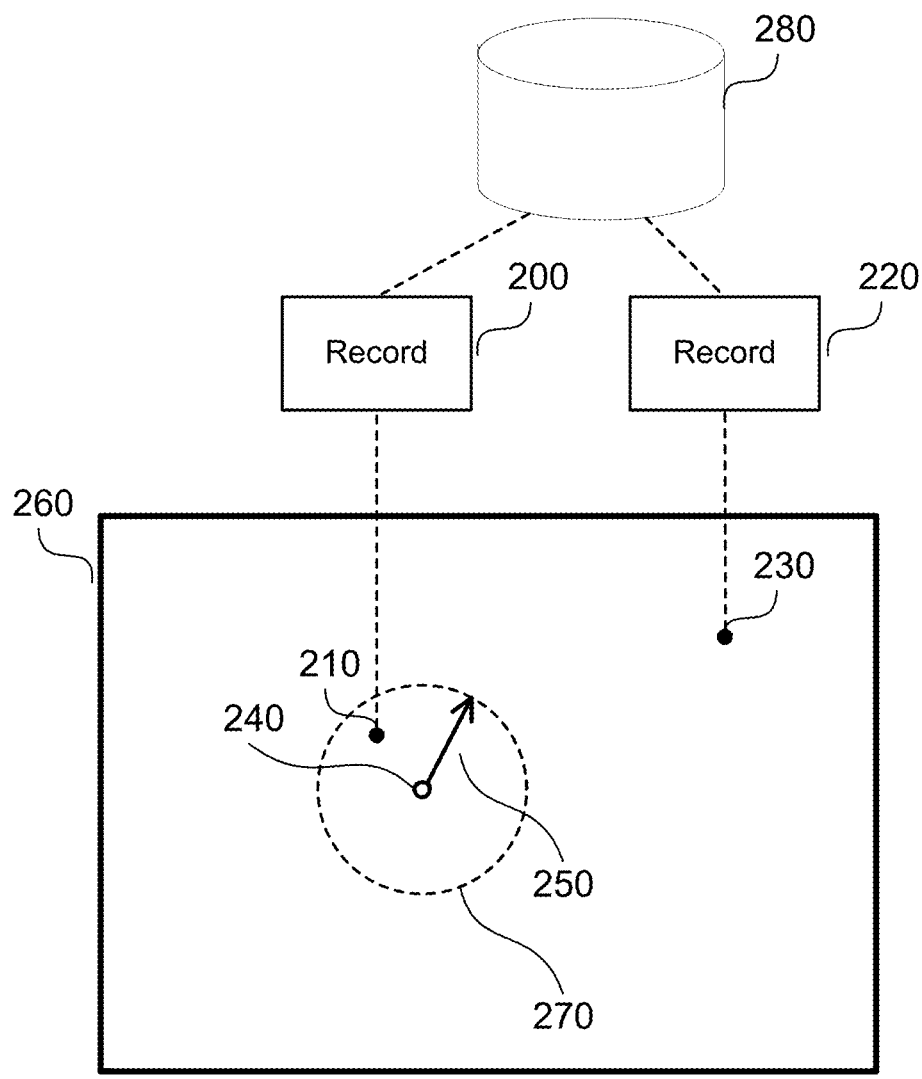
FIG. 2 is a diagram illustrating a spatial interpretation of a vector, query point, and balancing radius.

Feature vectors produced from an image, such as the feature vector 210 of FIG. 1, are shown in a feature space representation in FIG. 2. Vectors may be treated as points in a space such as feature space 260 of FIG. 2. For this reason, the terms 'vector', 'feature vector', and 'point' may be used interchangeably to refer to an array of numbers that represent a portion of an image. As a vector may be treated as a point, the distance between two points may be treated as a measure of dis-similarity between the two corresponding vectors.

FIG. 2 shows the database 280, in which are stored two records, 200 and 220. The two records 200 and 220 are associated with first and second images, which are not shown. The records 200 and 220 may store the same type of information about the respective first and second images. In one example, record 200 stores a last print date for the first image and record 220 stores a last print date for the second image. Alternatively, the records 200 and 220 may store different types of information about the respective first and second images. The records 200 and 220 are associated with feature vectors 210 and 230, respectively. The vectors 210 and 230 have a spatial interpretation in the feature space 260.

When an image ("query image") is used to search for any similar images stored in a database, a query vector 240 is a feature vector produced from the query image that is being used for the search. Finding images stored in the database 280 that are similar to the query image is achieved by retrieving records within a predetermined radius of the query vector 240 derived from that query image. Such a predetermined radius is shown in FIG. 2 by a balancing radius 250, defining a circular query region 270 around the query point 240. Vectors located inside the query region 270, such as vector 210, are defined as matches for the query vector 240, while vectors outside the query region, such as vector 230, are non-matches for the query vector 240. The balancing radius 250 may be considered as a measure of the maximum allowed dis-similarity between a query vector and a feature vector. As vector 210 is within the query region 270, record 200 associated with vector 210 is returned in response to the query vector 240, whereas vector 230 is outside the query region, so record 220 is not returned.

Thus, the feature vector 210 is derived from a first image 100 and the feature vector 240 is derived from a query image (not shown). Feature vector 210 falls within the radius 250 of the query vector 240 indicating a required level of similarity between the first image 100 and the query image. Therefore, the record 200 is returned. The record 200 might store any type of information associated with the image 100.

In one arrangement, a query image is associated with a single feature vector, where the feature vector indicates the distribution of colour and/or edges in the query image. In such an arrangement, a matching record is a record associated with an image of similar distribution of colour and/or edges.

In another arrangement, a query image has many feature vectors, each feature vector being associated with information about the texture of a portion of the image. In such an arrangement, there are many matches that can be combined to score the matching records (e.g., by voting), thus a high-scoring record is a record associated with an image that in parts looks the same as the query image.

Hash Table Updating

Figure 3:
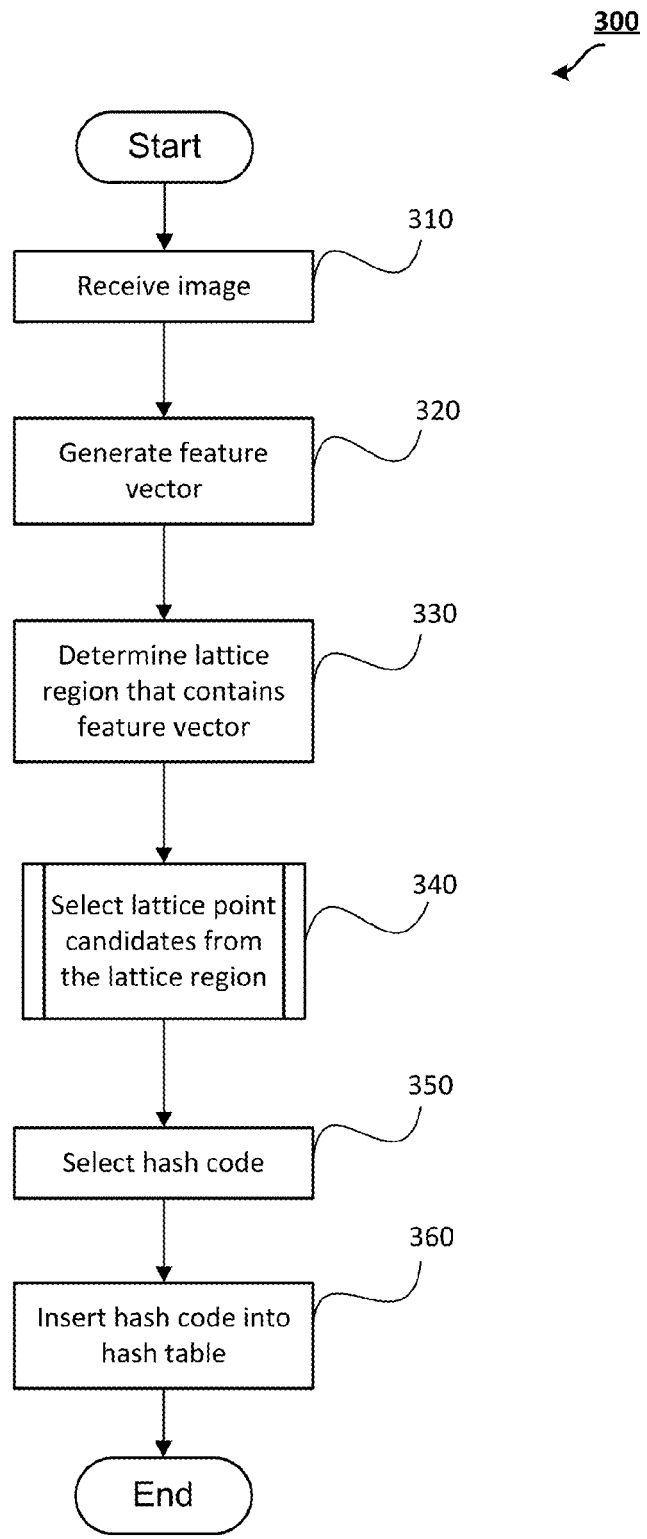
FIG. 3 is a flow diagram showing a hashing method for determining a hash code for an input image.

FIG. 3 is a flow diagram showing a hashing method 300 for determining a hash code for an input image. As described below, steps of the method 300 are used for linking the determined hash code to a portion of the input image. The hashing method 300 may be applied to a number of input images to form a hash table of images. The hash table may be configured within the memory 1306 and/or the hard disk drive 1510. Storing an image in the hash table allows the image to be retrieved when a query image is used to find similar images from the hash table, as will be described in more detail in relation to FIG. 9. The method 300 may be implemented as one or more software code modules of the software application program 1533 resident on the hard disk drive 1510 and being controlled in its execution by the processor 1505.

The hashing method 300 begins at an image receiving step 310, where the processor 1505 receives the input image. The input image may be stored within the memory 1506.

Then at a feature vector calculation step 320, the program 1533, under execution of the processor 105, generates a feature vector (or image feature point) representing at least a portion of the image. The feature vector may be stored within the memory 1506. In one arrangement, a SIFT ("scale-invariant feature transform") algorithm is used at step 320 to select a portion of the input image and to determine a feature vector. Alternatively, other feature vector calculation methods may be used to generate a feature vector at step 320, such as SURF ("Speeded Up Robust Features"), GIST (by Oliva and Torralba), Edge Histogram, or Colour Histogram feature methods.

To achieve high matching accuracy between two similar images, the similarity of two feature vectors, as calculated in step 320 for each image, should be high. Conversely for two dissimilar images, the similarity of two feature vectors should be low. For arrangements that use multiple features per image, the requirement for the similarity of the two feature vectors to be low may be relaxed, such that it is true on the balance of probabilities.

Control passes from step 320 to a lattice region determining step 330, where the program 1533, under execution of the processor 1505, performs the step of determining a Delaunay region enclosing the feature vector (or image feature point) representing the portion of the image, the Delaunay region being determined from A* lattice points. The program 1533 takes the calculated feature vector (or image feature point) from step 320 as an input and determines the enclosing Delaunay region of a multi-dimensional lattice that encloses the feature vector. Details of the enclosing region may be stored within the memory 1506. An A* lattice is applied to the feature space at step 330, where each point of the lattice provides a point to which a feature vector may be hashed. The hashing of feature vectors to one of the lattice points may be considered as a form of quantisation, as each feature vector is assigned to one of the lattice points. One method of selecting the lattice point for hashing is to select the closest lattice point. However, selecting the closest lattice point will lead to unbalanced use of hash codes. The configuration of the lattice used in the feature space at step 330 will be described below with reference to FIG. 11.

For an n-dimensional feature space, n+1, A* lattice points that define a Delaunay region as the enclosing region containing the feature vector are determined at step 330. The Delaunay region is the smallest enclosing region around the feature vector formed by lattice points. Any suitable method may be used at step 330 to determine the lattice points which are the corners of the A* Delaunay region containing the feature vector.

Figure 4A:
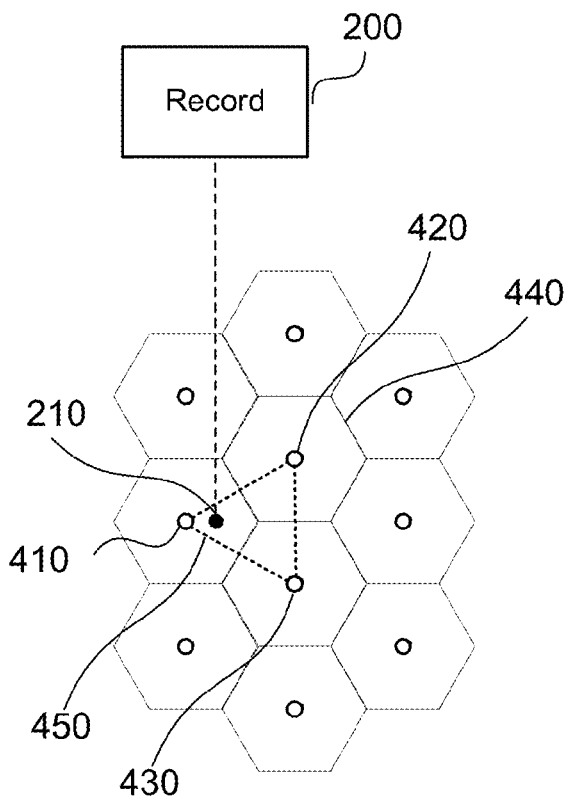
FIG. 4A is a diagram showing an example of a feature vector located in a 2-dimensional feature space.

Step 330 will now be further described by way of example with reference to FIG. 4A. FIG. 4A shows a feature vector 210 located in a 2-dimensional feature space. In the example of FIG. 4A, an A* lattice has been applied to the feature space to form a number of lattice points, such as points 410, 420, and 430. FIG. 4A also shows Voronoi regions around the lattice points, such as Voronoi region 440 which is located around the lattice point 420. A Voronoi region (e.g., 440) of a lattice point consists of all points which are closer to that lattice point than any other point in the lattice. Each Voronoi region (e.g., 440) is bounded by multiple flat surfaces, or hyper-surfaces for more than three (3) dimensions, and each surface defines a boundary between two nearby lattice points. Determining a hash code of a feature vector is equivalent to determining in which Voronoi region the feature vector is located. Each corner of a Voronoi region is called a 'hole', which is where multiple Voronoi regions meet.

The feature vector 210, associated with the record 200 as described previously, is shown in FIG. 4A located within a triangular Delaunay region 450 formed by the three lattice points 410, 420, 430. A Delaunay region (e.g., 450) consists of all points that are no further from the hole than from any other hole. The vertices (i.e., corners) of a Delaunay region (e.g., 450) are the lattice points of the Voronoi regions (e.g., 440) that meet at the hole. No other lattice points are contained in the Delaunay region. A Delaunay region may thus be represented by the lattice points at vertices of the Delaunay region.

When applied to the feature vector 210 shown in FIG. 4A, the lattice points that form the Delaunay region 450 are returned at step 330, since the region 450 contains the feature vector 210. The Delaunay region 450 is a smallest region formed from the points of the lattice that encloses the feature vector 210.

Returning to FIG. 3, the lattice points determined in the lattice region selection step 330 are passed to a lattice candidate selection step 340. At step 340, candidate lattice points from the enclosing Delaunay region are selected for use as hash codes for the feature vector. The selected candidate lattice points may be stored in the memory 1506. A lattice point in the enclosing region is considered to be a valid candidate if, for any future query vector located within the balancing distance of the feature vector, a hash retrieval function will return an enclosing region that contains the hash value of the feature vector. For this reason, the process of adding a hash value to a hash table requires a matching hash retrieval process. A hash retrieval method 900 will be described below with reference to FIG. 9. The output of the lattice candidate selection step 340 is a set of candidate lattice points (i.e., a set of candidate hash values) to which the feature vector may be assigned. Step 340 will now be described in more detail by way of example with reference to FIG. 6 and FIG. 4B.

Figure 4B:
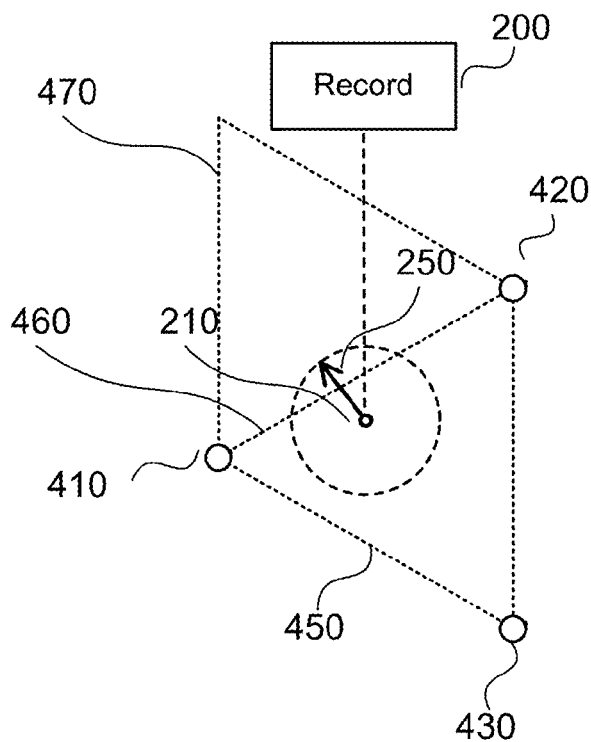
FIG. 4B shows an example Delaunay region.

The lattice candidate selection step 340 will now be described by way of example with reference to FIG. 4B. FIG. 4B shows the Delaunay region 450 of FIG. 4A in more detail. The feature vector 210 is shown located within the region 450 with a balancing radius 250 extending beyond a plane 460 defined by points 410 and 420. The balancing radius 250 defines an area where any future query point would expect to return the feature vector 250 as a feature vector of a similar image. The balancing radius 250 is generally defined for querying a hash table. However, the use of the balancing radius 250 during construction of the hash table allows the hash table to be constructed taking into account the influence of the balancing radius 250. As the balancing radius 250 extends beyond the current Delaunay region 450 into an adjacent Delaunay region 470, the feature vector 210 is hashed to a lattice point available to both of the current and adjacent Delaunay region. Point 430 is excluded from the set of candidate lattice points, at step 340, as point 430 is not part of the adjacent Delaunay region 470 located on the other side of the plane 460. Therefore, a lattice point validator excludes lattice point 430 from the set of candidate lattice points.

Figure 6:
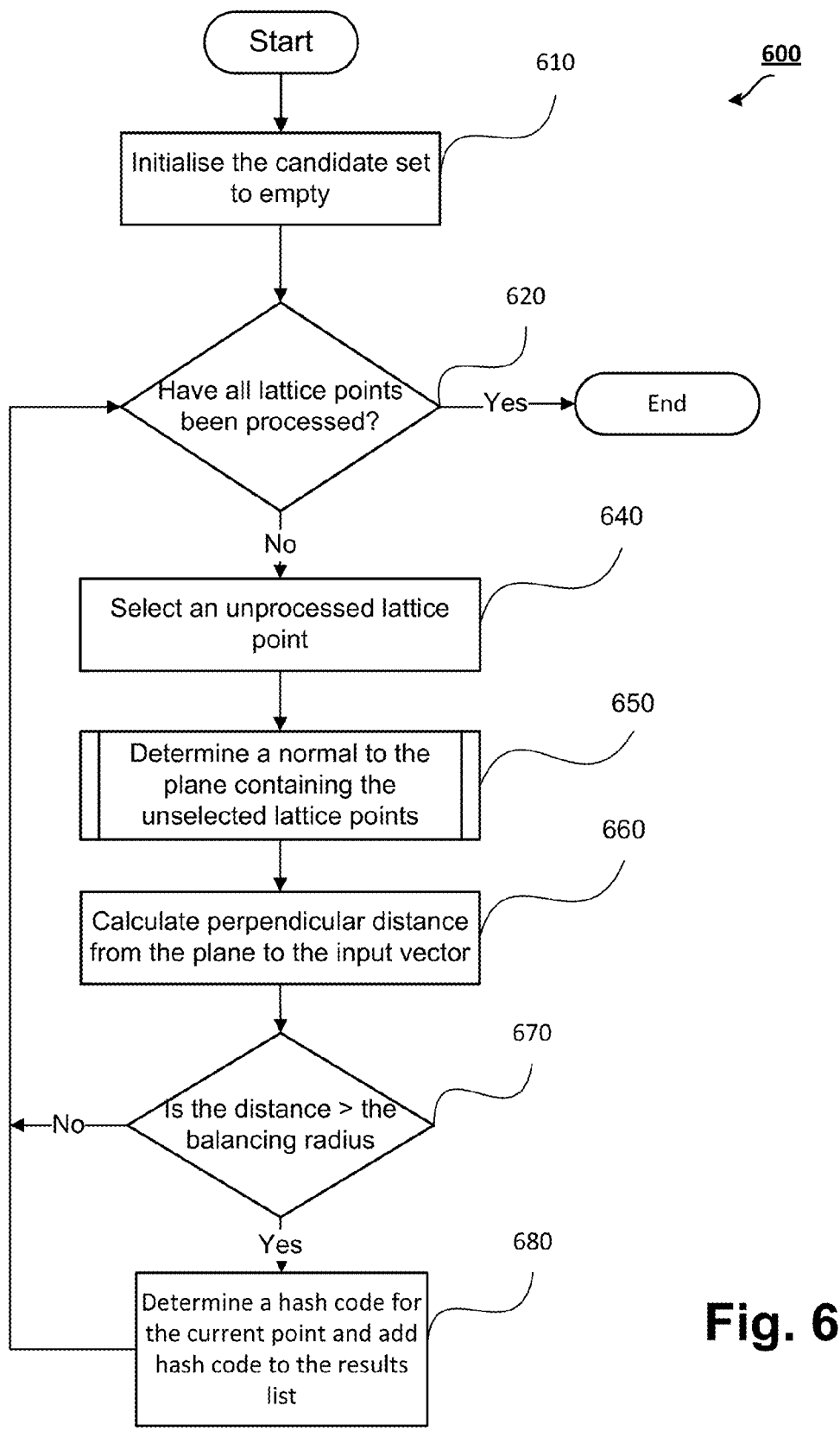
FIG. 6 is a flow diagram showing a method of selecting candidate lattice points as used in the hashing method of FIG. 3.

A lattice candidate selection method 600 for selecting candidate lattice points, as executed at lattice candidate selection step 340, will be described in further detail below with reference to FIG. 6.

Returning to FIG. 3, the hashing method 300 continues at a hash code selection step 350, where the program 1533, under execution of processor 1505, receives the candidate lattice points as determined at the lattice candidate selection step 340. Also at step 350, the program 1533 selects a single lattice code from the candidate lattice points as the hash code for the feature vector. In one arrangement, each lattice point of the lattice candidate points is examined at step 350 to determine a count of how many records have previously been associated with each lattice point. The feature vector may then be quantised to the lattice point with a minimum count of associated feature vectors, using the hash value associated with the lattice point.

The hashing method 300 passes from step 350 to a hash insertion step 360, where the selected hash code is linked by the program 1533, under execution of the processor 1505, to the image record. The program 1533 may also perform the step of storing the link between the hash code and the image record within the memory 1506. Details of the selected hash code and the linked image record is also recorded in the hash table, configured within the memory 1506 and/or the hard disk drive 1510, for use in a hash retrieval stage.

Lattice Candidate Selection

The lattice candidate selection step 340 of FIG. 3 will now be described with reference to FIG. 6. FIG. 6 shows a lattice candidate selection method 600 for selecting candidate lattice points, as executed at lattice candidate selection step 340 of FIG. 3. The purpose of the lattice candidate selection method 600 is to determine which lattice points of the enclosing region, containing the feature vector, are suitable as hash codes for the feature vector generated at step 320.

The method 600 may be implemented as one or more software code modules of the software application program 1533 resident on the hard disk drive 1510 and being controlled in its execution by the processor 1505.

The method 600 begins at an initialisation step 610, where the program 1533, under execution of the processor 1505, initialises a set of candidate lattice points to be empty. The set of initialised candidate lattice points may be stored within the memory 1506.

The remaining steps of the method 600 loop over each lattice point of the enclosing region until all of the lattice points have been processed. At loop control step 620, if the program 1533 determines that all the lattice points have been processed, then the method 600 concludes. In this instance, the candidate selection method stops and the set of candidate lattice points configured within the memory 1506 is returned. Otherwise, if the program 1533, under execution of processor 1505 determines at step 620 that not all of the lattice points have been processed, then control passes to selection step 640.

At step 640, the program 1533, under execution of the processor 1505, performs the step of receiving an unprocessed lattice point from the enclosing region (or Delaunay region) configured within the memory 1506. As described below, the point received at step 640 is configured for defining a plane of the enclosing region (or Delaunay region) from A* lattice points of the enclosing region excluding the received point. The term "plane" is used herein to refer to hyper-planes of dimensionality one less than that of the feature space.

Then at a plane normal determination step 650, the program 1533, under execution of the processor 1505, determines a hyper-plane bounding the enclosing region. The hyper-plane is a plane passing through all the lattice points of the enclosing region excluding the unprocessed point selected at step 640. As a result, the hyper-plane may be specified according to the unprocessed point received at step 640. In the example of FIG. 4B, the hyper-plane is plane 460 when the selected point is lattice point 430. The operation of the plane normal calculation step 650 will be described in more detail below in relation to FIG. 7, FIG. 8 and FIG. 12.

Returning to FIG. 6, control passes from plane normal determination step 650 to a distance calculation step 660, where the program 1533 performs the step of determining a perpendicular distance between the feature vector (or image feature point) and the hyper-plane using the plane normal. As described below, in the following steps, a hash code is determined according to the distance determined at step 650. Once the perpendicular distance is determined, control passes to a distance test step 670.

At step 670, the program 1533, under execution of the processor 1505, compares the perpendicular distance to the balancing radius and determines if a ball with a radius equal to the balancing radius, centred at the feature vector, passes through the hyper-plane and into an adjacent smallest enclosing region. If the balancing ball does extend through the hyper-plane, to an adjacent region, then the selected point is not suitable as a hash code for the feature vector as the point is not common to the adjacent region. If the balancing ball does not extend in to an adjacent region through the hyper-plane, then any adjacent region containing points within the balancing radius of the feature vector will have the selected point in common.

If the program 1533 determines at step 670 that the perpendicular distance is not greater than the balancing distance, then control returns to step 620 which tests whether there are any more lattice points remaining to be processed. Otherwise, if the program 1533 determines at step 670 that the perpendicular distance is greater than the balancing distance, control passes to a hash code addition step 680.

At step 680, the program 1533, under execution of the processor 1505, performs the step of determining a hash code for the selected point and adds the hash code to the set of candidate lattice points configured within the memory 1506. As discussed above, the hash code and the lattice point are linked so that having a hash code allows the lattice point to be determined. The hash code may also use information from the lattice point so that the hash code and lattice point are effectively the same. Any suitable method may be used for determining the hash code of a point at step 680. For example, most standard software libraries provide a function suitable for using at step 680, such as the Arrays.hash Code method in Java. Alternatively, any of the known methods for labelling lattice points with integers may be used at step 680. An array of numbers may be used as a hash code for the lattice point, for example, by representing a lattice point by a lattice coordinate vector. A lattice coordinate vector may be constructed for a lattice point using coordinates of the lattice point with respect to a basis consisting of generators for the lattice. In this case, the hash table may be represented as a tree structure, or other structure known in the art, for associating lattice coordinate vectors with records.

Plane Normal Determination Step

Figure 5:
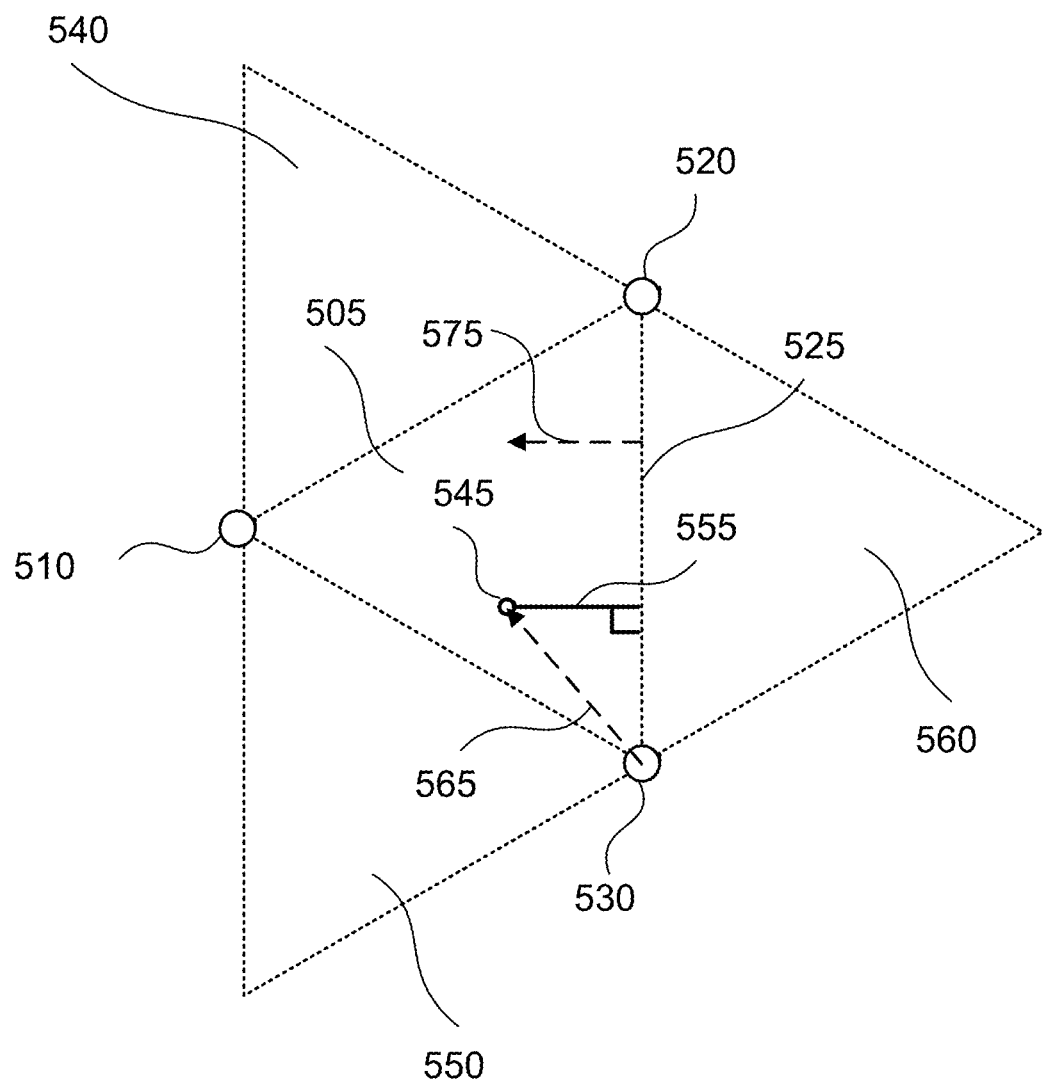
FIG. 5 shows a feature vector in an enclosing region, with a selected plane, a normal to the plane, and the distance to the plane.

Calculating the distance from a point to a plane of a smallest enclosing region will now be described by way of example with reference to FIG. 5. A smallest enclosing region, 505, is shown in FIG. 5 with three neighbouring smallest enclosing regions 540, 550 and 560. The smallest enclosing region 505 contains three lattice points at its vertices, 510, 520 and 530. For each of the lattice points, there is a plane containing the remaining lattice points of the smallest enclosing region 505. For example, the lattice point 510 has an opposite plane 525, defined by the remaining two lattice points 520 and 530. A feature vector 545 is shown in FIG. 5 within the smallest enclosing region 505. The distance 555 between the feature vector 545 and the plane 525 is shown as a line. A plane normal 575 indicates the normal to the plane 525. Finally, a vector 565 from the plane 525 to the point 545 is shown. The distance 555 between the point 545 and the plane 525 is determined by computing a dot product of the normal 575 and the vector 565 from the plane 525.

As described above, the calculation of the normal vector may be performed using a process of singular value decomposition. However, such a singular value decomposition process is slow. A method 1200 of determining a plane normal vector will be described in relation to FIG. 12. The method 1200 determines a mapping of a current smallest enclosing region (a Delaunay region) to a canonical representation of the enclosing region. The canonical representation is predetermined having known properties that allow the normal vector of the current smallest enclosing region to be determined. As the mapping of the current enclosing region has been applied to the plane, such as plane 525, a normal to the plane in the canonical representation may be determined quickly. A reverse mapping from the canonical representation to the current enclosing region is then applied to the normal to map the normal to the current enclosing region. Having determined the normal to the plane in the current enclosing region the distance, such as distance 555, from the feature vector to the plane can be quickly calculated.

The canonical representation is defined by properties of the normal for each plane. If i is not equal to 1, the normal to the plane that excludes the ith lattice point is all zero, except for the ith and (i−1)th coordinate which have equal magnitudes but opposite signs. The normal for the first plane (i=1), has all zero coordinates except for the first and last coordinates which have equal magnitudes and opposite signs. An example canonical representation will be described in relation to FIG. 13 which shows a two (2) dimensional canonical representation (or canonical form) of an enclosing region. The canonical representation is formed of three points 1301, 1302 and 1303. There are three planes formed for the canonical representation with a first plane 1311 defined by (i.e. passing through) the points excluding the first point 1301. Similarly a second plane 1312 defined by the points excluding the second point 1302 and a third plane 1313 is formed from the points excluding the third point 1303. The three points of the canonical representation are used to define a plane index. The first point 1301 of the canonical representation defines the first plane 1311 with a plane index of one (1). The second point 1302 defines a plane index of two (2) and the third point 1313 defines a plane index of three (3). The normal to the first plane 1311 is then [−1/sqrt(2), 0, 1/sqrt(2)]. The normal representation for the second plane 1312 is [1/sqrt(2), −1/sqrt(2), 0] and the normal to the third plane 1313 is [0, 1/sqrt(2), −1/sqrt(2)].

The plane normal determination method 1200 may be implemented as one or more software code modules of the software application program 1533 resident on the hard disk drive 1510 and being controlled in its execution by the processor 1505. The plane normal determination method 1200 begins at a receiving step 1210 where the program 1533, under execution of the processor 1505, receives the feature vector, and the selected lattice point which is not part of the plane.

The feature vector is then passed to a permutation calculation step 1220 where the program 1533 performs the step of determining a permutation value for the lattice region containing the feature vector generated at step 320. The permutation value is a mapping from a lattice region to the canonical representation of the enclosing region (or Delaunay region). Accordingly, the determined permutation value is configured for transforming the Delaunay region to the predetermined canonical form.

A permutation calculation method 700 for calculating a permutation, as executed at step 1220, will now be described with reference to FIG. 7. Again, the permutation calculation method 700 may be implemented as one or more software code modules of the software application program 1533 resident on the hard disk drive 1510 and being controlled in its execution by the processor 1505.

The permutation calculation method 700 begins at a remainder–0 point determination step 710. At the remainder–0 point determination step 710, the program 1533, under execution of the processor 1505, determines the "remainder–0" point which is closest to the feature vector. A "remainder–0" point is a point with integer coordinates, such that the sum of coordinates is equal to zero. When using coordinates that are scaled by a factor of n+1, where n is the number of dimensions of the feature space, the scaled coordinates of the $A_n^*$ lattice points are integers. The "remainder–0" points are those $A_n^*$ lattice points whose scaled coordinates have remainder 0 when divided by n+1. Each Delaunay region has one "remainder–0" point. A method 800 of determining a nearest "remainder–0" point to a feature vector, as executed at step 710, will now be described with reference to FIG. 8. Again, the method 800 may be implemented as one or more software code modules of the software application program 1533 resident on the hard disk drive 1510 and being controlled in its execution by the processor 1505.

The remainder–0 point determination method 800 begins at a rounded vector calculation step 810, where the program 1533, under execution of the processor 1505, determines a rounded vector by rounding each coordinate of the feature vector towards a nearest integer value. The determined rounded vector may be stored within the memory 1506.

Next, a sum comparison step 820 compares the sum of the coordinate values of the rounded vector to zero. If the sum is less than zero, then control passes to a difference calculation step 830, where the program 1533 subtracts the rounded vector from the feature vector to produce a difference vector. The difference vector may be stored within the memory 1506.

Then, control passes to a coordinate increment step 840, where the program 1533 increments the coordinate of the rounded vector which corresponds to the smallest (most negative) value in the difference vector by one.

The method 800 then loops back to the sum comparison step 820. If in the sum comparison step 820 the sum is greater than zero, then control passes to a difference calculation step 850. At step 850, the program 1533, under execution of the processor 1505, subtracts the rounded vector from the feature vector to produce a difference vector. The difference vector may be stored within the memory 1506.

Then, in step 860, the program 1533 adjusts the rounded vector by decrementing the coordinate of the rounded vector which has the largest difference value. The method 800 then loops back to the sum comparison step 820. If in the sum comparison step 820 the sum of the coordinates equals zero, then the method 800 concludes, with the rounded vector equalling the "remainder–0" point. Continuing with FIG. 7, after calculating the nearest "remainder–0" point, control passes to a difference calculation step 720, where the program 1533, under execution of the processor 1505, subtracts the "remainder–0" point from the feature vector to produce a difference vector which may be stored within the memory 1506. The difference vector may be used to calculate a sorting permutation that may be applied to determine the normal vector.

Next, in a sort permutation calculation step 730, a sorting permutation of the difference vector is calculated by the program 1533. The sorting permutation is the mapping from the canonical representation of the region to a current smallest enclosing region. The sorting permutation is calculated by sorting the coordinates of the difference vector from a highest valued coordinate to lowest valued coordinate. The position of the highest valued coordinate is then mapped to a first position in the sorting permutation while the lowest valued coordinate is mapped to a last position in the sorting permutation. As an example, for the difference vector [−0.05, −0.18, −0.07, 0.06, 0.24], coordinate values may be ordered from fifth, fourth, first, third, and second. The sorting permutation for the example vector is [5, 4, 1, 3, 2]. The sorting permutation calculated at step 730 may be stored within the memory 1506.

The sorting permutation may then be used as a lookup table for mapping vector coordinates to a new position according to a rank of the difference vector coordinate values. The $i^{th}$ value of the sorting permutation indicates the coordinate in the $i^{th}$ position after sorting in increasing order.

Returning to FIG. 12, the sorting permutation is used to determine the normal. The method 1200 continues with an index determination step 1230, where the program 1533, under execution of the processor 1505, performs the step of determining two coordinate index values of the normal to the plane for the canonical representation. The first coordinate index value is set to a plane index defined from the selected lattice point that is not part of the plane that was received in step 1210. The second coordinate index is calculated by subtracting one from the plane index. In the case that the second index is calculated to be zero, the second index is set to the index of the last coordinate of the vector.

Next, control passes to a permutation application step 1240, where the permutation determined in step 1220 is applied to the first and second index. For the first and second index, the corresponding index in the permutation lookup table is determined. The permutation is applied to the first and second index to produce a first and second permuted index of the normal.

Next, control passes to a normal initialisation step 1250, where the program 1533, under execution of the processor 1505, performs the step of determining a normal vector of the plane by setting at least two co-ordinates of the normal to predetermined non-zero values, the two co-ordinates being selected according to the determined permutation. In particular, the program 1533 creates the normal vector using the first and second permuted indices. The normal is set to be zero for all coordinates except for the two coordinates corresponding to the first permuted index which is set to −1/sqrt(2) and second permuted index which is set to 1/sqrt(2). The method 1200 concludes following step 1250 with a normal vector having two non-zero values of −1/sqrt(2) and 1/sqrt(2) with the location of the non-zero values determined by the plane index and the permutation representing the transform from the canonical representation to the current smallest enclosing region.

Figure 7:
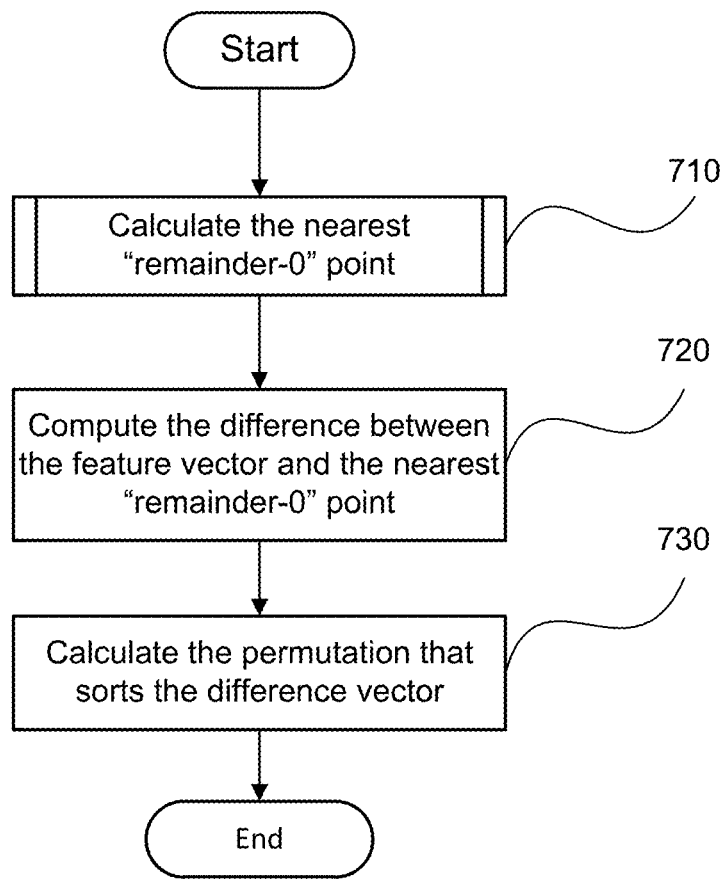
FIG. 7 is a flow diagram showing a method of calculating a permutation.
Figure 8:
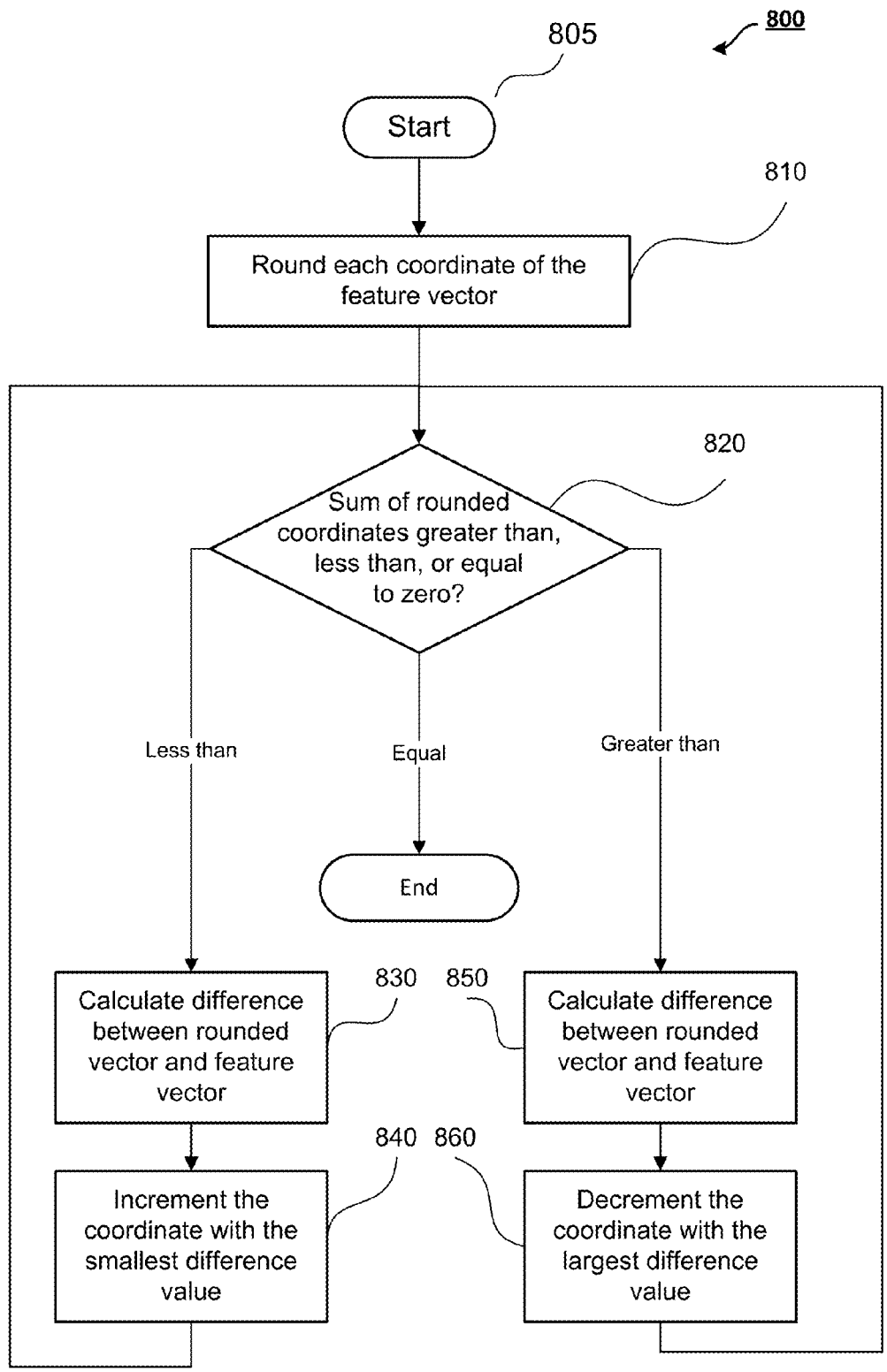
FIG. 8 is a flow diagram showing a method for calculating a nearest k=0 point.

The permutation calculated in the method 700 of FIG. 7, does not depend on the selected lattice point, or the corresponding plane index. As a result, the permutation may be calculated once per feature vector and cached within the memory 1506, for example, for future normal calculations. The permutation may also be computed and stored as part of the determination of the enclosing region.

Hash Table Query

Figure 9:
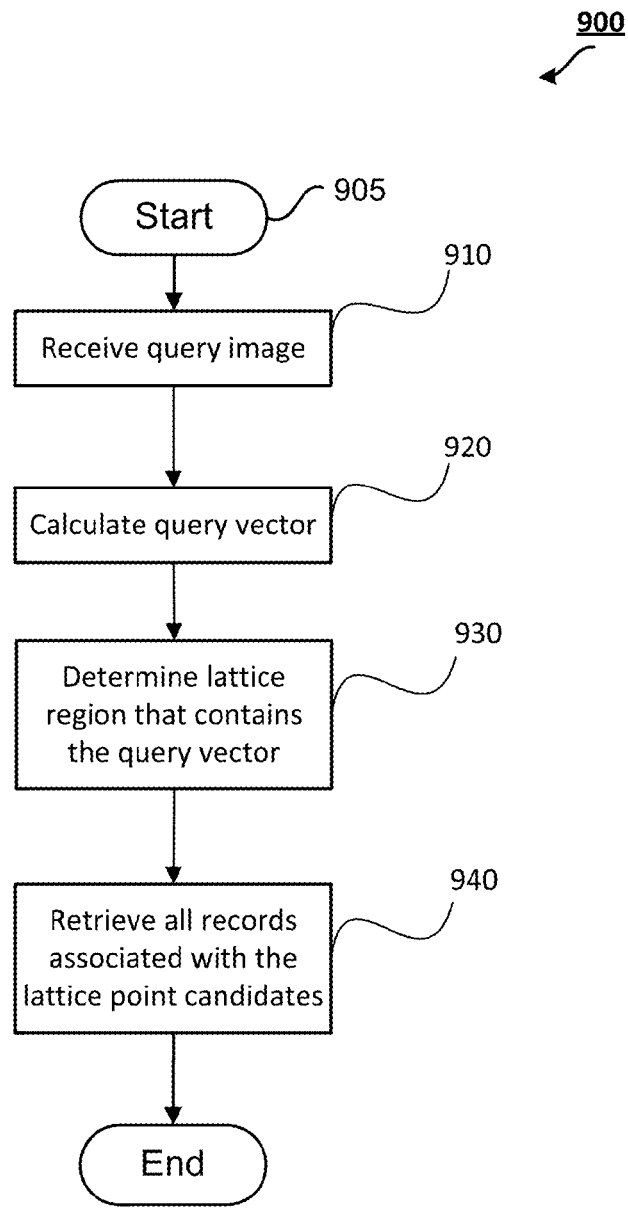
FIG. 9 is a flow diagram showing a hash retrieval method.

The hash retrieval method 900 will now be described with reference to FIG. 9. The hash retrieval method 900 receives a query image and searches for any similar images by searching records stored in the hash table configured within the memory 1506. The similarity of the images is determined by the size of the balancing radius as described above, where a number of images considered to be similar will increase as the balancing radius increases. The hash retrieval method 900 uses the same feature space and lattice that was used for the hashing method 300.

The method 900 may be implemented as one or more software code modules of the software application program 1533 resident on the hard disk drive 1510 and being controlled in its execution by the processor 1505.

The hash table query method 900 begins at an image receiving step 910, where the program 1533, under execution of the processor 1505, receives a query image. Control then passes to a query vector calculation step 920, where the program calculates a query vector from the query image. In one implementation, the same process used in the feature vector calculation step 320 may be used at step 920 to provide consistent results between the hashing method 300 and the retrieval method 900. However, in some applications, the query vector calculation process used in step 920 may be different from the process used in the feature vector calculation step 320. For example, if there is some known bias or regularity in the set of possible query images, then the query vector calculation step 920 may be modified to take advantage of the known bias or regularity. As an example, if it is known that all query images will come from a low quality web camera, whereas the database images are high-quality digital photos, then the vector calculation steps may be different. The query vector is then passed on to a lattice region selection step 930, where the program 1533 determines a region enclosing the query vector. In one implementation, the same process may be used at step 930 as described above in relation to the lattice region selection step 330 of the hashing method 300.

Figure 10:
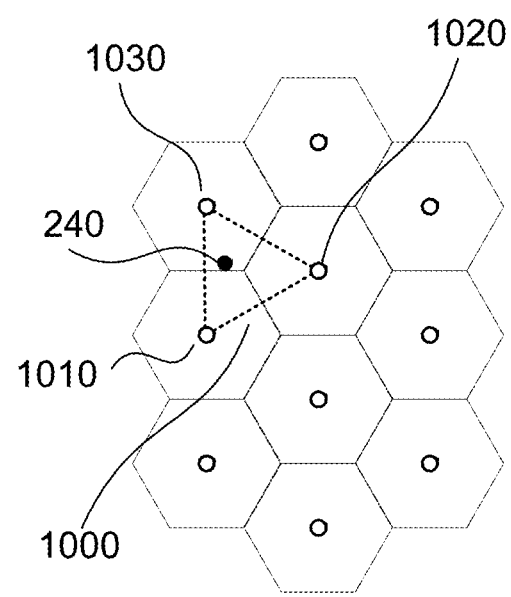
FIG. 10 is a diagram showing spatial interpretation of the hash region for a given query vector.

The operation of the lattice region selection step 930 will now be explained by way of example with reference to FIG. 10. FIG. 10 shows a query vector 240 located within an enclosing region 1000. The enclosing region 1000 is a Delaunay region defined by three lattice points 1010, 1020, and 1030. FIG. 10 is illustrative only and shows a 2-dimensional example. In general, arrangements of the present disclosure are applicable to n-dimensional vectors, in which case, the lattice selection step 730 provides n+1 A* lattice points that define a Delaunay region containing the query vector.

Returning to FIG. 9, the selected lattice points that define the enclosing regions are passed from step 930 to a record retrieval step 940. At step 940, the program 1533 processes each of the lattice points to produce a list of query hash codes, wherein there is a query hash code for each of the lattice points of the enclosing region. The query hash codes may be produced using the same method applied to produce hash codes in the hash code addition step 680 of the candidate selection method 600. The query hash codes may then be used to retrieve the image records associated with hash codes from the hash table configured within the memory 1506. The result is that the lattice points of the enclosing region are used to retrieve image records that have been associated with the lattice points in the hashing method 300. The set of retrieved image records may be larger than just those associated with features located within the balancing radius around the query vector, since there may exist some records associated with feature vectors that became associated with included lattice points, even though the feature vectors were further than the balancing radius from the query vector. However, the set of retrieved images includes all of the images located within the balancing radius and possibly additional images. The additional images may be filtered out using a subsequent processing stage, or the set of retrieved images may be small enough for suitable use as a set of similar images. The similar images may then be presented to a user for validation of the similarity. The user may then review each of the retrieved images and accept or reject the image as a similar image.

Lattice Sizing

Figure 11:
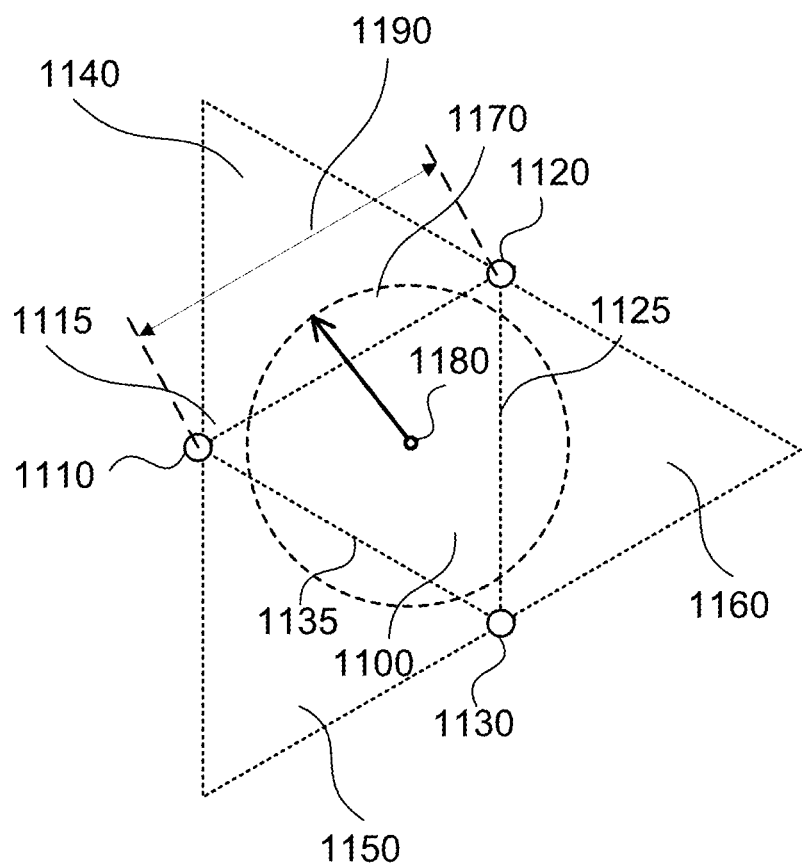
FIG. 11 shows a feature vector in an enclosing region in a two dimensional feature space.
Figure 12:
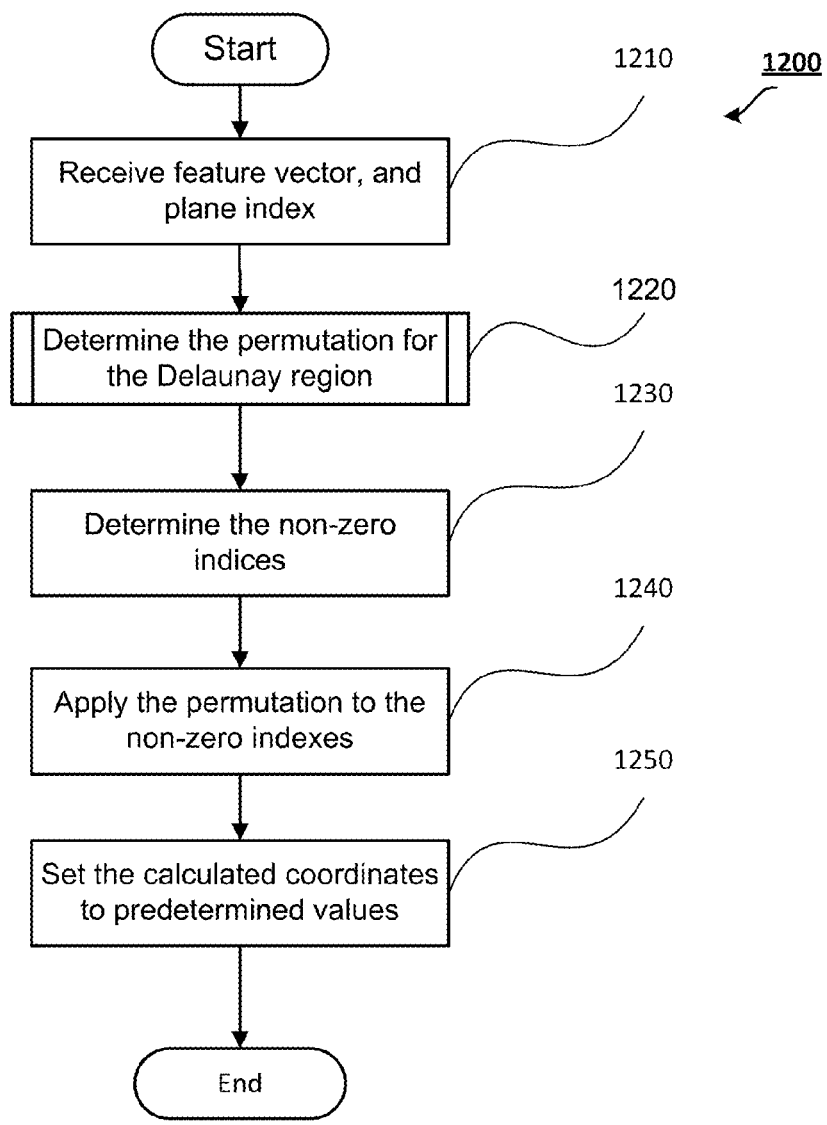
FIG. 12 is a flow diagram showing a method for determining the normal.
Figure 13:
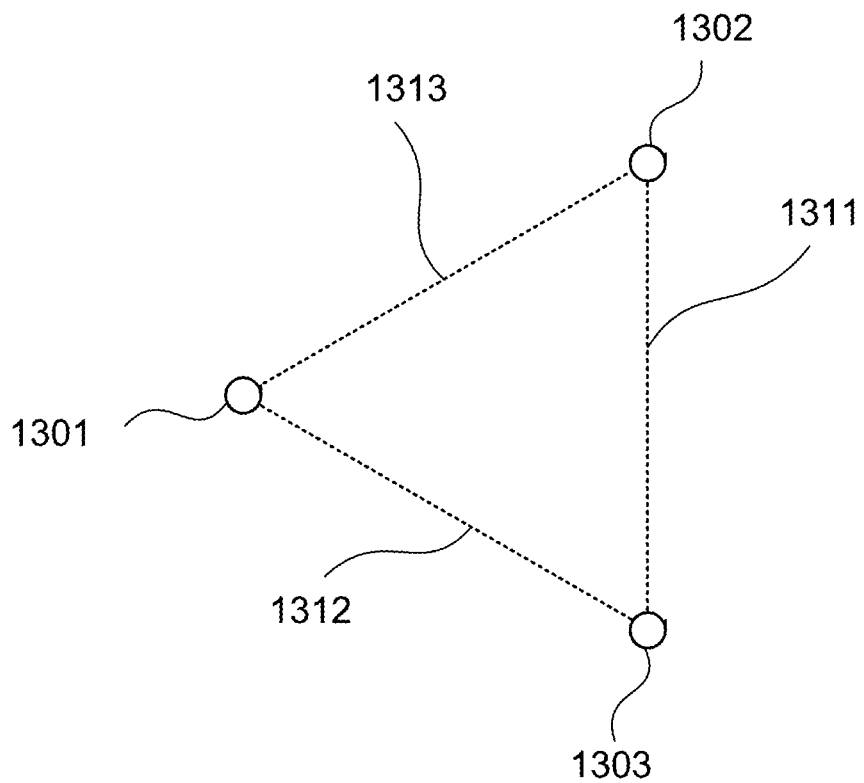
FIG. 13 shows a canonical representation of a smallest enclosing region.

As described above, the present disclosure uses points of an A* lattice to provide hash codes for feature vectors. The configuration of the A* lattice effects the retrieval of images in accordance with the described methods. As an example, FIG. 11 shows a 2-dimensional feature space, comprising a feature vector 1180 located at the centre of a Delaunay region 1100. In the example of FIG. 11, a balancing radius 1170 has been used, extending from the feature vector 1180. Due to the size of the balancing radius 1170 relative to the lattice point spacing, the balancing ball within the balancing radius 1170 of the query vector 1180 extends past all three planes 1115, 1125 and 1135 of the enclosing region 1100 and in to adjacent Delaunay regions 1140, 1150 and 1160. In this situation, a query vector located in any of the adjacent regions 1140, 1150 and 1160 returns the image associated with the feature vector 1180 as a similar image. However, a lattice point that is common to all four regions 1100, 1140, 1150 and 1160 may not be able to be found. As a result, the described methods may fail to operate correctly. From this, it is clear that there is a relationship between sizing of the lattice and the balancing radius. In one arrangement, the lattice is as dense as possible, provided that a ball with a radius equal to the balancing radius fits inside the Delaunay cell. This is equivalent to sizing the lattice such that the in-radius of the Delaunay cells is equal to the balancing radius, r. Half of the minimum distance between pairs of distinct lattice points is known as the packing radius, 1190. The packing radius 1190 corresponds to the maximum radius of non-overlapping spheres, centred at lattice points. The scale of a lattice can be defined in terms of its packing radius. For an A* lattice with packing radius rho and dimensionality n, the lattice maybe sized using multiplication by $r*sqrt((n+1)*(n/2))/rho$. Equivalently, to make the in-radius equal to r, the packing radius may be set to $r*sqrt((n+1)*(n/2))$.

Determining near neighbours in a database of points, within some distance of a query point is known as a 'ball query'. Ball queries are difficult for large, high-dimensional databases due to the 'curse of dimensionality'. In particular, as the number of dimensions increases the problem does not decompose to a collection of lower-dimensional searches.

Ball queries are useful for content-based image retrieval (CBIR) and machine learning (such as Gaussian processes, manifold learning and semi-supervised learning). In a CBIR method, images in a database are retrieved by considering the similarity of the images to a query image.

Some applications of CBIR are required to work even when a query image is 'difficult' as a result of the query image being distorted, cropped and/or affected by noisy processing such as printing and re-imaging. High accuracy CBIR with difficult query images may be achieved using near neighbour searching over local image feature descriptors. Descriptors that are not similar to a query descriptor need not be processed. A CBIR query may be achieved by performing ball queries with the feature descriptors of a query image.

Locality sensitive hashing (LSH) is an approximate near neighbour method that partitions the space of points into cells, independently of the points in the database. Parameters of the partitioning function may be chosen based on prior knowledge of the distribution of points. The space is partitioned in such a way that the cell containing an arbitrary point can be quickly determined, in time independent of the database size. If a hash code is associated with each cell, then the function is a locality sensitive hash—that is similar points are likely to lead to the same hash code. Consequently, nearby points can be found as quickly as accessing a hash table. Query speeds for hashing methods are reported at $10^6$ to $10^9$ times faster than exhaustive search.

Exact Euclidean LSH (also known as E2LSH) uses a parametric family of hash functions H, where h∈H is defined using Equation (3) as follows:

$$h(v) = \left\lfloor \frac{\alpha \cdot v + \beta}{w} \right\rfloor \quad (3)$$

Equation (3) produces an integer hash code for an input vector v with dimensionality d; Equation (3) determines the floor of the dot product of v and a parameter vector $\alpha$ that is added to a parameter $\beta$ and divided by a parameter w. In Equation (3) there are three parameters: $\alpha$ is a vector with the same dimensionality as the input vector which is used to project the input vector onto a single dimension; $\beta$ is an offset parameter; and w is a scaling parameter.

A random hash function is constructed by uniformly drawing n functions from H, where the parameter $\alpha \in \mathbb{R}^d$ is a random point on a hyper-sphere of radius 1 and $\beta$ is a random real number between 0 and w. A value w is chosen based on prior knowledge of the distribution of input vectors. The n functions are combined in a function g using Equation (4) as follows:

$$g(v) = \sum_{i=0}^{n-1} r^i h(v)[i] \bmod b \quad (4)$$

Equation (4) is the weighted sum of the n integers generated from the n functions drawn from H. The weighting r is raised to a power 0, 1, ..., n−1. The sum is taken modulo b. In Equation (4) there are two parameters b and r which are constant positive integers. Parameter b is usually set to the size of a hash table, and parameter r is set to some small prime number, such as thirty one (31).

Equation (4) defines a family of hashes G that is built from H. A hash function g∈G consists of a random, affine mapping from the original d-dimensional feature space to an n-dimensional quantisation space which is partitioned using scalar quantisation, each cell having an integer hash code.

Unfortunately, for any locality sensitive hash function, there will always be pairs of points that are close but return different hash codes (i.e. two points either side of a partition boundary), which leads to the boundary problem—false-negative matches—which is failing to find nearby points because their hash codes are different. Additionally, there are false-positive matches that result from the hash-table supplying extra entries. False-positives may be eliminated by further checking candidates which have matching hash codes. For Equation (4), as the dimensionality, n, of the quantisation space increases the false-positive rate decreases but the false-negative rate increases.

E2LSH deals with the boundary problem using l hash functions drawn from the family of hash functions G. When a database vector v is received, the vector v is inserted into each of the l hash tables, using each of the l hash functions. When a query vector q is received, each of the l hash tables are checked. For larger l the chance that v and q are assigned to a common partition increases, hence false-negatives are reduced, which costs time, and more critically, memory. It is not unusual for applications to need hundreds of hash tables, which makes E2LSH unsuitable for large databases.

Appropriate values for l are affected by the shape of the cells and how the cells connect. Scalar quantisation results in cells that are n-dimensional hyper-cubes, which implies that the number of cells that can meet at a point is $2^n$. This has motivated replacing scalar quantisation with lattice quantisation. There is a version of LSH where the cells are the 24-dimensional Voronoi cells of the Leech lattice. Using the Leech lattice results in cells that are as spherical as possible for a lattice quantiser in a 24-dimensional quantisation space, and results in a maximum of forty eight (48) cells meeting at any point in the quantisation space. However, the cost of determining a Leech lattice Voronoi cell for a query point is considered too great for practical LSH. The $E_g$ lattice has been used as a cheaper alternative (for an 8-dimensional quantisation space). Other lattice quantisers have been considered, such as A, A*, D and D*. With a lattice quantiser, the query time may be improved by using a retrieval process that is limited to checking one hash table per query vector. Specifically, the hash table selected for checking is the hash table most likely to yield a correct result. The hash table most likely to find the nearest neighbour is one where the query point is most central in the cell.

Scalar quantisation is technically a form of lattice quantisation using a trivial lattice, also known as a $\mathbb{Z}^n$ lattice. A trivial, $\mathbb{Z}^n$, lattice consists of all n-dimensional points where every coordinate is an integer. The Voronoi cells of a trivial lattice are squares, rectangles, cubes, hyper-cubes or hyper rectangles. For this reason trivial lattices may be excluded where referring to lattice quantisation.

The memory requirements for LSH may be significantly reduced using multi-probe LSH which reduces the number of hash tables. Multi-probe LSH may use a single hash function and hash table with a single entry per database vector.

For multi-probe LSH, when a database vector v is received the vector is inserted into a hash table using a function g(v). At query time, not only is a hash bucket g(q) accessed, but also buckets that correspond to nearby cells. Each time the hash table is accessed it is called a 'probe'.

Point Perturbation is a multi-probe LSH method, also called Entropy-based LSH. Point Perturbation generates probes by adding small random vectors to a query vector. However, point perturbation is expensive to generate multiple perturbations of a query vector and re-hash each one. Furthermore, there is much inefficiency in the random nature of the probes.

Hash Perturbation is another multi-probe LSH method. When using Hash Perturbation the query hash code is directly perturbed rather than the query vector. Hash perturbation adds or subtracts one (1) from selected coordinates in the quantisation space.

The perturbations are applied in an orderly process until a stopping condition is met. Stopping conditions include: a specific number of probes performed, the required number of candidates are retrieved, or the result is known with sufficient confidence.

Query-directed multi-probe LSH maintains a priority queue of possible perturbations, where the priority is the distance from the query point to the boundary implied by the perturbation. Query-directed multi-probe LSH may be used with a simplifying heuristic that approximates distances to the boundary and avoids the need of a priority queue at query time. The simplifying heuristic uses only the order of dimensions as sorted by the quantisation error of each dimension. Thus Query-directed multi-probe LSH is multi-probe LSH with a list of cells approximately ordered by distance from a query point. Query-directed multi-probe LSH makes it possible to access a number of cells up to a certain approximate distance.

Multi-probe LSH trades time for memory where a single hash table will require less storage, but take longer to retrieve due to the multiple probes. The appropriate number of probes is affected by the shape of the cells and how the cells connect. Lattice-based LSH improves query times by reducing the required number of probes and replacing the scalar quantiser with a lattice quantiser. There is a disadvantage to having efficient multi-probe LSH with a lattice quantiser, namely it is not known how to efficiently find suitable nearby probe points for a lattice quantiser.

Point perturbation may work with a lattice quantiser as point perturbation is agnostic to the quantiser, but generating the probes is inefficient. All other multi-probe LSH techniques rely on the fact that coordinates are quantised independently, thus the query process is at liberty to perturb any dimension without regard to the others, and a hash code for a nearby partition is assured. This is not possible when a non-trivial lattice quantiser is used.

The present disclosure describes methods for creating and accessing a hash table to efficiently retrieve records associated with n-dimensional vectors, where the vectors of the retrieved records are within a specified query radius of a given query vector. The described methods are particularly useful when false-negatives are costly and/or when false-positives are costly, as the invention can be used reduce these costs while still remaining within practical limitations of processing time and memory.

The described methods may use a hash function that is formed using an A* lattice. When a record with an associated vector is received, the vector is mapped to a quantisation space and a lattice point near to the mapped vector is chosen which is then used to determine a hash code for the vector. The record is associated with the hash code using a hash table. When a query vector is received, the query vector is mapped to the quantisation space and lattice points that are near to the mapped query vector are determined, and a query hash code is formed corresponding to each of the determined lattice points. The hash table is used to retrieve the records associated with each query hash code.

Figure 16:
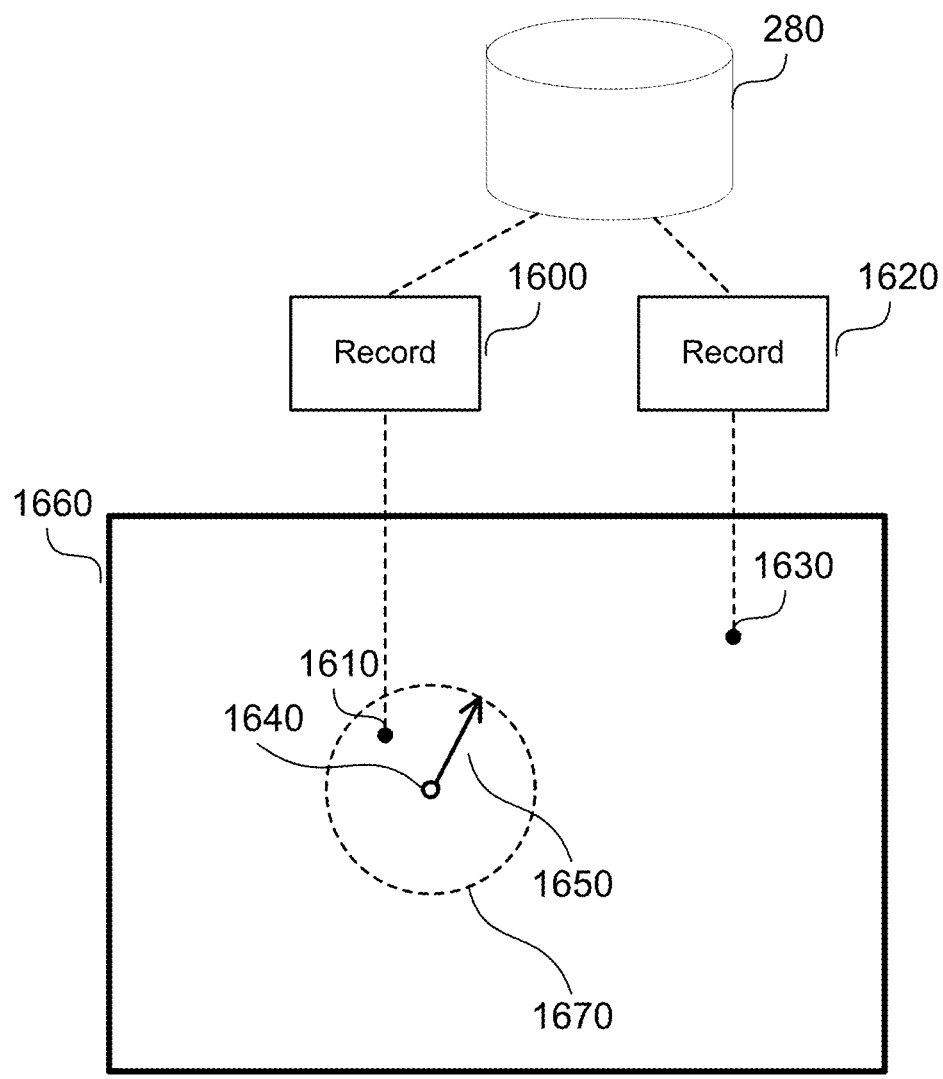
FIG. 16 is a diagram showing the spatial interpretation of ball query.

FIG. 16 is a diagram showing the spatial interpretation of a ball query. FIG. 16 shows two records, 1600 and 1620 which are stored in the database 280 configured within the hard disk drive 1510 and/or memory 1506. The record 1600 is associated with vector 1610 and record 1620 is associated with vector 1630. The vectors have a spatial interpretation as points in a feature space 1660. Given a query vector 1640, those records within a radius 1650 of the query vector may be retrieved. The query radius 1650 defines a circular/spherical/hyper-spherical query region 1670 around the query point 1640. Vectors inside the query region 1670, such as 1610, are defined as matches for the query point 1640, and vectors outside the query region are non-matches, such as vector 1630. As vector 1610 is within the query region 1670, record 1600 should be returned, whereas vector 1630 is outside the query region and record 1620 should not be returned. If a non-matching record is returned, then a false-positive error is said to have occurred. If a matching record is not returned, then a false-negative error is said to have occurred. False-positives may be dealt with using a subsequent checking step, as long as the number of false-positives is not too large. Dealing with false-negatives is much more difficult.

Figure 17:
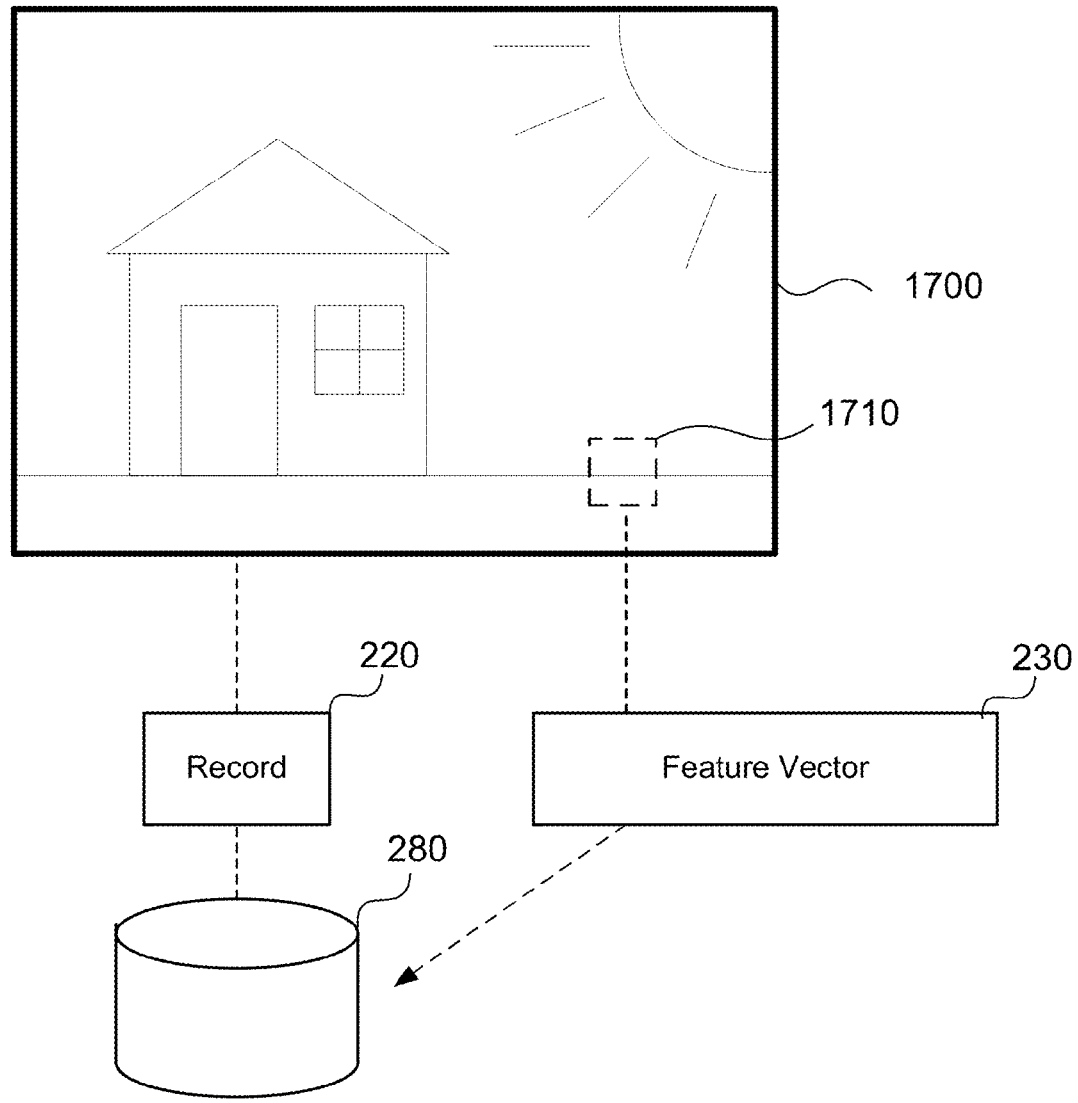
FIG. 17 is a representation of an image, image portion and feature vector associated with an image portion.

An example of content based image retrieval is shown in FIG. 17. In FIG. 17 an image 1700 has an associated record 1720 that is in the database 280. The image 1700 is processed by an image feature extractor, such as 'Scale Invariant Image Transform' (SIFT), which identifies a region of the image 1710, and determines a feature vector 1730. CBIR requires that: given query feature vectors similar to 1730 that are extracted from a query image similar to image 1700, that the record 1720 may be efficiently retrieved. Each feature vector may be understood as a point in a high-dimensional feature space. Therefore, performing a ball query solves the problem of how to retrieve record 1720 using a query vector that is similar to feature vector 1730.

As described here, vectors and points may be considered to be equivalent. A database vector refers to a point that is associated with a record in a database and a query vector is an arbitrary query point that is used to access records in the database.

A method of retrieving records associated with feature vectors located within a predetermined search radius of a query vector, the feature vectors being associated with lattice points of a multidimensional A* lattice is described. When the query vector is received, the query vector is mapped to a quantisation space where lattice points are determined that are the vertices of an enclosing Delaunay cell which encloses the mapped query vector. In addition, extra lattice points are determined which form selected shells around a hole of the enclosing Delaunay cell, each shell being a particular radius from the hole. Each lattice point that is a vertex of the enclosing Delaunay cell or is in a selected shell around the hole of the enclosing Delaunay cell, may be used to form a hash code that is used to access (or 'probe') a hash table. Using additional lattice points extends the set of query probes beyond the Delaunay cell vertices. Including more shells in the query process results in more probes and a greater volume of the quantisation space is accessed by the query.

The described method of retrieving records associated with feature vectors located within a predetermined search radius of a query vector may be referred to as 'Extended Delaunay probing'. As more shells are included in the query process, the more spherical is the volume of quantisation space accessed. The described method of retrieving records may be used to efficiently generate probes for an arbitrary number of shells.

For the following description, variables are represented in italic with vectors in bold. The lth coordinate of a vector is represented using square brackets counting from zero, thus for vector v, x=v[0] means that x is the first coordinate of v. The notation $\lfloor y \rfloor$ is used to indicate the floor of y which is the greatest integer value less than or equal to y.

Figure 18:
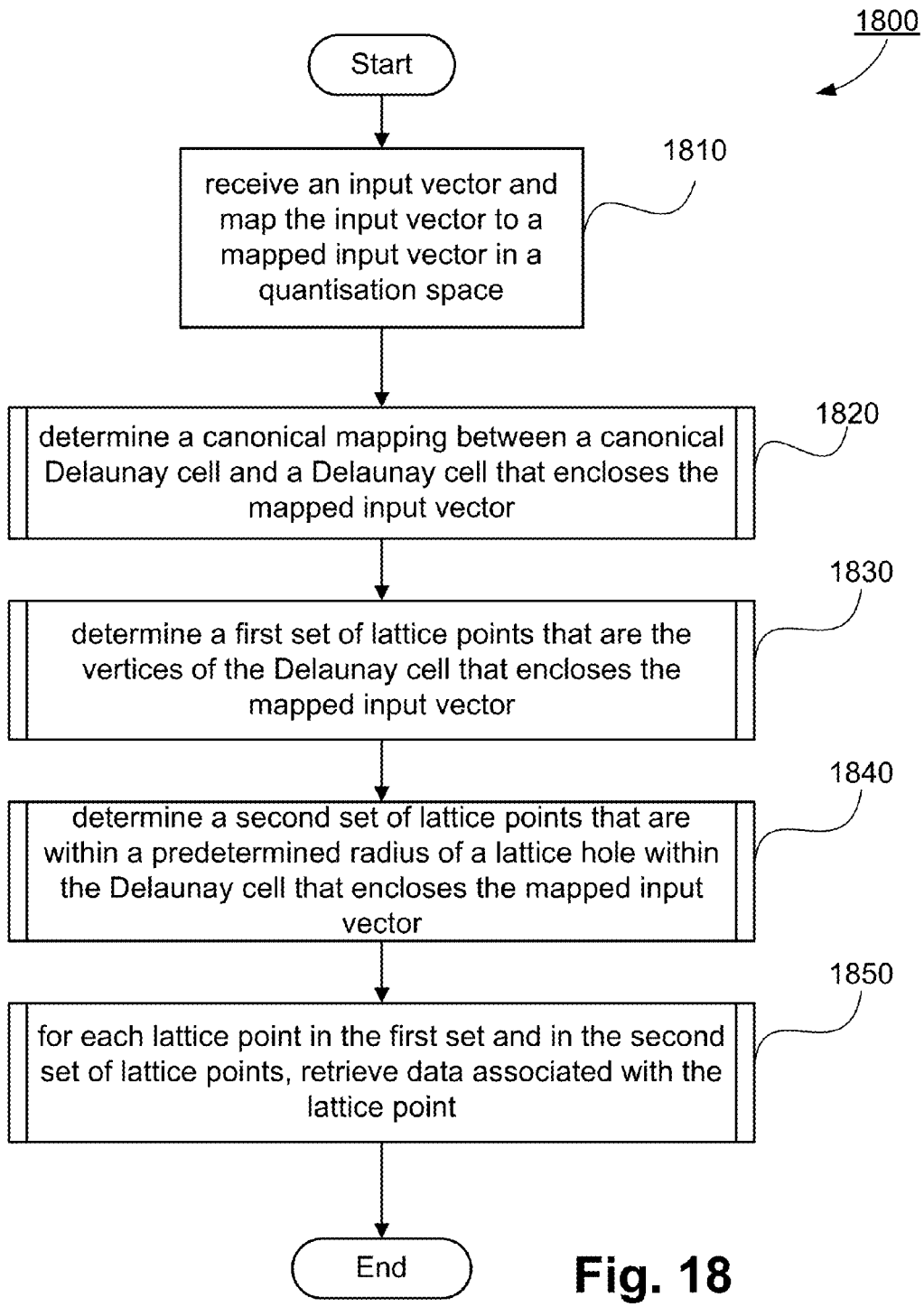
FIG. 18 is a flow diagram showing a method of retrieving feature vectors located within a predetermined search radius.

A method 1800 of retrieving records associated with feature vectors located within a predetermined search radius of a query vector is described with reference to FIG. 18. The method 1800 may be implemented as one or more software code modules of the software application program 1533 resident on the hard disk drive 1510 and being controlled in its execution by the processor 1505.

The method 1800 starts with a receiving step 1810 where an input vector is received by the processor 1505, and where the input vector is a query vector. The input vector may be stored within the memory 1506. In step 1810 the input vector is mapped to a mapped input vector in the quantisation space and is representing a feature vector to be matched by feature vectors previously used to store records in a hash table.

At canonical mapping receiving step 1820, the program 1533, under execution of the processor 105, determines a canonical mapping between a canonical Delaunay cell and an enclosing Delaunay cell that encloses the mapped input vector. Each vertex of an A* Delaunay cell is a remainder-k lattice point where k represents an integer number and the value of k is different for each vertex of the Delaunay cell. Step 1820 may represent the canonical mapping in two parts. Part one is a translation from the remainder-0 vertex of a canonical cell, where the remainder-0 vertex is the origin, to the remainder-0 vertex of the enclosing Delaunay cell. Part two is a sorting vector, which is a permutation of the dimensions used to represent the coordinates of lattice points. A method 1900 of determining a remainder-0 vector and a sorting vector for a Delaunay cell that encloses an input vector, as executed at step 1820, will be described below with reference to FIG. 18.

Next, at first lattice point determining step 1830, the program 1533, under execution of the processor 105, determines a first set of lattice points that are the vertices of the enclosing Delaunay cell. Representations of the lattice points may be stored within the memory 1506. A first enclosing points selection method 2200, which determine the vertices from a remainder-0 vector and a sorting vector, as executed at step 1830, will be described below with reference to FIG. 22. Another enclosing points selection method 2100, which may alternatively be executed at step 1830, will be described below with reference to FIG. 21.

After step 1830, at a second lattice point determining step 1840, the program 1533, under execution of the processor 105, determines a second set of lattice points that are within a predetermined radius of a lattice hole within the enclosing Delaunay cell. In one arrangement, there is no lattice point that is in both the first and seconds sets, so that the second set consists only of lattice points that are not in the first set, thus providing an advantage over using just the first set, and without reprocessing lattice points that are already in the first set. Setting the predetermined search radius controls what database vectors will be retrieved for a given query vector. In particular, lattice points form shells around the hole of a Delaunay cell, each shell being a particular radius from the hole.

Next, at hash code forming step 1850, the program 1533, under execution of the processor 105, uses the lattice points from both the first set of lattice points and the second set of lattice points. For each lattice point in the first set and in the second set of lattice points, a hash code is formed for the lattice point, and the hash code is used to retrieve data associated with the lattice point in the hash table, via the hash code.

Method 1800 then terminates.

Definition of an A* Lattice

A lattice is an infinite set of points in a Euclidean space. An A* lattice, also known as a Permutohedral lattice, may be defined in several ways. For example, the A* lattice may be defined as the dual of an A lattice where a dual lattice is the set of dual lattice points where for each dual lattice point in the dual lattice the dot product between the dual lattice point and each lattice point in the first lattice is an integer. An n-dimensional A lattice may be defined as the set of points in an n+1 dimensional space, that have integer coordinates and where the sum of the coordinates of each point is equal to zero.

Scaled and/or rotated and/or translated versions of a lattice are all deemed to be equivalent, because the scaled and/or rotated and/or translated versions do not change the shape of Voronoi cells or Delaunay cells. Only the size and location of cells are different which may affect the setting of LSH parameters but does not affect the method of LSH in any substantive way.

A definition of an n-dimensional A* lattice is given as $A_n^*$ in Equation (5) as follows:

$$A_n^* = \bigcup_{k=0}^{n} \left\{ (n+1)c + k\mathbf{1} \mid c \in Z^{n+1}, \sum_i c[i] = -k \right\} \quad (5)$$

In Equation (5), 1 represents the n+1 dimensional vector where each coordinate is one (1). Equation (5) shows that $A_n^*$ is the set of points that is the union of n+1 subsets, each with a different k value where k=0, 1, . . . , n. A subset with a particular corresponding k value is defined using a set of c-vectors each c-vector has n+1 integer coordinates that sum to -k. A lattice point in $A_n^*$ is given by (n+1)c+k1, where c is a c-vector with n+1 integer coordinates that sum to -k.

The definition in of the $A_n^*$ lattice in Equation (5) leads to points with n+1 integer coordinates that sum to zero. The $A_n^*$ lattice points are represented in an n+1 dimensional lattice-representation space, but the lattice points fit in an n-dimensional quantisation space that is a subspace of the $\mathbb{R}^{n+1}$ lattice representation space.

Each lattice point is uniquely identified by a corresponding vector c which may be referred to as a c-vector. The sum of the coordinates of c is -k, where k is one of n+1 values, namely zero (0) though to n. A lattice point whose c coordinates sum to -k is referred to as a remainder-k point. Given c, the coordinates of the corresponding lattice point is (n+1)c+k1, which is equal to $(n+1)c - (\Sigma_{i=0}^{n} c[i])\mathbf{1}$.

In one arrangement, lattice points are hashed to access a hash table. A c-vector uniquely identifies a lattice point, $l = (n+1)c - (\Sigma_{i=0}^{n} c[i])\mathbf{1}$. Therefore a hash code for any lattice point is h=f(c), where f is a hash function over arrays of integers.

The Voronoi cells of the lattice points of a lattice define a partitioning of a quantisation space. $A_2^*$ leads to hexagonal cells. The point where a local maximum number Voronoi cells touch is known as a 'hole'. For an $A_n^*$ lattice, the maximum number of touching Voronoi cells is n+1 (c.f. $2^n$ for scalar quantisation). The region that is a set of points that are closest to a hole form a Delaunay cell, which has a lattice point at each vertex. The vertices are exactly the lattice points of the Voronoi cells that touch the hole. The scale of a lattice may be defined via the packing radius of the lattice, which is the radius of the largest ball fully inside a Voronoi cell.

Figure 26:
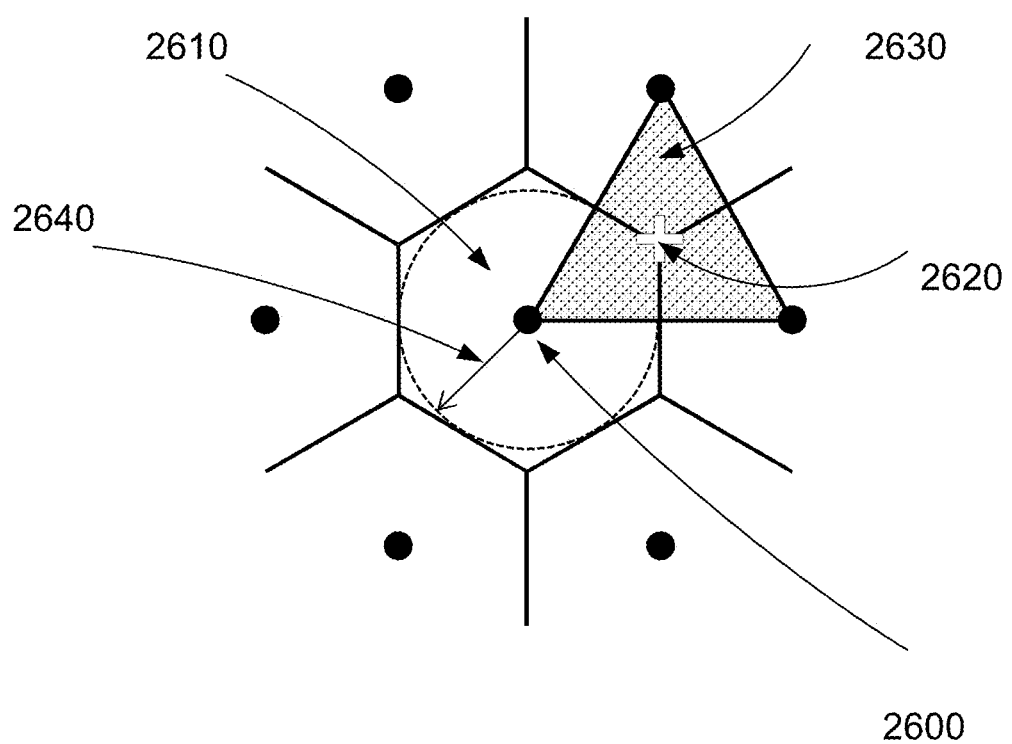
FIG. 26 is a schematic diagram showing conceptual parts of a lattice.

The conceptual parts of a lattice are shown in FIG. 26. FIG. 26 is a diagram of a portion of an $A_2^*$ lattice. FIG. 26 shows a lattice point 2600. The hexagonal region around lattice point 2600 is a corresponding Voronoi cell 2610. FIG. 26 also shows packing radius 2640 and a hole 2620. The shaded region about the hole 2620 is a corresponding Delaunay cell 2630. The Delaunay cell 2630 has three vertices, each vertex is a lattice point, of which lattice point 2600 is one.

In one arrangement, a hash table configured within the memory 1506 may be used to store the relationship between vectors and records. Without loss of generality, each lattice point is identified by a c-vector and each record is identified by a unique indexing number, e.g., 1, 2, 3, . . . . Thus the hash table embodies a function that given a c-vector returns zero or more record index numbers.

Alternatively, the hash table may embody a function from a compressed version of a c-vector to record index numbers, in which case there may be some errors introduced by the compression which are not important to a particular application of the described methods. One form of compression uses a large hash code to represent a c-vector where the large hash code is sufficiently large (e.g., 64 bits) so that the probability is low of inadvertently confusing two or more compressed c-vectors that should be represented distinctly. A subset of the bits of the large hash code may then be used directly as the hash code to access the hash table, and the large hash code may be stored as a compressed version of a c-vector.

Other data-structures may be used to embody the function from c-vector to record index numbers, such as a tree. However, a hash table has a fast lookup speed.

In one arrangement, the relationship between a record and a database vector is recorded by finding the Voronoi cell of an A* lattice that contains a mapped database vector, where the mapped database vector is formed by mapping the database vector into the quantisation space. A method 4100 of finding the Voronoi cell that contains the mapped database vector will now be described with reference to FIG. 41.

The method 4100 may be implemented as one or more software code modules of the software application program 1533 resident on the hard disk drive 1510 and being controlled in its execution by the processor 1505. The method 4100 begins with a input vector step 4110 where an input vector is received by the processor 1505, and where the input vector is a database vector which may be stored with the memory 1506. In step 4110, the input vector is mapped to a mapped input vector in the quantisation space and is representing a feature vector to be matched by query feature vectors subsequently used to query records in a hash table.

Next, at canonical mapping determining step 4120, the program 1533, under execution of the processor 1505, determines a canonical mapping between a canonical Delaunay cell and an enclosing Delaunay cell that encloses the mapped input vector. Each vertex of an A* Delaunay cell is a remainder-k lattice point where k represents an integer number and the value of k is different for each vertex of the Delaunay cell. Step 4120 may represent the canonical mapping in two parts. Part one is a translation from the remainder-0 vertex of a canonical cell, where the remainder-0 vertex is the origin, to the remainder-0 vertex of the enclosing Delaunay cell. Part two is a sorting vector, which is a permutation of the dimensions used to represent the coordinates of lattice points. The method 1900 of determining a remainder-0 vector and a sorting vector for a Delaunay cell that encloses an input vector, as executed at step 4120, will be described below with reference to FIG. 19.

Next, at lattice point determining step 4130, the program 1533, under execution of the processor 1505, determines a set of lattice points that are the vertices of the enclosing Delaunay cell. The enclosing points selection method 2200, which determines the vertices from a remainder-0 vector and a sorting vector, as executed at step 4130, will be described below with reference to FIG. 22. Again, another enclosing points selection method 2100, which may alternatively be executed at step 4130, will be described below with reference to FIG. 21.

Next, at lattice point selection step 4140, a lattice point is selected from the set of lattice points, where the set of lattice points is a complete set of vertices of a Delaunay cell which contains the mapped input vector. The selected lattice point is one that has the smallest distance between the lattice point and the mapped input vector. The method 4100 then terminates, returning the selected lattice point as the one which defines the Voronoi cell that contains the input vector.

The lattice point may be represented as a corresponding c-vector. Next a hash code for the lattice point is formed and the hash table is updated to record the relationship from the lattice point to the records index number. Thus the input record is associated with a Voronoi cell that contains the database vector.

Definition of A* Delaunay Probing and Extended Probing

A* Delaunay probing is a limited form of multi-probe LSH with lattice quantisation and associates a hash code with each A* lattice point. Each database vector is inserted by determining a hash code from a nearest lattice point (i.e. its Voronoi cell). Probes are determined for a query vector by determining which Delaunay cell the query vector is in, probing with the lattice points at the Delaunay cell vertices. A* Delaunay probing may be referred to as 'A* V:D' because A* is used to define the hash function, 'V'oronoi cells are used for the insert process, and the query process uses 'D'elaunay cells to determine the probes to a hash table.

Method to Determine an Enclosing A* Delaunay Cell

Figure 33:
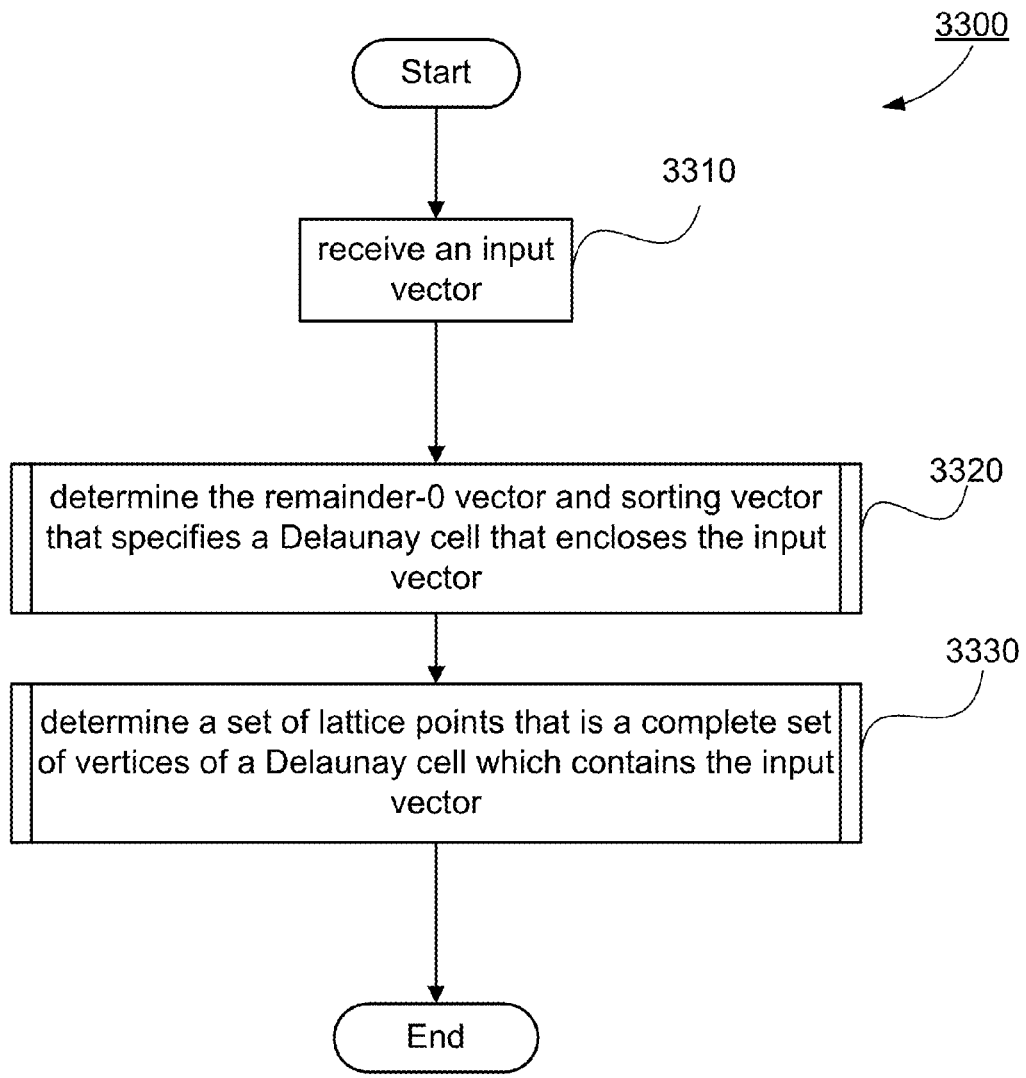
FIG. 33 is a flow diagram showing a method of determining the vertices of a Delaunay cell that contains an input vector.

A method 3300 of determining an A* Delaunay cell which contains an arbitrary input point will now be explained with reference to FIG. 33. The method 3300 may be implemented as one or more software code modules of the software application program 1533 resident on the hard disk drive 1510 and being controlled in its execution by the processor 1505.

The method 3300 determines the vertices of a Delaunay cell that contains a given input vector. The method 3300 provides an efficient algorithm for finding an A* Delaunay cell containing a given input point.

The method 3300 starts at a vector input step 3310, where an input vector that is an arbitrary n-dimensional point, v, is received by the processor 1505. The input vector is a mapped query vector in the quantisation space. Next at lattice point determining step 3320, the processor 1505 determines the remainder-0 lattice point that is a vertex of the enclosing Delaunay cell. Only the c-vector for the remainder-0 lattice point needs to be determined at step 3320. Step 3320 may be implemented using method 1900 which is described in more detail below in relation to FIG. 19. The method 3300 then proceeds to a set determining step 3330, where the program 1533, under execution of the processor 1505, determines a set of lattice points that are the vertices of the Delaunay cell, based on the remainder-0 lattice point and the sorting vector. Step 3330 may be implemented using the method 2100 which will be described in more detail below in relation to FIG. 21. Alternatively, step 3330 may be implemented using method 2200 which will be described in more detail below in relation to FIG. 22.

Figure 19:
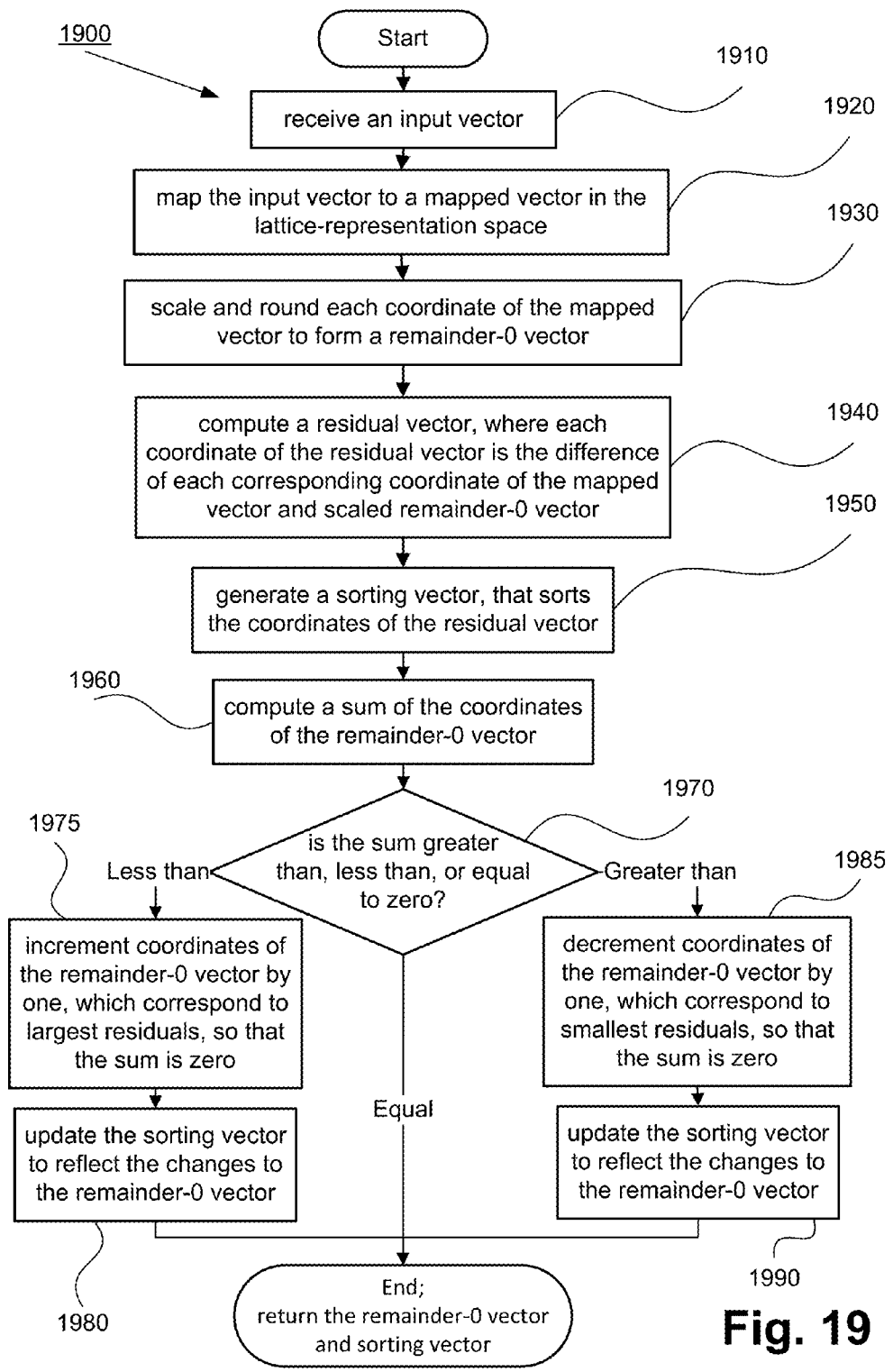
FIG. 19 is a flow diagram showing a method of determining a remainder–0 lattice point and sorting vector that specify a Delaunay cell.
Figure 20:
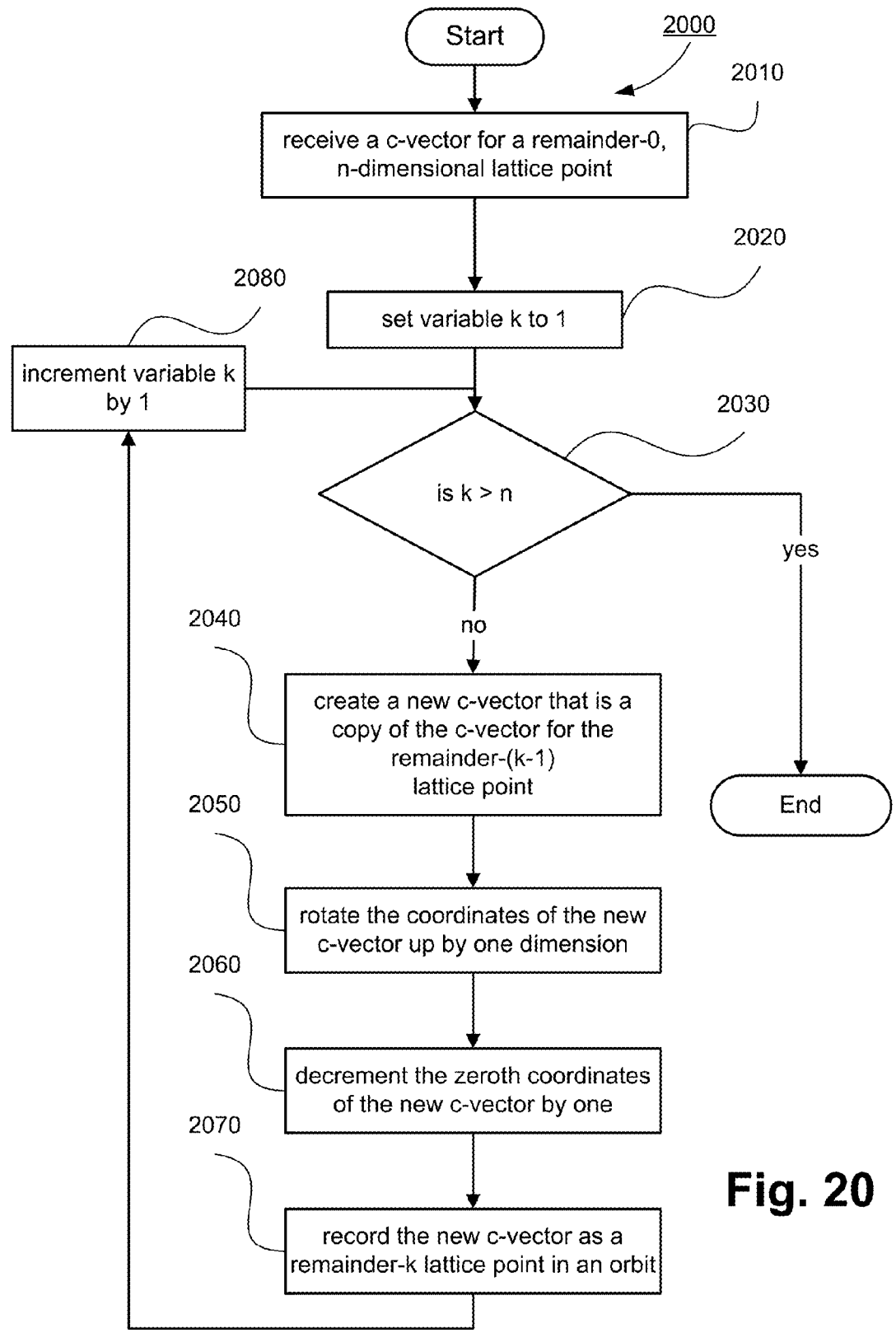
FIG. 20 is a flow diagram showing a method of determining the lattice points in an orbit, given a remainder–0 lattice point in the orbit.
Figure 21:
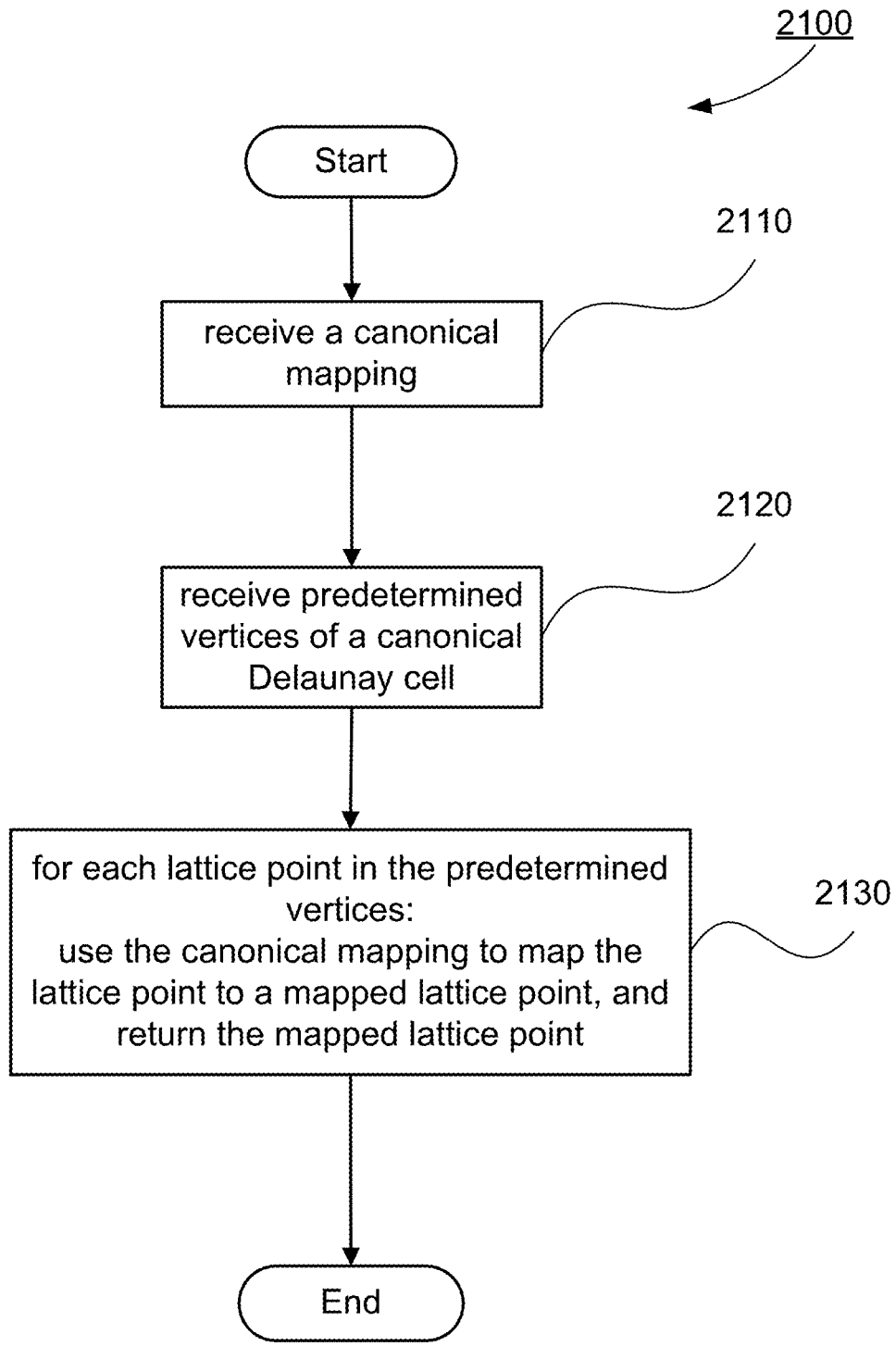
FIG. 21 is a flow diagram showing a method of determining a set of lattice points that are the vertices of a Delaunay cell.
Figure 22:
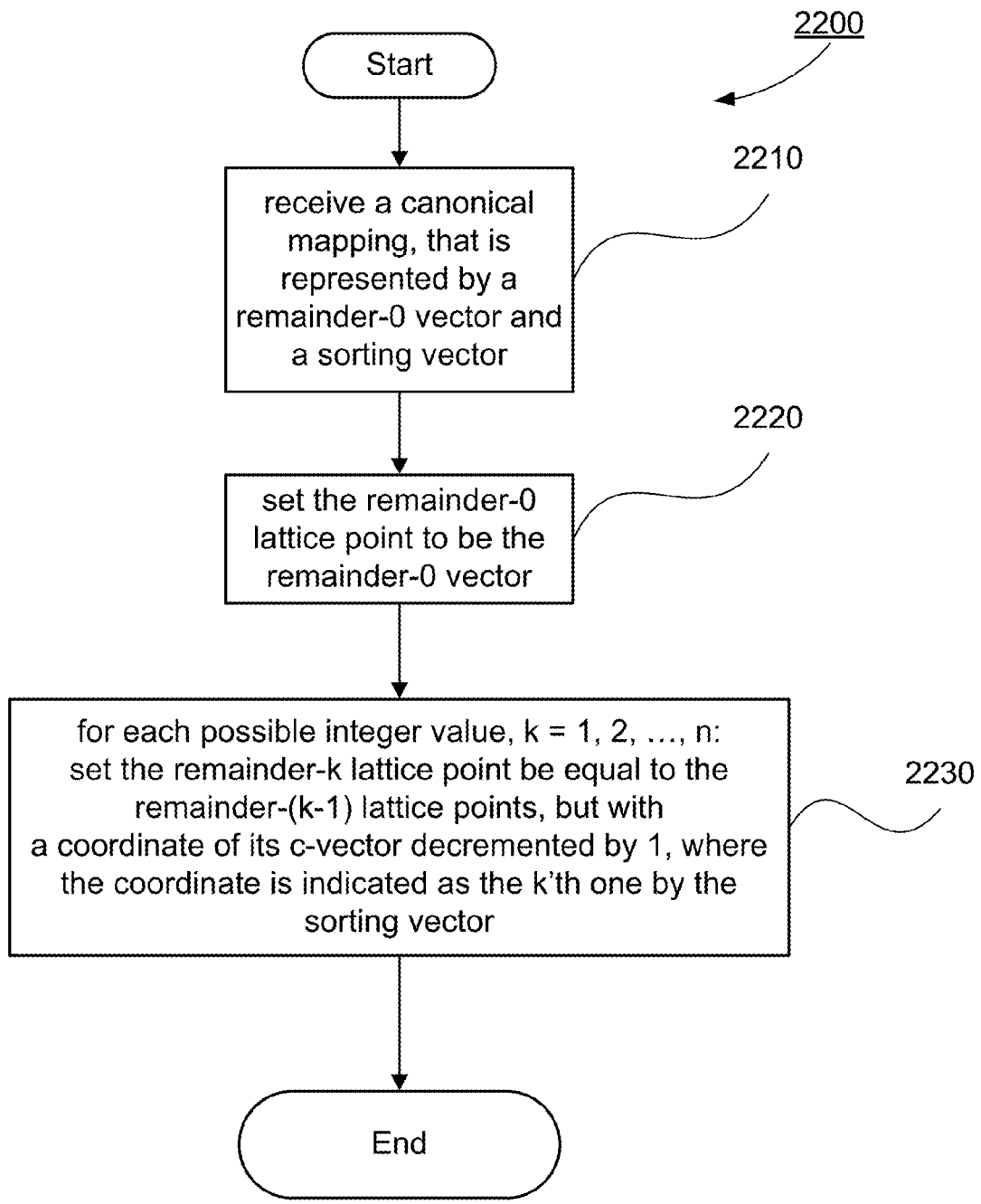
FIG. 22 is a flow diagram showing a method of determining a set of lattice points that are the vertices of the Delaunay cell.
Figure 23:
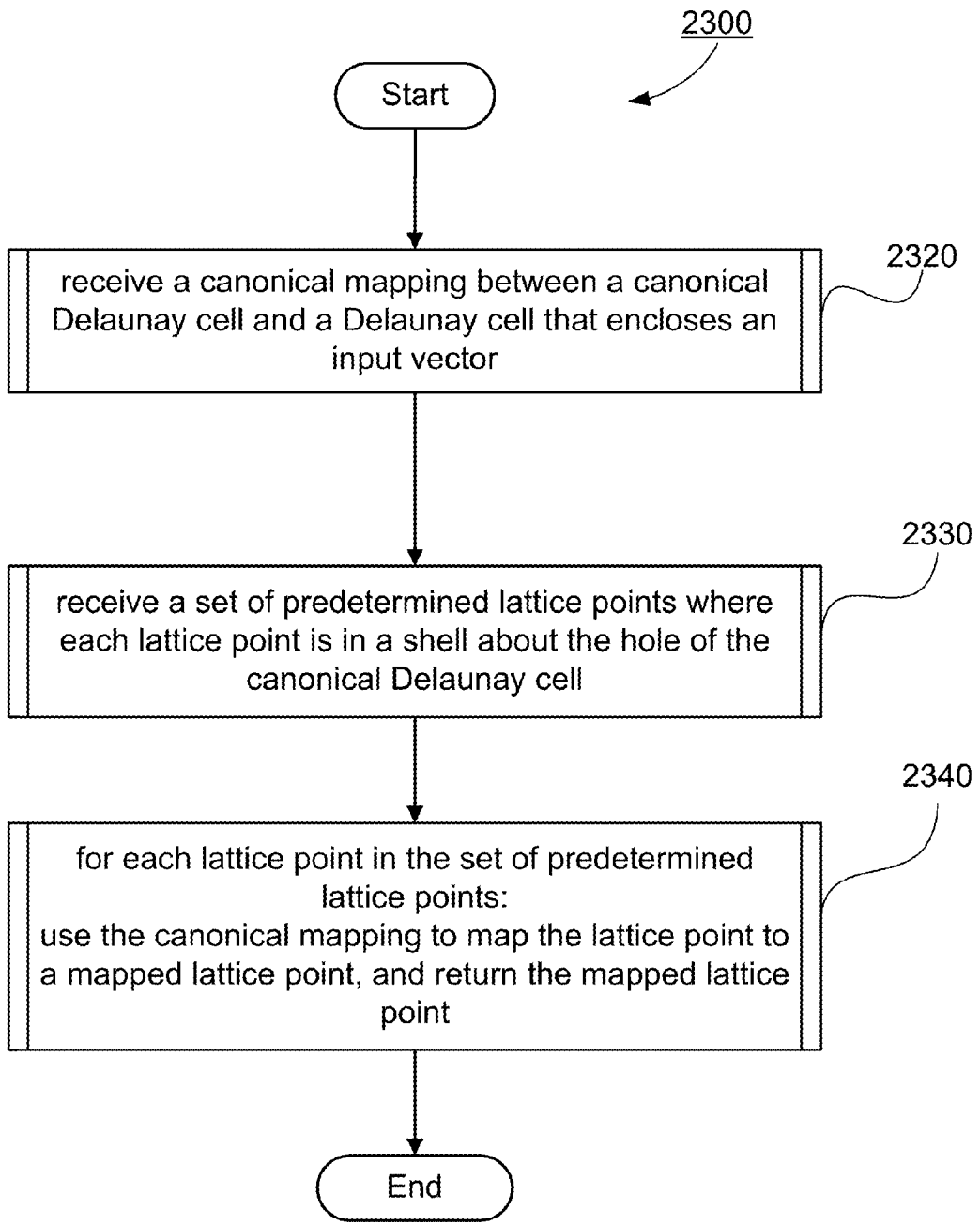
FIG. 23 is a flow diagram showing a method of determining a set of lattice points that are within a predetermined radius of a lattice hole within the Delaunay cell.

Method 1900 of FIG. 19 will now be described with reference to FIG. 19. As stated above the method 1900 determines the remainder-0 lattice point that is a vertex of the enclosing Delaunay cell and a sorting vector that describes how to determine the other remaining n vertices. The sorting vector may be represented as a permutation of the integers zero to n that define an ordering over the n+1 dimensions of the lattice representation space.

First, at input vector step 1910, an n-dimensional input vector v is received by the processor 1505, where the input vector v is a mapped query vector. Next, at mapping step 1920, the program 1533, under execution of the processor 1505, maps the input vector to a mapped vector u so that the mapped vector is in the lattice-representation space, as defined in Equation (5). The mapped vector u will have one more coordinate than the input vector v. The mapping may be done in a variety of ways. In one mapping process, an embedded input vector is formed by concatenating v with a coordinate of value zero (0) and spatially rotating the embedded vector about the origin of the lattice-representation space to form u so that the length of the vector is not altered and the sum of the coordinates of the vector is zero. Step 1920 may be implemented by determining a value s as the sum of the coordinates of the input vector v, and setting the coordinates of the mapped vector u so that $u[n]=-s/\sqrt{n+1}$, and setting coordinate i of the mapped vector, for i=0, 1, ..., n−1, so that $u[i]=v[i]-(s+u[n])/n$.

Next at scaling step 1930, the program 1533, under execution of the processor 1505, scales and rounds each coordinate of the mapped vector u to form a remainder-0 vector. Step 1930 may be implemented by forming an n+1 dimensional vector of integers, $c_0$, where $c_0[i]=\lfloor u[i]/(n+1)+0.5 \rfloor$, for each i=0, 1, ..., n. The vector determined at step 1930 may not be the remainder-0 vector to be returned as the determined vector may not correspond to a true remainder-0 lattice point. At checking step 1970, the method 1900 checks the vector and subsequent steps may correct the vector.

Next at residual vector determining step 1940, the processor 1505, under execution of the processor 1505, determines a residual vector x, where each coordinate of the residual vector x is the difference of each corresponding coordinate of the mapped vector u and scaled remainder-0 vector $c_0$. Thus, $x[i]=u[i]-(n+1)c_0[i]$, for each i=0, 1, ..., n.

Next, at sorting step 1950, the program 1533, under execution of the processor 1505, generates a sorting vector, that sorts the coordinates of the residual vector. Let p be the resulting sorting vector for residual vector x, then given two dimensions and i and j such that i<j then the sorting vector p ensures that $x[p[i]] \leq x[p[j]]$.

Next, at sum determining step 1960, the program 1533, under execution of the processor 1505, determines the sum, h, of the coordinates of the remainder-0 vector. step 1960 is performed to prepare for a subsequent check to determine if the remainder-0 vector corresponds to a true remainder-0 lattice point. Let h be the sum of the coordinates of the remainder-0 vector, i.e., $h=\Sigma_{i=0}^{n} c_0[i]$.

At checking step 1970, the program 1533, under execution of the processor 1505, tests the sum, h, of the coordinates of the remainder-0 vector. If h is less than zero then control is transferred to step 1975; if h is more than zero then control is transferred to step 1985, if h=0, then no adjustment is required and the method 1900 concludes.

In summing step 1975, the program 1533, under execution of the processor 1505, the coordinates of the remainder-0 vector sum to less than zero and need to be adjusted so that the sum of the coordinates is zero. Step 1975 may be implemented by incrementing a number of coordinates by one; the required number of coordinates is −h. Step 1975 increments coordinates of the remainder-0 vector by one, which correspond to the larger residuals, so that the sum is zero. The coordinates are those indicated by the sorting vector, namely p[i], for i=n+h+1, n+h+2, ..., n. Control is then passed to updating step 1980, where the program 1533, under execution of the processor 1505, updates the sorting vector to reflect the changes to the remainder-0 vector. Updating the sorting vector may be achieved by determining the residual vector (as per step 1940), and regenerating the sorting vector (as per step 1950). Alternatively, step 1980 may be implemented by rotating the coordinates of the sorting vector up by −h dimensions. The method 1900 then concludes.

At decrementing step 1985, the coordinates of the remainder-0 vector sum to more than zero and need to be adjusted so that the sum of the coordinates is zero. Step 1985 may be implemented by decrementing a number of coordinates by one; the required number of coordinates is h. At step 1985, the program 1533, under execution of the processor 1505, decrements coordinates of the remainder-0 vector by one, which correspond to the smaller residuals, so that the sum is zero. The coordinates are those indicated by the sorting vector, namely p[i], for i=0, 1, ..., h−1. Control is then passed to step 1990, where the program 1533, under execution of the processor 1505, updates the sorting vector to reflect the changes to the remainder-0 vector. Updating the sorting vector may be implemented by recomputing the residual vector (as per step 1940), and regenerating the sorting vector (as per step 1950). Alternatively, at step 1990, the coordinates of the sorting vector may be rotated down by h dimensions and the method 1900 concludes. The method 1900 yields the remainder-0 vector and the sorting vector which may be stored within the memory 1506.

The step 1830 of method 1800, the step 3330 of method 3300 and the step 4130 of method 4100 each require a set of lattice points that are the vertices of a Delaunay cell when the Delaunay cell is represented by a remainder-0 vector and a sorting vector, to be determined. Such a requirement may be satisfied by the method 2200 which is a method to determine a set of lattice points that are the vertices of a Delaunay cell when the Delaunay cell is represented by a remainder-0 vector and a sorting vector. The method 2200 will now be described in relation to FIG. 22. The method 2200 may be implemented as one or more software code modules of the software application program 1533 resident on the hard disk drive 1510 and being controlled in its execution by the processor 1505.

The method 2200 may return n+1 lattice points which are the remainder-0, remainder-1, ..., remainder-n lattice points that form the vertices of a Delaunay cell.

The method 2200 begins at a first receiving step 2220, where the processor 1505 receives a remainder-0 vector (which is an n+1 dimensional vector with integer coordinates that sum to zero) and a sorting vector, p, which is an n+1 dimensional vector that is a permutation of the integers zero to n. The combination of remainder-0 vector and the sorting vector constitute a canonical mapping between the Delaunay cell and a canonical Delaunay cell.

Then at setting step 2220, the program 1533, under execution of the processor 1505, sets the remainder-0 lattice point to the given remainder-0 vector before step 2230 generates the remaining lattice points by looping n times, with a loop variable k running through the sequence 1, 2, ..., n. For each iteration of the loop, step 2230 sets the remainder-k lattice point to the remainder-(k−1) lattice points, but with a coordinate decremented by one (1), where the coordinate is indicated as the kth one by the sorting vector. In other words, first set the c-vector of the remainder-k lattice point be equal to the c-vector of the remainder-(k−1) lattice point, then the coordinate p[k−1] of the c-vector of the remainder-k lattice point is decremented by one.

The method 2200 concludes where the required lattice points have been determined and may be stored within the memory 1506.

The method 2100 is an alternative to the method 2200. The method 2100 may be executed at step 1830 of method 1800, and the step 3330 of method 3300 and the step 4130 of method 4100 which each require a set of lattice points that are the vertices of a Delaunay cell when the Delaunay cell is represented by a remainder-0 vector and a sorting vector to be determined. The method 2100 will now be described in relation to FIG. 21. The method 2100 may be implemented as one or more software code modules of the software application program 1533 resident on the hard disk drive 1510 and being controlled in its execution by the processor 1505.

The method 2100 starts at canonical mapping step 2110, where a canonical mapping is received by the processor 1505 and may be stored within the memory 1906. The canonical mapping received at step 2110 may be determined using method 1900 with reference to FIG. 19.

Then at receiving step 2120, the program 1533, under execution of the processor 1505, receives predetermined vertices of a canonical Delaunay cell. The predetermined vertices may be determined using step 2230 of the method 2200 (shown on FIG. 22 and described above) with the remainder-0 lattice point set to the origin of the lattice-representation space, and with the sorting vector set to $(0, 1, 2, \ldots, n)$. Next at mapping step 2230, where for each lattice point in the predetermined vertices: the canonical mapping is used to map the lattice point to a mapped lattice point, the mapped lattice points being returned as a result. The mapped lattice points may be stored by the processor 1505 in the memory 1506. The application of the canonical mapping may be the same as step 2340 of method 2300 described below. The method 2100 concludes following step 2130.

As described above, step 1840 of method 1800 may be performed using a method 2300 of determining a set of lattice points that are within a predetermined radius of a lattice hole within the Delaunay cell. The method 2300 will now be described with reference to FIG. 23. The method 2300 may be implemented as one or more software code modules of the software application program 1533 resident on the hard disk drive 1510 and being controlled in its execution by the processor 1505. The method 2300 begins with a receiving step 2320, where the processor 105 receives a canonical mapping between a canonical Delaunay cell and a Delaunay cell that encloses an input vector. The canonical mapping may be represented by a remainder-0 vector $c_0$ and a sorting vector p, as determined using the method 1900.

Next, at step 2330, a set of predetermined lattice points where each lattice point is in a shell about the hole of the canonical Delaunay cell is received by the processor 1505. a The set of predetermined lattice points received at step 2330 may be determined using method 2500 which will be described below with reference to FIG. 25.

Next, processing step 2340, the program 1533, under execution of the processor 1505, processes each predetermined lattice point of the a set of predetermined lattice points. For each predetermined lattice point in the set of predetermined lattice points, step 2340 uses the canonical mapping to map the predetermined lattice point to a mapped lattice point.

Each predetermined lattice point may be represented as a c-vector, y. If the canonical mapping is represented by a remainder-0 vector $c_0$ and a sorting vector p, then step 2340 may be implemented by calculating the mapped lattice point c-vector, c, using $c[p[i]] = c_0[p[i]] + y[i]$, for each value of $i = 0, 1, 2, \ldots, n$.

The set of predetermined lattice points may be determined offline, before the set of predetermined lattice points are required by the method 2300. Alternatively, the set of predetermined lattice points may be determined dynamically as the need arises.

The method 2300 concludes and the mapped lattice points produced by step 2340 are provided as a set of lattice points that are within a predetermined radius of a lattice hole within the Delaunay cell that encloses an input vector.

Method to Determine Canonical Probes

In method 1800, step 1840 provides the ability to include extra probes, beyond the vertices of a Delaunay cell that encloses a query vector. In one arrangement, the 'A* V:D' may be implemented using method 1800 with step 1840 omitted. The extra probes form extended shells of lattice points where the lattice points of a shell are equidistant from a hole of the Delaunay cell. The extra probes are formed by method 2300 which uses a set of predetermined lattice points where each lattice point is in a shell about the hole of the canonical Delaunay cell. A set of predetermined lattice points where each lattice point is in a shell about the hole of the canonical Delaunay cell is referred to as the 'canonical probes'.

The number of extended shells to use may need to be determined. The notation E0 may be used below to indicate no extended shells, E1 to indicate one extended shell and so on. Thus, the arrangement described with reference to FIGS. 18, 19, 20, 21, 23, 25, 33, 41 and 42 may be called A* V:Ee where 'V' indicates that database vectors are associated with a Voronoi cell and Ee indicates that a query vector uses e extended shells in a query. A method 2500 of determining the canonical probes for e extended shells will now be described in relation to FIG. 25. The method 2500 may be implemented as one or more software code modules of the software application program 1533 resident on the hard disk drive 1510 and being controlled in its execution by the processor 1505.

The method 2500 determines canonical probes for e extended shells for a quantisation space of n dimensions.

An A* Delaunay cell may be fully specified by a sorting vector p and a remainder-0 point $c_0$. For the canonical Delaunay cell, p is the identity permutation and $c_0 = 0$ (corresponding to the origin of the quantisation space). The sorting vector p will specify an order of dimensions. The method 2500 to determine the canonical probes is based on a search starting from the lattice points forming the zeroth shell about the canonical Delaunay cell (i.e. the zeroth canonical shell comprises the vertices of the canonical Delaunay cell).

The search is kept simple by noting that when a remainder-0 lattice point, $l = (n+1)c$, is known to be in a particular shell, then n other remainder-k lattice points in the same shell can be computed, with $k = 1, 2, \ldots, n$. A set of n+1 lattice points that are related in this way may be referred to as an 'orbit'. An orbit contains n+1 lattice points, each lattice point of the orbit has a different remainder value, and each lattice point in the orbit is the same distance from the hole in the canonical Delaunay cell.

Figure 42:
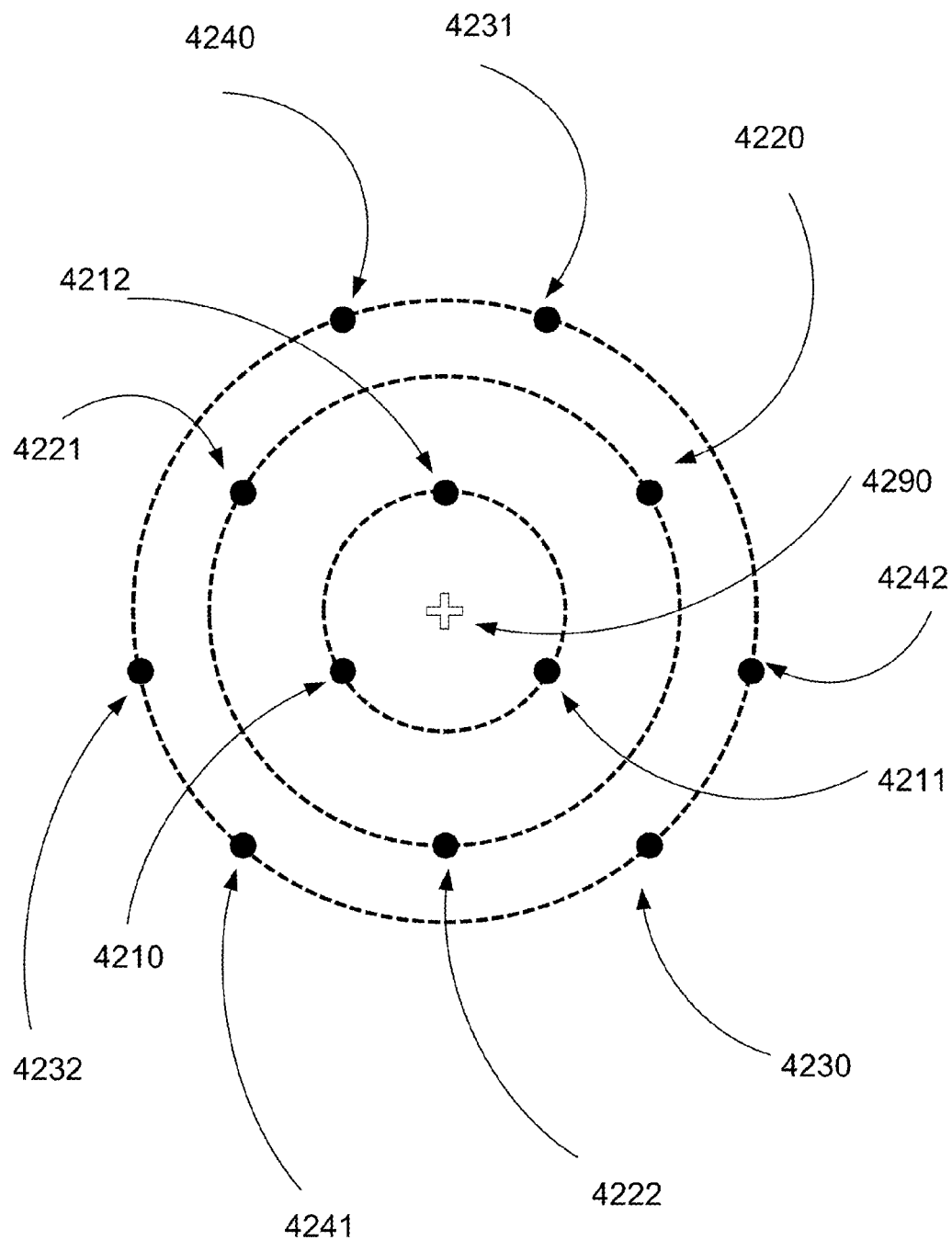
FIG. 42 shows four example orbits of an $A_2^*$ lattice arranged in three shells about a canonical hole.

FIG. 42 shows four example orbits for dimensionality n=2. FIG. 42 shows a portion of an $A_2$* lattice where a hole 4290 is a hole of the canonical Delaunay cell. Lattice point 4210 is a remainder zero lattice point in the zeroth extended shell, and therefore lattice point 4210 is the origin of the lattice representation space. The orbit containing lattice point 4210 also contains remainder-1 lattice point 4211 and remainder-2 lattice point 4212. Lattice point 4220 is a remainder zero lattice point in the first extended shell. The orbit containing lattice point 4220 also contains remainder-1 lattice point 4221 and remainder-2 lattice point 4222. Lattice point 4230 is a remainder zero lattice point in the second extended shell. The orbit containing lattice point 4230 also contains remainder-1 lattice point 4231 and remainder-2 lattice point 4232. Lattice point 4240 is another remainder zero lattice point in the second extended shell. The orbit containing lattice point 4240 also contains remainder-1 lattice point 4241 and remainder-2 lattice point 4242.

The c-vectors of lattice points in an orbit are related in that the c-vector for the remainder-(k+1) lattice point may be determined from the c-vector for the remainder-k lattice point by rotating the coordinates up by one and then decrementing the zeroth coordinate. The described orbit may be used to efficiently find all lattice points in a shell by first finding all remainder-0 points of the shell. Remainder-0 points are lattice points corresponding to vectors $c \in \mathbb{Z}^{n+1}$ where $\Sigma_{i=0}^{n} c[i] = 0$. In the zeroth shell, there is only one such point, namely $c=0$.

Identifying lattice points in a shell is based on knowing the radius of the shell. The ith coordinate of the canonical hole is $(2i-n)/2$. From the formula of the ith coordinate of the canonical hole and Equation (5), it can be shown that the squared distance for a remainder-0 point is an increasing affine function of $s(c)$, where $$s(c) = \frac{n+1}{2} \sum_{i=0}^{n} c[i]^2 - \sum_{i=0}^{n} i c[i].$$

Thus, the function $s(c)$ returns an integer that is unique to each shell which contains a remainder-0 lattice point represented by c. In other words, if $s(c_a)=s(c_b)$ and both $c_a$ and $c_b$ represent remainder-0 lattice points then $c_a$ and $c_b$ are in the same shell. Therefore the function s may be used to aid a search for shells of lattice points. Concentrating the search on vectors $c \in \mathbb{Z}^{n+1}$ where $\Sigma_i c[i]=0$ implies that lattice points in neighbouring shells will differ in exactly two coordinates of their c-vectors, where one is incremented by one (1) and another decremented by one (1).

Figure 25:
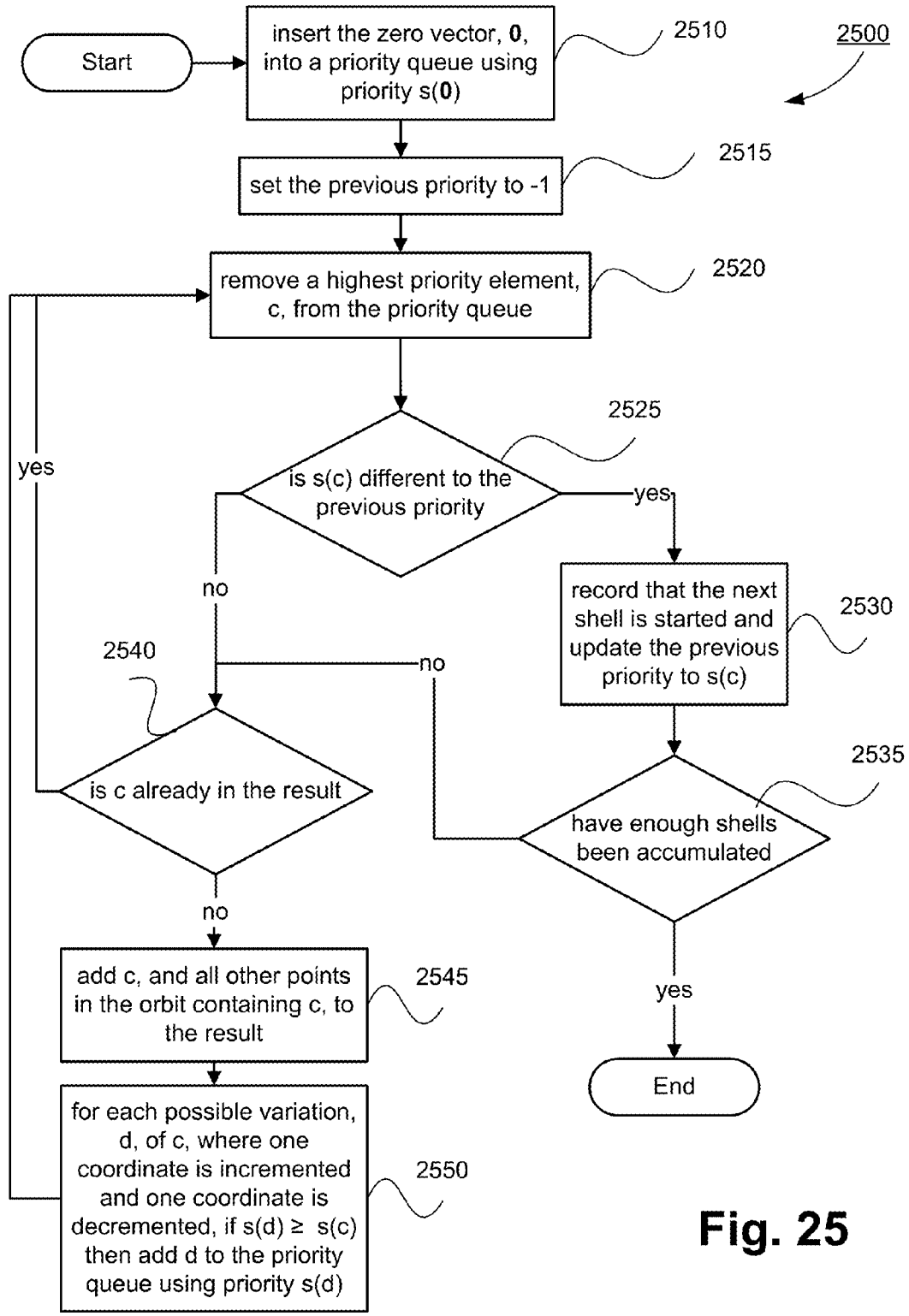
FIG. 25 is a flow diagram showing a method of determining a set of lattice points where each lattice point is in a shell about the hole of a canonical Delaunay cell.

Search method 2500 shown in FIG. 25 may be used to determine the canonical probes for c extended shells in n dimensions. The method 2500 may be implemented as one or more software code modules of the software application program 1533 resident on the hard disk drive 1510 and being controlled in its execution by the processor 1505.

The method 2500 starts at inserting step 2510, where the program 1533, under execution of the processor 1505, inserts the zero vector, $\theta$, into a priority queue using priority $s(\theta)$. Step 2510 initialises the priority queue with the $\theta$ probe of the zeroth shell. The queue has priorities which are determined for an entry c using $s(c)$. Lower values of $s(c)$ are interpreted as higher priorities. Tied priorities require no special treatment. $s(c)$ may be quickly determined using integer arithmetic by delaying the division operation.

Next at initialising step 2515, the program 1533, under execution of the processor 1505, initializes variables t and m each to −1. Variable t records the previous priority thus keeping track of the current shell identifier, as calculated by $s(c)$. Variable m records the number of shells (excluding the zeroth shell) collected in a result buffer which is initially empty. The result buffer may be configured within memory 1506.

Next, at removing step 2520, the program 1533, under execution of the processor 1505, removes a highest priority element, c, from the priority queue. The element c is then checked at step 2525. In step 2525, if $s(c) \neq t$ (where t is the previous priority), then a new shell is about to start and so control is passed to step 2530, otherwise control is passed to 2540. At step 2530, the processor 1505 records that the next shell is started by incrementing m, and also updates the variable that records the previous priority by setting t to $s(c)$. Control is then passed to step 2535. At step 2535, the program 1533, under execution of the processor 1505, checks whether enough shells have been accumulated. That is, if $m>e$, then enough shells have been accumulated, so the method 1000 terminates by returning the result buffer configured within memory 1506. Otherwise if $m \leq e$, then control is passed to step 2540.

At checking step 2540, the highest priority element, c, that was removed from the priority queue in step 2520 is checked to determine if the highest priority element, c, is already in the result buffer. If the highest priority element, c, is already in the result buffer, then the highest priority element, c, is ignored and control is passed back to step 2520 where the next element in the priority query will be processed. If c was not in the results buffer, then control is passed to step 2545.

At adding step 2545, the program 1533, under execution of the processor 1505 adds c, and all other lattice points in the orbit containing c, to the result buffer configured within memory 1506. The lattice points of the orbit may be determined using method 2000 which will now be explained with reference to FIG. 20.

The method 2000 may be implemented as one or more software code modules of the software application program 1533 resident on the hard disk drive 1510 and being controlled in its execution by the processor 1505. The method 2000 determines a set of lattice points that are in the orbit containing a given remainder-0 lattice point.

The method 2000 begins at receiving step 2010, where the processor 1505, receives a c-vector that represents a remainder-0 lattice point in an n-dimensional quantisation space. Next is a loop with a loop variable k with values 1, 2, ..., n. At initialising step 2020 the program 1533, under execution of the processor 1505, initialises loop variable k to 1 followed by step 2030 which tests the loop variable k. In step 2030 if loop variable $k>n$ then the method 2000 terminates. Otherwise control is passed to step 2040 which is the start of the body of the loop. At creation step 2040 a new c-vector is created that is a copy of the c-vector for the remainder-(k−1) lattice point. Next, at rotating step 2050, the program 1533, under execution of the processor 1505, rotates the coordinates of the new c-vector up by one dimension. Next, at decrementing step 2060, the program 1533 decrements the zeroth coordinate of the new c-vector by one. Next, at recording step 2070, the program 1533 records the new c-vector as a remainder-k lattice point in the orbit of the given remainder-0 lattice point. After step 2070, step 2080 prepares the loop variable for the next pass by incrementing the loop variable k by one (1), and control is passed back to step 2030.

Returning back to method 2500, after step 2545 is step 2550. Step 2550 searches for possible other remainder-0 lattice points that are either in the same shell as the current shell or are in shells beyond the current shell. A double loop may be used to generate all distinct possible pairs of coordinates (0,1),(0,2), ..., (n−1,n). For a particular possible pair of coordinates (i,j) a possible variation d of c from step 2545 is given by first copying c to d, then incrementing d[i] and decrementing d[j]. The variation d may or may not be in a shell with a radius≥the shell containing c, so the variation d is checked. If $s(d) \geq s(c)$ then the variation d is added to the priority queue with priority $s(d)$.

After step 2550 processes all possible pairs of coordinates, control is then passed back to step 2520 to process the next element in the priority queue.

Figure 27:
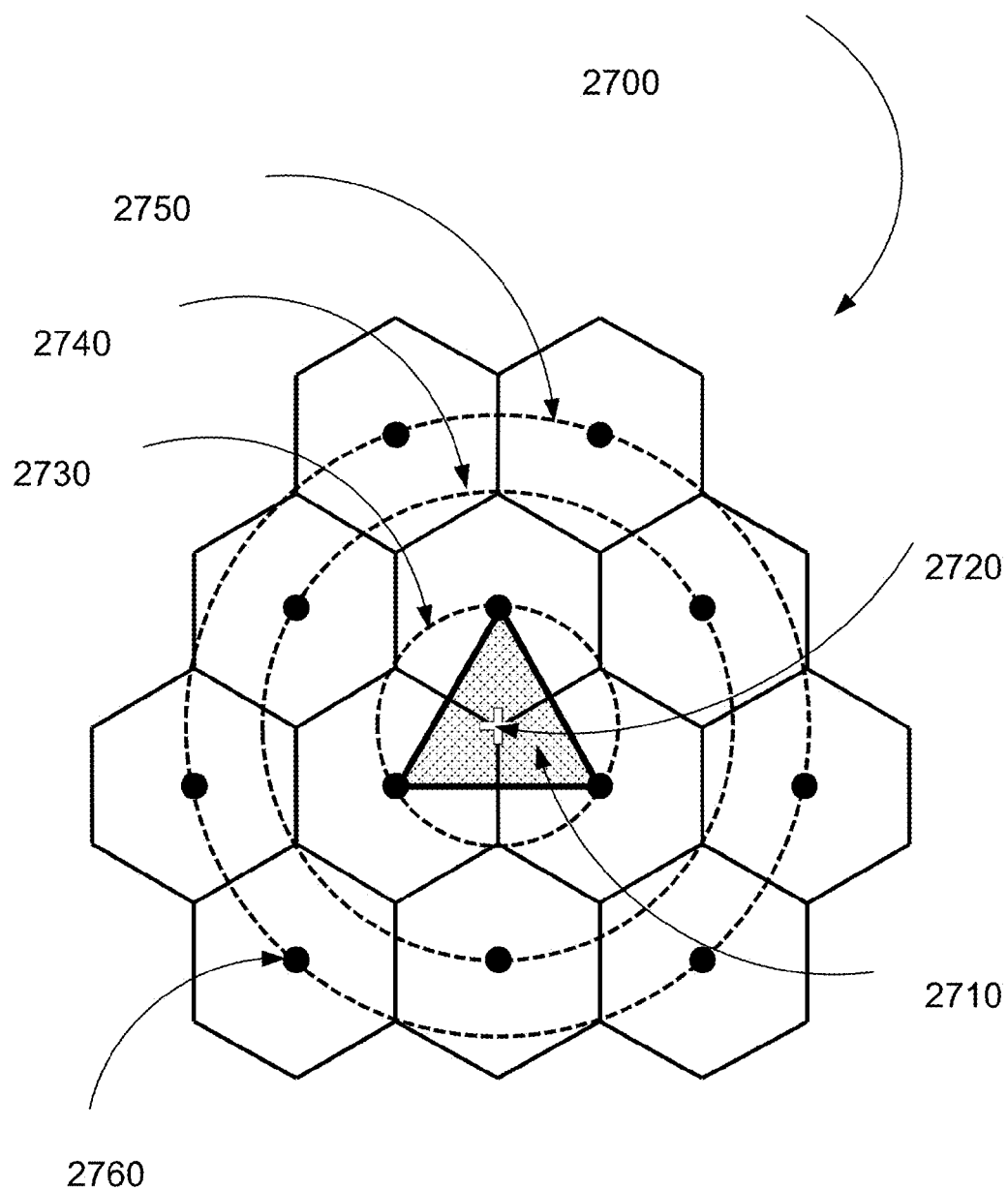
FIG. 27 is a schematic diagram illustrating a volume of quantisation space accessed by a query according to one arrangement.

In the arrangement described above with reference to FIGS. 18, 19, 20, 21, 22, 23, 25, 33, 41 and 42, the partitioning lattice is A*, 'V'oronoi cells are used for insertion, and the probe points are the 'E'xtended shells beyond a Delaunay cell containing the query vector, Such a lattice-hashing technique may be referred to as 'A* V:E'. An example of the volume of quantisation space accessed by A* V:E is shown in FIG. 27. FIG. 27 shows a volume of quantisation space accessed by a query according to A* V:E where the dimensionality (n) is two, and the number of extended shells (e) is two. In the example of FIG. 27, any query vector that is contained in the Delaunay cell 2710 will generate hash probes corresponding to the shown lattice points, including lattice point 2760. The zeroth shell 2730 contains three (3) lattice points, the first extended shell 2740 contains three lattice points, and the second extended shell 2750 contains six (6) lattice points. The volume of quantisation space 2700 accessed by a query in 2710 is the union of the Voronoi cells for all the twelve shown lattice points. The shells are each centred on the hole 2720 of the Delaunay cell 2710.

In another arrangement described below with reference to FIG. 24, a variation of the method 1800 may be used to retrieve records associated with feature vectors located within a predetermined search radius of a query vector. In such an arrangement, a query vector is received, and a canonical mapping is determined using the method 1900 described above in relation to FIG. 19. The canonical mapping is represented by a remainder–0 vector and a sorting vector.

Figure 24:
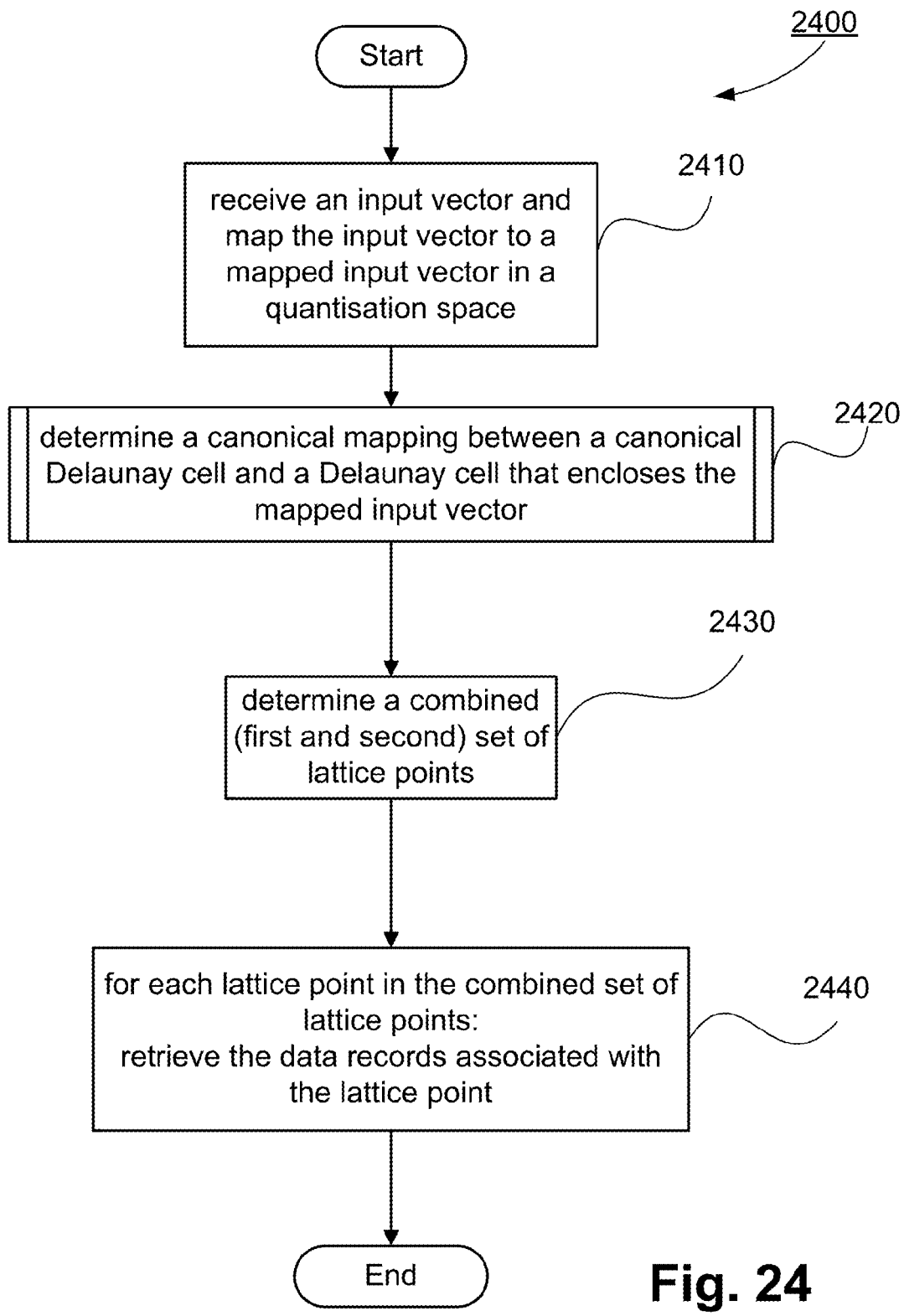
FIG. 24 is a flow diagram showing a method of retrieving feature vectors located within a predetermined search radius.

In the arrangement of FIG. 24, step 1830 and step 1840 of the method 1800 may be combined as the results of steps 1830 and 1840 are latter combined in step 1850. In combining the results of steps 1830 and 1840, step 1830 is performed using method 2100 and step 1840 is performed using method 2300, in which case both methods 2100 and 2300 start with 'receive a canonical mapping' (steps 2110 and 2320) and followed by 'receive a set of predetermined lattice points . . .' (steps 2120 and 2330) then 'for each lattice point in the set of predetermined lattice points: use the canonical mapping to map the lattice point to a mapped lattice point, and return the mapped lattice point' (steps 2130 and 2340). The difference between the method 2100 and method 2300 is a difference between steps 2120 and 2330 which each receive a different set of predetermined lattice points. Thus the two sets of predetermined lattice points may be pre-combined to optimise the query process. The combined predetermined lattice points may be referred to as the canonical probes. The canonical probes may be transformed in a step in the query process, using the canonical mapping, to generate the actual probes used for the query.

Thus in the arrangement of FIG. 24, a method 2400 may be used to retrieve records associated with feature vectors located within a predetermined search radius of a query vector. The method 2400 of retrieving feature vectors located within a predetermined search radius will now be described with reference to FIG. 24. The method 2400 may be implemented as one or more software code modules of the software application program 1533 resident on the hard disk drive 1510 and being controlled in its execution by the processor 1505.

The method 2400 starts with a step 2410, where an input vector is received by the processor 1505, and where the input vector is a mapped query vector in the quantisation space and represents a feature vector to be matched by feature vectors previously used to store records in a hash table.

Next, at a canonical mapping step 2420, the program 1533, under execution of the processor 1505, determines a canonical mapping between a canonical Delaunay cell and an enclosing Delaunay cell that encloses the input vector. Each vertex of an A* Delaunay cell is a remainder-k lattice point where k represents an integer number and the value of k is different for each vertex of the Delaunay cell. The step 2420 may represent the canonical mapping in two parts. Part one is a translation from the remainder–0 vertex of a canonical cell, where the remainder–0 vertex is the origin, to the remainder–0 vertex of the enclosing Delaunay cell. Part two is a sorting vector, which is a permutation of the dimensions used to represent the coordinates of lattice points. The method 1900 of determining a remainder–0 vector and a sorting vector for a Delaunay cell that encloses an input vector was described above with reference to FIG. 19.

Next, at determining step 2430, the program 1533, under execution of the processor 1505, determines a combined (first and second) set of lattice points where the first set of lattice points are vertices of a Delaunay cell that encloses the mapped input vector and the second set of lattice points that are within a predetermined radius of a lattice hole within the enclosing Delaunay cell. The combined set of lattice points may be determined using method 2500 to determine canonical probes. Each canonical probe may be represented as a c-vector, y. If the canonical mapping is represented by a remainder–0 vector $c_0$ and a sorting vector p, then step 2430 may be implemented by calculating a lattice point c-vector, c, for each canonical probe using c[p[i]]=$c_0$[p[i]]+y[i], for each value of i=0, 1, 2, . . . , n.

Next, at step 2440, the program 1533, under execution of the processor 1505, uses the lattice points from the combined (first and second) set of lattice points. For each lattice point in the combined set of lattice points, a hash code is formed for the lattice point, and the hash code is used to retrieve data associated with the lattice point in the hash table, via the hash code.

The method 2400 concludes following step 2400.

In another arrangement described below with reference to FIG. 28, 'D'elaunay cells may be used for insertion and the probe points may be the 'E'xtended shells beyond the query Delaunay cell. Such a lattice-hashing arrangement may be referred to as 'A* D:E'.

The advantage of using Delaunay cells to partition the quantisation space instead of Voronoi cells is that unions of Delaunay cells may better approximate an ideal ball query volume.

Figure 28:
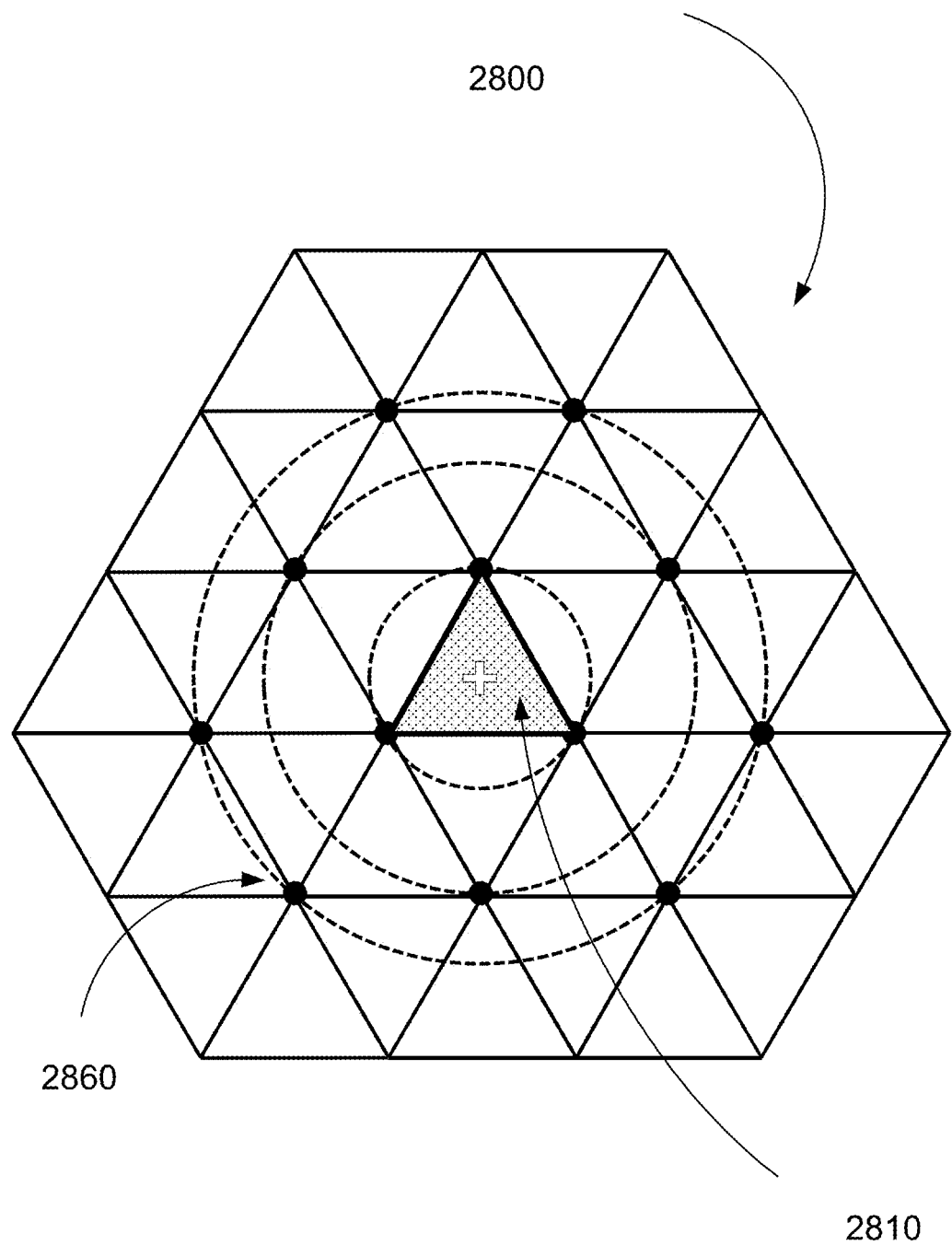
FIG. 28 is a schematic diagram showing a volume of quantisation space accessed by a query according to another arrangement.

An example of the volume of quantisation space accessed by A* D:E is shown in FIG. 28. FIG. 28 shows a volume of quantisation space accessed by a query according to A* D:E where the dimensionality (n) is two, and the number of extended shells (e) is two. In the example of FIG. 28, any query vector that is contained in the Delaunay cell 2810 will generate hash probes corresponding to the shown lattice points, including lattice point 2860. The volume of quantisation space 2800 accessed by a query in the cell 1310 is the union of the Delaunay cells which have a vertex in one of the shells (i.e., one of the twelve shown lattice points).

The difficulty of storing database records with Delaunay cells is that the number of required probes in high dimensional spaces is potentially extremely large. However, the number of probes may be kept feasible by using n+1 hash tables, where the dimensionality of the quantisation space is n.

Multi-probe LSH need not be restricted to a single hash table. In general, varying the number of probes and number of hash tables allows varying the trade-off between time and space. A* D:E permits an extremely efficient case using n+1 hash tables.

When a database vector is received, the vertices of the enclosing Delaunay cell are determined using method 3300. Each vertex is a different remainder-k lattice point with a value k that is either 0, 1, 2, . . . , n. The data record associated with the database point is inserted into the kth hash table using $h_k$=$f(c_k)$ corresponding to each remainder-k lattice point.

In the arrangement described with reference to FIG. 28, when a query vector is received, the method 1800 or 2400 is used to determine the probes. Each probe corresponds to a remainder-k lattice point with a value k that is either 0, 1, 2, . . . , n, and so is used to probe the hash table with the matching k value, which results in retrieving all records associated with Delaunay cells that touch the probe points. The results determined using the arrangement described with reference to FIG. 28 may contain duplicated records which may be eliminated using standard methods for removing duplicate records.

It is also possible to use less than n=1 hash tables using a hash table for more than one value of k, however the number of hash collisions may be increased.

In another arrangement, the number of probes may be dynamically changed in response to a given query vector. Probes in shells may be utilised in shell order starting from shell zero, then extended shell one (1), and so on. The probes may be utilised in an orderly process until a stopping condition is met. Stopping conditions may include: a predetermined number of probes being performed, a predetermined number of candidate records being retrieved, or the result is known with sufficient confidence using a measure of confidence.

The methods described above with reference to FIGS. 18, 19, 20, 21, 22, 23, 24, 25, 33, 41 and 42, will now be described by way of a specific example. The example uses $A_2$* V:E1 which is A* V:E where n=3 and e=1. The example uses the identity function for mapping database vectors and query vectors into the quantization space, thus feature vectors and mapped feature vectors have three (3) dimensions. Therefore the lattice representation space has four (4) dimensions and c-vectors have four (4) dimensions. The present example uses a hash function $f(c)=(\Sigma_{i=0}{}^n 31^i c[i])\bmod 2^{64}$.

Insertion

The present example receives a record 123 associated with database vector (3.2,6.5,2.9) which is passed to the method 4100. Step 4110 is performed to form a mapped input vector (3.2,6.5,2.9). Next step 4120 is performed to determine a canonical mapping between a canonical Delaunay cell and a Delaunay cell that encloses the mapped input vector. In the present example, step 4120 is implemented by performing the steps of the method 1900.

In the present example, the method 1900 starts with step 1910 that receives an input vector which is the mapped input vector (3.2,6.5,2.9). Step 1920 is performed to form a mapped vector in the lattice-representation space (1.1,4.4,0.8,-6.3). Step 1930 is then performed to form a remainder-0 vector (0,1,0,-2). Step 1940 is performed to compute a residual vector x=(1.1,0.4,0.8,1.7). Step 1950 is performed to generate a sorting vector p=(1,2,0,3), that is x[p[i]] is the ith smallest coordinate in x, where i counts from zero. Step 1960 computes a sum of the coordinates of the remainder-0 vector which is -1. Then step 1970 is performed which passes control to step 1975 as the sum is less than zero. Step 1975 increments by one the coordinates of the remainder-0 vector that correspond to largest residuals, so that the sum is zero, thus the remainder-0 vector is updated to (0,1,0,-1). Then step 1980 updates the sorting vector to (3,1,2,0), by rotating the coordinates of the sorting vector up by one (1). Following completion of the method 1900 the remainder-0 vector (0,1,0,-1) and the sorting vector (3,1,2,0) is returned to step 4120 of method 4100.

Control is then passed to step 4130 which determines a set of lattice points that are the vertices of the Delaunay cell that encloses the mapped input vector using method 2200.

Method 2200 starts with step 2210 that receives a canonical mapping, that is represented by remainder-0 vector (0,1,0,-1) and sorting vector (3,1,2,0). Next, step 2220 sets the remainder-0 lattice point to the remainder-0 vector (0,1,0,-1).

Next, step 2230 performs a loop for each possible integer value, k=1, 2, . . . , n. For each pass through the loop, step 2230 sets the remainder-k lattice point be equal to the remainder-(k−1) lattice points, but with a coordinate of its c-vector decremented by one (1), where the coordinate is indicated as the k'th one by the sorting vector. Thus the remainder-1 lattice point is (0,1,0,-2), the remainder-2 lattice point is (0,0,0,-2), and the remainder-3 lattice point is (0,0,-1,-2)). Next, the method 2200 concludes where the lattice points (0,1,0,-1), (0,1,0,-2), (0,0,0,-2), and (0,0,-1,-2) are returned to step 4130 of the method 4100.

Control is then passed to step 4140 which select a lattice point, from the set of lattice points, that has the smallest distance between the lattice point and the mapped input vector. The coordinates in the lattice representation space of each lattice point c are determined using $l=(n+1)c-(\Sigma_{i=0}{}^n c[i])1$. Thus the distance from the mapped input vector to the lattice point is determined in the lattice representation space by determining the Euclidean distance between each l and (1.1, 4.4,0.8,-6.3) thus:

reminder-0 point→c=(0,1,0,-1), l=(0,4,0,-4), distance≈2.7 reminder-1 point→c=(0,1,0,-2), l=(1,5,1,-7), distance≈0.9 reminder-2 point→c=(0,0,0,-2), l=(2,2,2,-6), distance≈2.8 reminder-3 point→c=(0,0,-1,-2), l=(3 3,-1,-5), distance≈3.2

Therefore the lattice point closest to the input vector is the remainder-1 point c=(0,1,0,-2).

As a consequence the hash code is $f((0,1,0,-2)=959$, and record 123 is associated with hash code 959 in a hash table.

Retrieval

The present example receives a query vector (3.2,6.5,2.9) which is passed to method 2400. Step 2410 is performed to form a mapped input vector (1.1,4.4,0.8, −6.3. Next step 2420 is performed to determine a canonical mapping between a canonical Delaunay cell and a Delaunay cell that encloses the mapped input vector. Step 2420 may be implemented in the present example by performing the steps of method 1900, which returns the remainder-0 vector (0,1,0,-1) and the sorting vector (3,1,2,0) as demonstrated above.

Next, step 2430 is performed which determines a combined (first and second) set of lattice points. The lattice points are determined by first using method 2500 to determine a combined (first and second) set of canonical lattice points, where the dimensionality of the lattice representation space is four (4) and the number of extended shells (e) is one (1). The resulting first set of canonical lattice points is (0,0,0,0), (−1, 0,0,0), (−1,−1,0,0) and (−1,−1,−1,0) which correspond to the vertices of a canonical Delaunay cell. The resulting second set of canonical lattice points is (−1,0,0,1), (0,−1,0,0), (−1,0,−1, 0) and (−1,−,0,−1) which correspond to the first extended shell of lattice points. The canonical mapping is then applied to the combined set of canonical lattice points to produce a combined set of lattice points, thus:

(0,0,0,0)→(0,1,0,-1)

(−1,0,0,0)→(0,1,0,-2)

(−1,−1,0,0)→(0,0,0,-2)

(−1,−1,−1,0)→(0,0,-1,-2)

(−1,0,0,1)→(1,1,0,-2)

(0,−1,0,0)→(0,0,0,-2)

(−1,0,−1,0)→(0,1,-1,-2)

(−1,−1,0,-1)→(−1,0,0,-2)

Next, step 2440 is performed which generates a hash code, using $f$, for each lattice point of the combined set of lattice points. For each hash code, associated data records are retrieved. The hash codes used by step 2440 are:

(0,1,0,1)→960
(0,1,0,−2)→959
(0,0,0,−2)→$2^{64}$−2
(0,0,−1,−2)→$2^{64}$−33
(1,1,0,−2)→30750
(0,0,0,−1)→$2^{64}$−1
(0,1,−1,−2)→928
(−1,0,0,−2)→$2^{64}$−29793

As record 123 was previously associated with hash code 959 in a hash table, then record 123 is retrieved, as desired.

Setting a Lattice Scale

Figure 34:
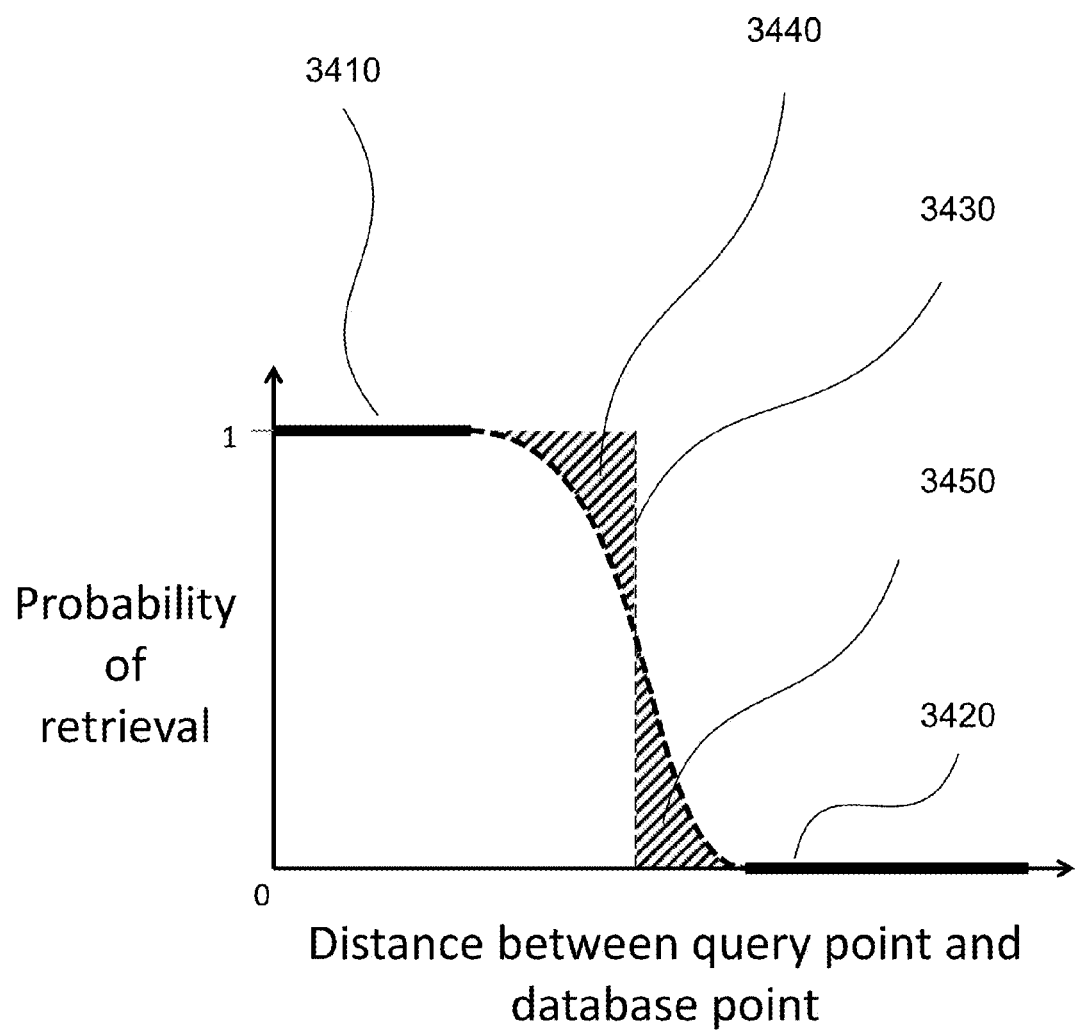
FIG. 34 is a plot showing a find function for an LSH method.

The scale of a lattice is a parameter that determines the size of cells used in lattice quantisation. Choosing an appropriate scale can be facilitated by considering the probability that a query vector retrieves a database vector, as a function of the distance between the scale vector and the database vector. The function of the distance between the scale vector and the database vector may be referred to as a 'find function'. FIG. 34 plots an example of a find function. The x-axis of the plot indicates the distance between a query vector and a database vector. The y-axis of the plot indicates the probability that the query vector results in retrieving the database vector. When the distance is zero, the probability is expected to be one. With increasing distance, there will be some distance, beyond which the probability is zero. A vertical dashed line 3430 shows a hypothetical query radius, which is the radius of an intended query ball. If the query radius 3430 was in the region of the find function where the probability is zero, then a LSH method will guarantee that the method will not return any undesired results, i.e., no false positives, which implies 100% precision. If the query radius 3430 was in the region of the find function where the probability is one, then the LSH method will guarantee not to miss any desired results, i.e., no false negatives, which implies 100% recall. If the desired query radius is somewhere in between, as shown in FIG. 34, then both false positives and false negatives are expected. The cause of false positives and false negatives are indicated by the regions 3450 and 3440 respectively. As false-positives may be removed by a subsequent filtering step, the false-positive region represents lost efficiency. The false-negatives cannot be restored without additional probes, therefore the false-negative region represent lost accuracy.

For an ideal ball query, the find function is a step with the transition at the query radius. The relative position of the desired query radius and the find function determines a trade-off across accuracy and efficiency.

For A* V:D there is a non-zero query radius for which there are no false-negatives (100% recall). For $A_n^*$ V:D, query radii $\leq \rho\sqrt{2/(n^2+1)}$ provides 100% recall, for packing radius $\rho$. Using Equation (5)] this corresponds to query radii$\leq 1/\sqrt{2}$.

If an extended (or other) probing technique is used, then a find function may be used to set the lattice scale (i.e., packing radius $\rho$) to achieve a desired level of accuracy and efficiency.

A find function, for a given combination of insertion and retrieval technique, may be determined by randomly generating pairs of vectors with varying levels of similarity. The probability of retrieval, for a given level of similarity, is the frequency for which there is a common hash code between the insertion set of hash codes and the retrieval set of hash codes, for a particular pair of vectors.

The benefit of using the Delaunay cell to determine the query probes is that the Delaunay cell directly deals with the worst-case query which is when the query point is near a hole, i.e., when the query point is maximally close to as many cells as possible.

Increasing the number of query probes has a cost, namely the hash table is accessed more times. The benefit from increasing the number of query points is two-fold—the effective query volume is larger and is more 'spherical'. As a result, find functions more closely resemble a step function and the hash cells may be scaled smaller to keep the same query radius. Smaller hash cells means that on average each cell has less records associated with the cell.

The effectiveness of LSH may be understood by considering the probability that a query vector retrieves a database vector, as a function of the distance between the query vector and the database vector. The function of the distance between the query vector and the database vector may be referred to as a 'find function'. FIG. 34 plots an example of a find function. The x-axis of the plot of FIG. 34 indicates the distance between a query vector and a database vector. The y-axis of the plot indicates the probability that the query vector results in retrieving the database vector. When the distance is zero, then the probability is expected to be one. With increasing distance, there will be some distance, beyond which the probability is zero. A vertical dashed line 3430 shows a hypothetical query radius, which is the radius of the intended query ball. If the query radius 3430 was in the region of the find function where the probability is zero, then a LSH method will guarantee that the method will not return any undesired results, i.e., no false positives, which implies 100% precision. If the query radius 3430 was in the region of the find function where the probability is one, then the LSH method will guarantee not to miss any desired results, i.e., no false negatives, which implies 100% recall. If the desired query radius is somewhere in between, as shown in FIG. 34, then both false positives and false negatives are expected. The cause of false positives and false negatives are indicated by the regions 3450 and 3440 respectively. As false-positives may be removed by a subsequent filtering step, then the false-positive region represents lost efficiency. The false-negatives cannot be restored without additional probes, therefore the false-negative region represent lost accuracy.

For an ideal ball query, the find function is a step with the transition at the query radius. The relative position of the desired query radius and the find function determines a trade-off across accuracy and efficiency.

Figure 31A:
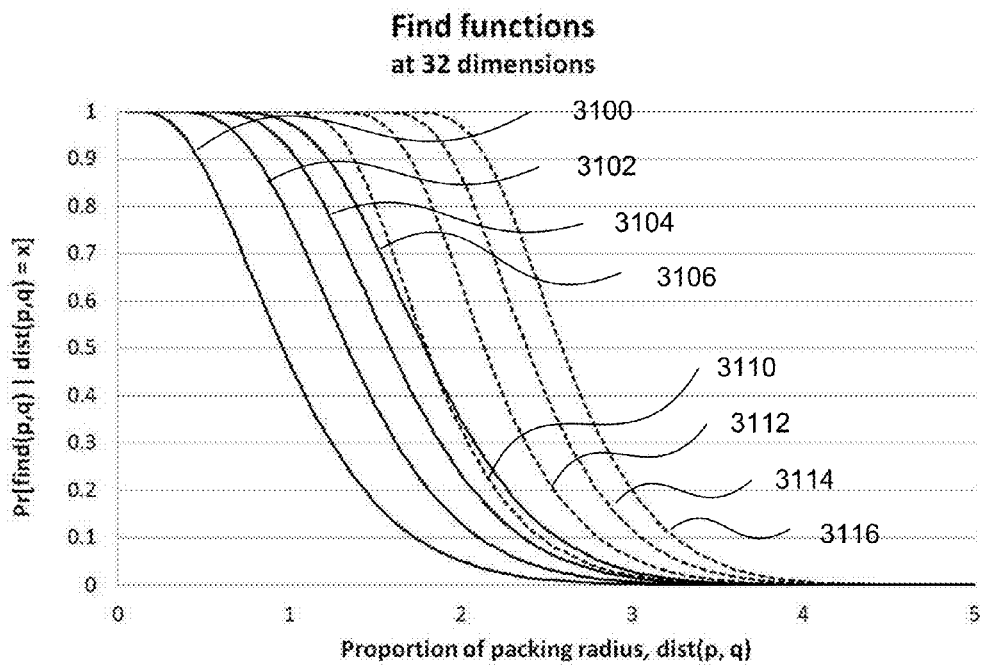
FIG. 31a is a plot of the find functions for A* V:E and D:E resulting, for 32 dimensions and selected numbers of shells.
Figure 31B:
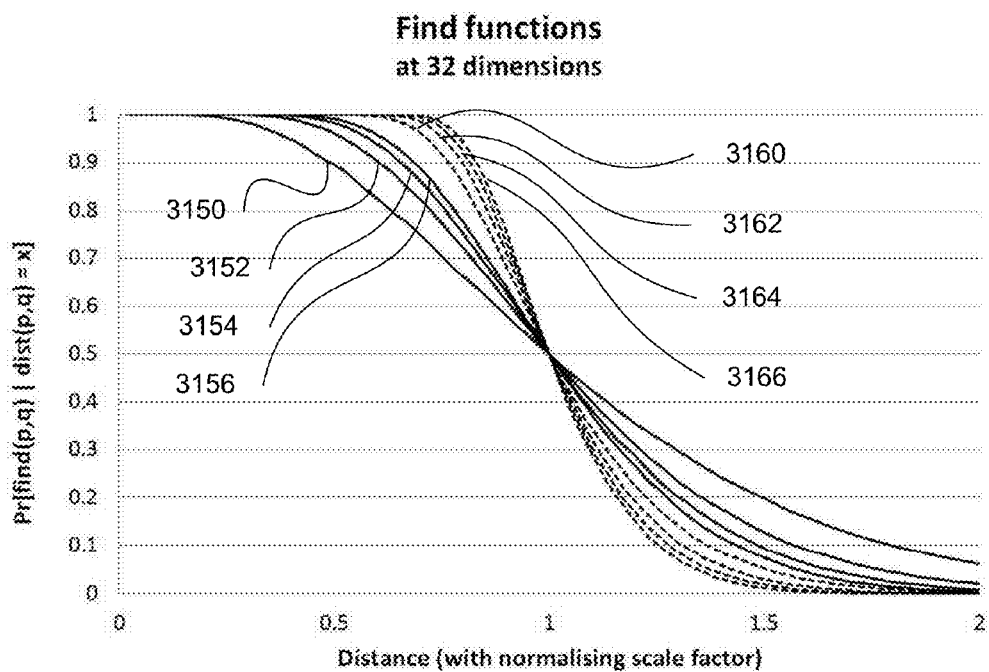
FIG. 31b shows a plot where the x-axis of each function in FIG. 31a has been scaled so that each function crosses probability 0.5 at distance one (1)

The effect on the find function of extra shells of probes is shown in FIGS. 31*a* and 31*b*. FIGS. 31*a* and 31*b* is a pair of plots showing the find functions resulting from one arrangement, for thirty two (32) dimensions and for selected numbers of shells. FIG. 31*a* is a plot of the find functions for A* V:E with no extended shells 3100, A* V:E with two extended shells 3102, A* V:E with four extended shells 3104, and A* V:E with six extended shells 3106. FIG. 31*a* also plots the find functions for A* D:E with no extended shells 3110, A* D:E with two extended shells 3112, A* D:E with four extended shells 3114, and A* D:E with six extended shells 3116. The x-axis shows the distance between a query point and a database point. The y-axis shows the probability that the query point will result in retrieving a record associated with the database point.

In FIG. 31*b* the x-axis of each function in FIG. 31*a* has been scaled so that each function crosses probability 0.5 at distance one (1). Such scaling normalizes the measure of distance and shows more clearly the relative steepness. FIG. 31*b* is a plot of the find functions for A* V:E with no extended shells 3150, A* V:E with two extended shells 3152, A* V:E with four extended shells 3154, and A* V:E with six extended shells 3156. FIG. 31*b* also plots the find functions for A* D:E with no extended shells 3160, A* D:E with two extended shells 3162, A* D:E with four extended shells 3164, and A* D:E with six extended shells 3166. The y-axis shows the probability that the query point will result in retrieving a record associated with the database point.

In FIGS. 31*a* and 31*b* it is possible to see that adding more shells increases the steepness of the find function. Although the change in steepness of the function may appear slight, the change represents a significant change in efficiency as the false-positive volume grows in the order of polynomial degree-n.

For small numbers of extended shells there is only a modest increase in the number of probes. FIG. 29 is a table showing the number of probes resulting from A* V:E or A* D:V for some selected dimensionalities and selected numbers of shells.

Figure 30A:
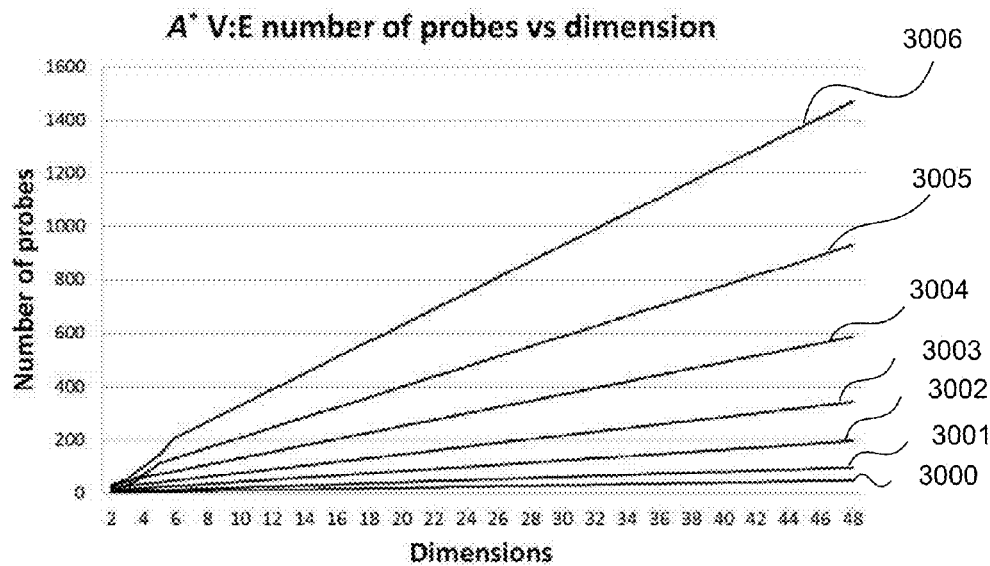
FIGS. 30a and 30b are a pair of plots showing the number of probes resulting from one arrangement, for some selected dimensionalities and some selected numbers of shells.
Figure 30B:
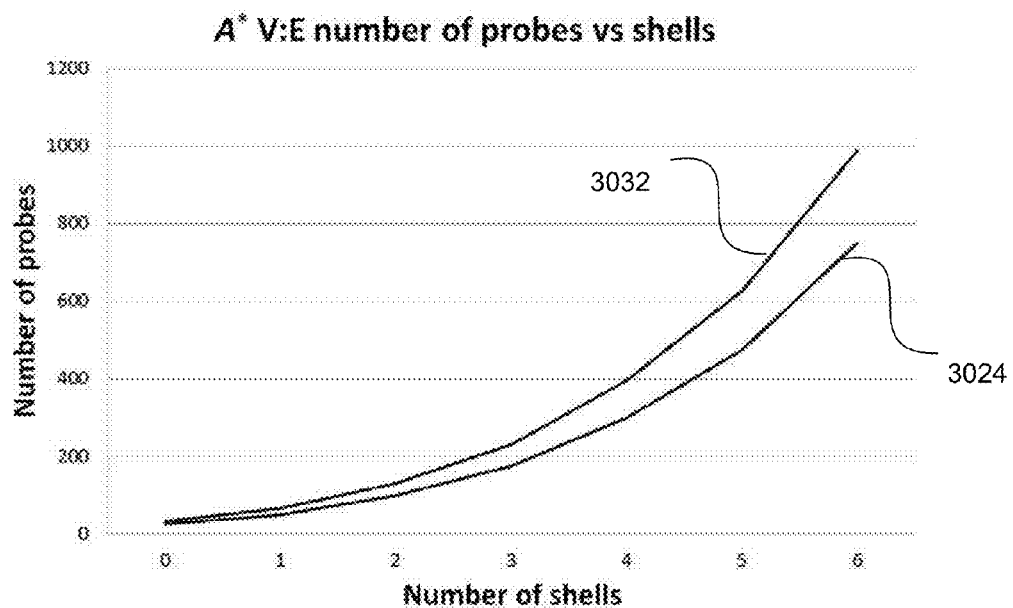

The growth of the number of probes as a function of dimensions is plotted in FIGS. 30*a* and 30*b*. The x-axis of the plot of FIG. 30*a* shows the number of dimensions from two (2) to forty eight (48). The y-axis shows the number of probes. FIG. 30*a* plots the growth for no extended shells 3000, the growth for one (1) extended shell 3001, the growth for two (2) extended shells 3002, the growth for three (3) extended shells 3003, the growth for four (4) extended shells 3004, the growth for five (5) extended shells 3005, and the growth for six (6) extended shells 3006.

The growth of the number of probes as a function of number of shells is plotted in FIG. 30*b*. The x-axis shows the number of shells from zero (0) to six (6). The y-axis shows the number of probes. FIG. 30*b* plots the growth for twenty-four (24) dimensions 3024, and the growth for thirty-two (32) dimensions 3032.

The benefit from scaling the lattice hash is large in the order of polynomial degree-n in the scaling factor. Therefore, in many situations, rescaling may cover the cost of the extra probes. The false-positive/false-negative trade-off is improved, which increases linearly with database size, whereas the extra probe cost is constant.

The results shown in FIGS. 30*a* to 31*b* are based on a fixed number of probes per query. The results shown in FIGS. 30*a* to 31*b* ignore arrangements that dynamically change the probes in response to a given query vector.

A* V:E4 (i.e. A* V:E with four (4) extended shells) has also been evaluated in a content-based image retrieval application. The application uses SIFT descriptors (reduced to thirty (32) dimensions) to match photographic images. The queries include both good quality images as well as low quality web-cam captures of printouts and highly cropped images (query images in set 'crop 4-4' contain 6% and 'crop 8-4' contain 3% of an original image in the database). The application registered all descriptors into the database (descriptors were compressed). The total number of vectors in the database was more than $10^9$. The content-based image retrieval application was implemented as a single-threaded Java program, running with 92 GB of available RAM. Index parameters were set from exploratory experiments using a small subset of the data to keep accuracy values acceptable and comparable (n=32, 396 probes per query, method A* V:E4).

The results of the evaluation of the A* V:E4 application (i.e. A* V:E with four (4) extended shells) are summarised in FIG. 32 which shows A* V:E4 compared to A* V:D, a balanced version A* V:D and a method labelled 'Kise (improved)'. The Kise (improved) method used the order of dimensions sorted by distance to the boundary which is equivalent to a spectral hashing version of Query-directed multi-probe LSH.

The results of FIG. 32 show that A* V:E4 was seven (7) times faster than the Kise (improved) method, with similar or better accuracy. The size of the A* V:E4 index was larger by 60%, since more hash codes resulted for the selected parameter settings.

Super Lattice Compression

Figure 35:
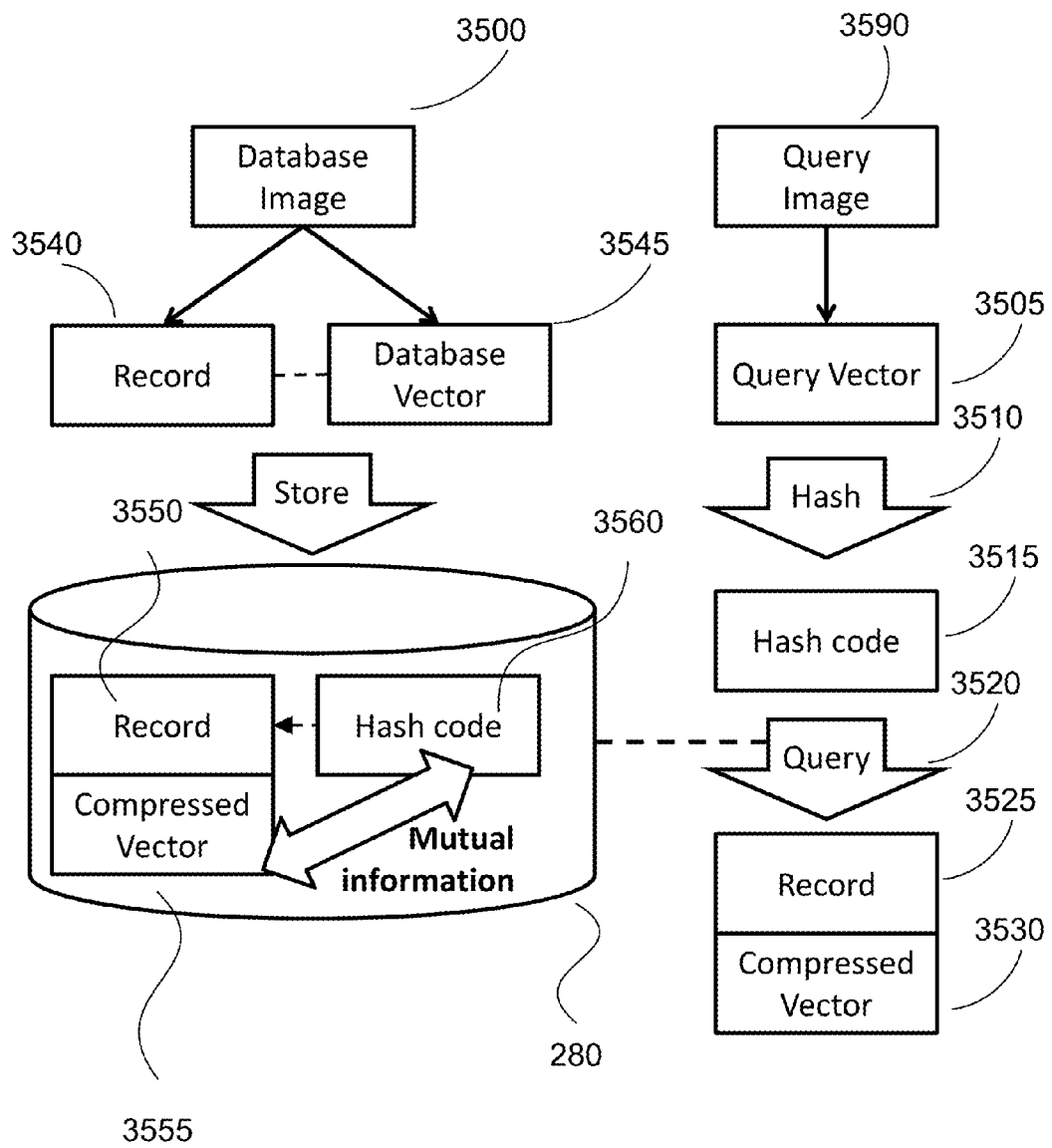
FIG. 35 shows a content based image retrieval storage and query system.

As described above, in relation to content based image retrieval, when given a query image the associated query vectors are used to query a database such as the database 280. FIG. 35 shows an arrangement with a query image 3590 leading to a query vector 3505 undergoing a hashing process 3510 to produce a hash code 3515. The resulting hash code 3515 can be used to query 3520 the database 280 of stored hash codes, such as hash code 3560, for a match. A record 3540 of an image 3500 may be stored in the database 280. The record 3540 may store the original image data or information to locate the image data. A database vector 3545 is produced from the database image 3500 that describes a point of the database image 3500. The vector 3545 is compressed to form compressed vector 3555, and the compressed vector 3555 is stored in the database 280. A record 3550 may be scored with respect to the query image 3590 by determining the similarity between the compressed vector 3555 with the query vector 3505.

The hash code 3560 for the database vector 3545 and the associated compressed vector 3555 may share mutual information. The mutual information implies wasted memory.

Described below is a method of representing a compressed vector based on the hash code for a vector providing information that need not be included in a compressed representation.

Figure 36:
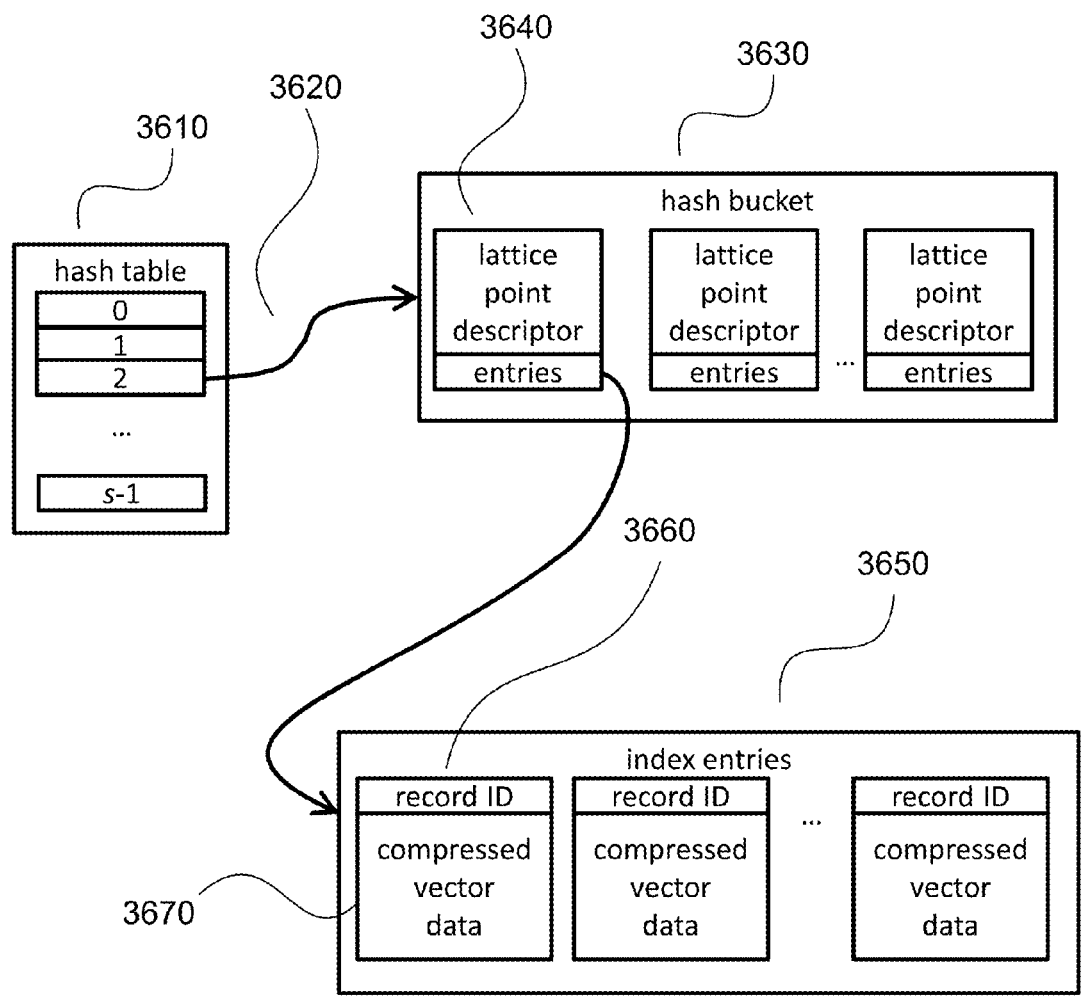
FIG. 36 shows data structures used to implement a hash-based index of FIG. 35.

FIG. 36 shows a pictorial representation of a data structure that may be used to implement a hash-based index. A hash table 3610 provides a pointer 3620 to a hash bucket 3630 which is a list of lattice point descriptors and associated information. Each lattice point descriptor 3640 of a particular hash bucket has the same hash code (modulo the size of the hash table).

A lattice point descriptor may be the coordinates of a lattice point in a lattice representation space or may be a c-vector of a lattice point or may be a large hash code representing a lattice point. Each lattice point descriptor 3640 in a hash bucket is associated with information that is a collection of index entries 3650, where each index entry stores a relationship between a record identifier 3660 and compressed vector data 3670.

The precise storage details depend on a match-scoring method used at query time, and whether the hash table is resizable. For example the lattice point descriptor may be omitted from the data structure if the match scoring method tolerates mismatched lattice points (false positives). Similarly, the compressed vector data may be omitted from the data structure if the scoring method uses a vote counting approach.

For a method of retrieving an image record from a database, such as the database 280, both a lattice point descriptor and a compressed vector data may be required. That is, the lattice point descriptor may be required so that the hash table may be resized and/or so that lattice point descriptors may be tested to reduce false positives. Compressed vector data may be required to enable a compressed vector to be reconstructed so that a match scoring may determine a measure of the quality of match.

The use cases where both the lattice point descriptor and the compressed vector data are required to be stored in the database 280.

Each index entry that is associated with a particular lattice point is associated with a compressed vector that is within a particular region around the lattice point. In arrangement, the region about the lattice point is a Voronoi cell of the lattice point. In an alternative arrangement, called a Balanced A* indexing method, the region about the point is a union of Voronoi cells near the lattice point.

Figure 37:
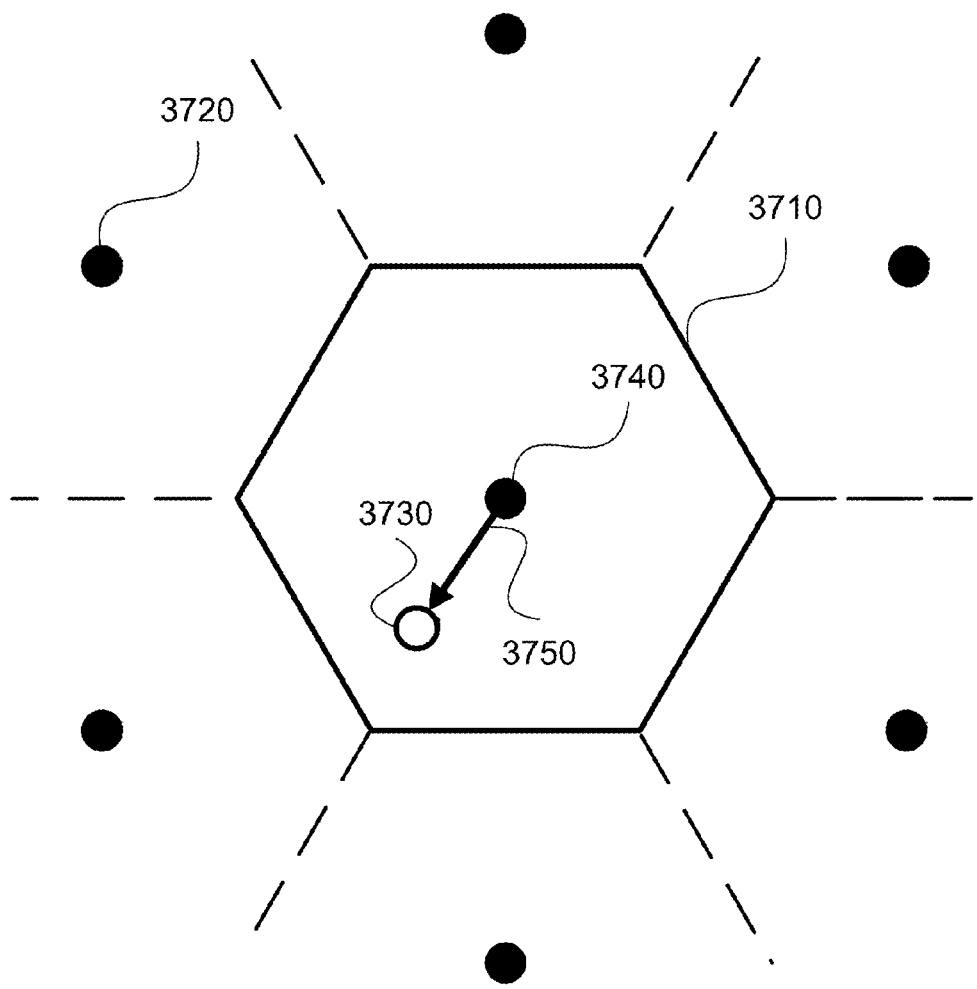
FIG. 37 shows a Voronoi cell and an offset vector from a lattice point to a mapped feature vector.

A representation of the region around a point is shown in FIG. 37. FIG. 37 shows a Voronoi cell 3710 located in a lattice of lattice points, such as lattice point 3720. A database vector 3730 is quantized to a nearest lattice point 3740 so that a future query vector may be used to find an appropriate collection of index entries. A difference between the database vector 3730 and the nearest lattice point 3740 is shown as an offset vector 3750. When a matching future query vector is received, then the query vector results in the lattice point 3740 being used to obtain the appropriate collection of index entries.

The lattice point 3740 may be used to obtain the appropriate collection of index entries so that when a collection of index entries is returned, the query process may determine which lattice point an index entry is associated with, and therefore it is not necessary for the collection of entries to explicitly supply an associated lattice point. Therefore, compressed vector data needs to store data sufficient to recover the offset vector 3750, which can be added to the coordinate representation of the lattice point in order to recover the compressed vector. The compressed vector data 3770 of FIG. 37 may consist exclusively of compressed offset vector data, thus providing an advantage in reduced memory requirements.

A method of efficiently encoding a lattice point descriptor, and an efficient method of encoding of an offset vector from a lattice point will now be described. The described methods of encoding a lattice point descriptor and encoding an offset vector quantize a space inside a Voronoi cell with a lattice denser than the lattice used for generation hash codes.

Encoding an Offset Vector

A lattice A is a mathematical construct that is a set of points which is a linear transformation of all points with integer coordinates in accordance with Equation (6) as follows:

$$\Lambda = (p = Gz | z \subset \mathbb{Z}^n) \qquad (6)$$

where $\Lambda$ is the lattice, n is the dimensionality of the lattice (i.e. quantization space) and, G is a 'generator' matrix that is a linear transform defining $\Lambda$. For a given lattice point p, the corresponding z vector is referred to as the basis coordinates for p.

A nested lattice of $\Lambda$ is one where every point in the nested lattice is also a point in $\Lambda$. In particular, a sub-lattice k$\Lambda$ is a nested integer multiple of a super-lattice $\Lambda$. Specifically, defining the sub-lattice k$\Lambda$ as k$\Lambda \triangleq$ (kp|p$\in \Lambda$) implies that k$\in \Rightarrow \mathbb{Z}$k$\Lambda \subset \Lambda$. So $\Lambda$ is a super-lattice of k$\Lambda$; equivalently 1/k$\Lambda$ is a super-lattice of $\Lambda$.

Figure 38:
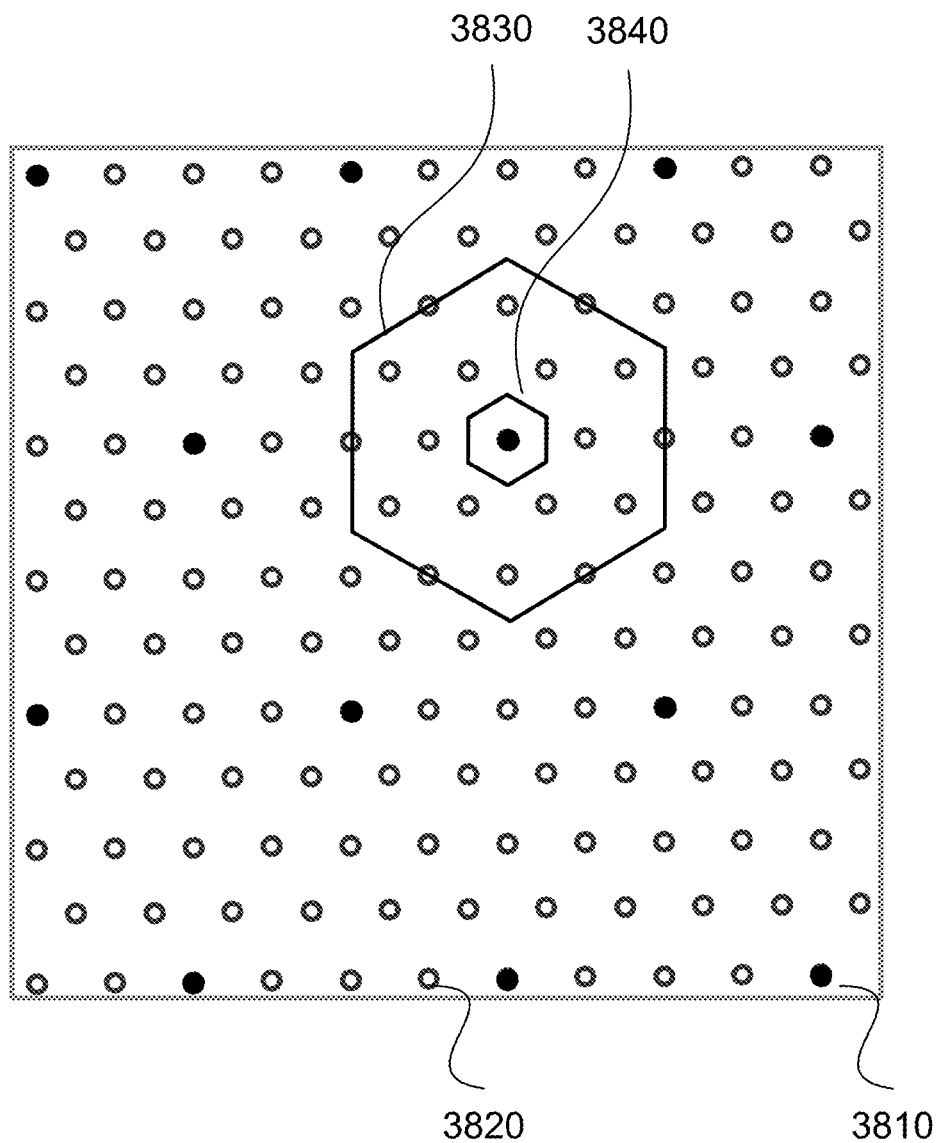
FIG. 38 shows an $A_2$* sub-lattice and a super-lattice of the $A_2$* sub-lattice.

The value of k is a nesting factor which indicates the relative density of the super-lattice with respect to the sub-lattice. The volume of the Voronoi cell of k$\Lambda$ is $k^n$ times that of $\Lambda$, which is equivalent to 1/k$\Lambda$ containing k more points than $\Lambda$, per unit volume. FIG. 38 shows a portion of an $A_2^*$ sub-lattice with filled dots representing sub-lattice points, such as sub-lattice point 3810. A super-lattice of the sub-lattice is also shown with the super-lattice points represented by unfilled dots and filled dots. An example is super-lattice point 3820. Sub-lattice point 3810 is also a super-lattice point. In FIG. 38, the nesting factor (k) is four (4) and the dimensionality (n) is two (2). Therefore, a Voronoi cell 3830 of the sub-lattice is $4^2=16$ times the volume (or area) of a Voronoi cell 3840 of the super-lattice.

A super-lattice may be used for quantising offset vectors. If the nesting factor is a power of two, $k=2^b$, then the number of bits needed to label a 1/k$\Lambda$ point in a Voronoi cell of $\Lambda$ is nb (plus any bits needed to disambiguate points on the Voronoi boundary).

Figure 39:
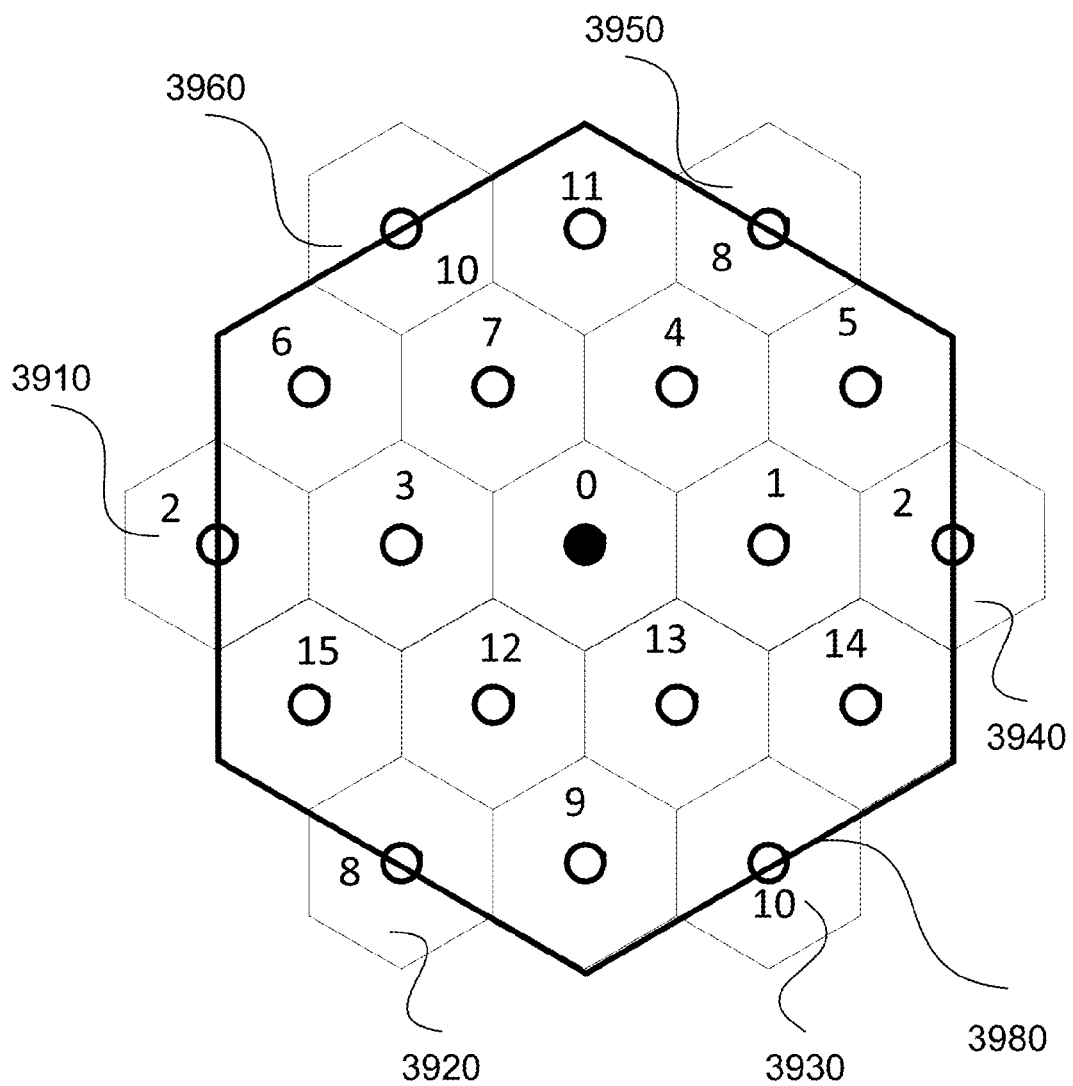
FIG. 39 shows ambiguous Voronoi cells of a super-lattice of FIG. 38.

For the lattice A every lattice point p has some vector of integer values z such that p=Gz. Therefore, a label for a super-lattice point in a Voronoi cell of $\Lambda$ may be determined using Equation (7) as follows:

$$l = \sum_{i=0}^{n} z[i]k^i \qquad (7)$$

where z=(G* p) mod k and where G* is the Moore-Penrose pseudo-inverse of G. An example, using the $A_2^*$ lattice, is shown in FIG. 39.

Equation (7) may be used in a method for determining an encoded offset vector. For example, let Q be a quantiser for $\Lambda$, i.e., Q(x) returns the nearest lattice point in $\Lambda$ for some arbitrary point x. Then define $Q_k(x) \triangleq$ (kx)/k is a quantiser for the super-lattice 1/k$\Lambda$. A method of determining the closest lattice point and super-lattice point label for an arbitrary input vector is described below according to the pseudo code (1), as follows:

| pseudo code (1) |
| --- |
| Given input vector x, find the nearest lattice point p and super-lattice label l.<br>let p = Q(x)<br>let z = G* Q(k(x−p))<br>let l = sum i = 0 to n−1, (z[i] mod k) << (i b)<br>return p and l |

The reverse operation of determining an approximation to the arbitrary input vector s is shown the pseudo code (2), as follows:

| pseudo code (2) |
| --- |
| Given the nearest lattice point p and super-lattice label l, determine an approximation to the vector x.<br>for i = 0 to n−1<br>let z[i] = (1 >> (i b)) mod k<br>let x = G z<br>let x = x − Q(x)<br>let x = p + (1/k) x<br>return x |

Unfortunately, the method of determining the closest lattice point and super-lattice point label for an arbitrary input vector shown in the above pseudo code is not always good for encoding offset vectors, since vectors near the boundary of a sub-lattice Voronoi cell are labelled ambiguously. Super-lattice Voronoi cells near the boundary of a sub-lattice Voronoi cell may be associated with an ambiguous label. Such super-lattice Voronoi cells with ambiguous labels are shown in FIG. 39. In FIG. 39, each super-lattice Voronoi cell has been labelled using the pseudo code above. In the example of FIG. 34, there are three pairs of ambiguous super-lattice Voronoi cells. As seen in FIG. 39, Voronoi cell 3910 and Voronoi cell 3940 are assigned label '2'. Voronoi cell 3920 and Voronoi cell 3950 both are assigned label '8'. Voronoi cell 3930 and Voronoi cell 3960 both are assigned label '10'. The Voronoi cells of the super-lattice correspond to ambiguous points at the boundary of the sub-lattice Voronoi cell 3980. Such ambiguous Voronoi cells may lead to errors. For example, a first database vector that is within sub-lattice Voronoi cell 3980 and within super-lattice Voronoi cell 3910 will have compressed offset vector data encoding label '2'. A second database vector that is within sub-lattice Voronoi cell 3980 but is within super-lattice Voronoi cell 3940 will also have compressed offset vector data encoding label '2'. Thus when a query vector is received, the query vector is not possible to distinguish between the two cases without storing extra information in the compressed offset vector data.

Figure 40:
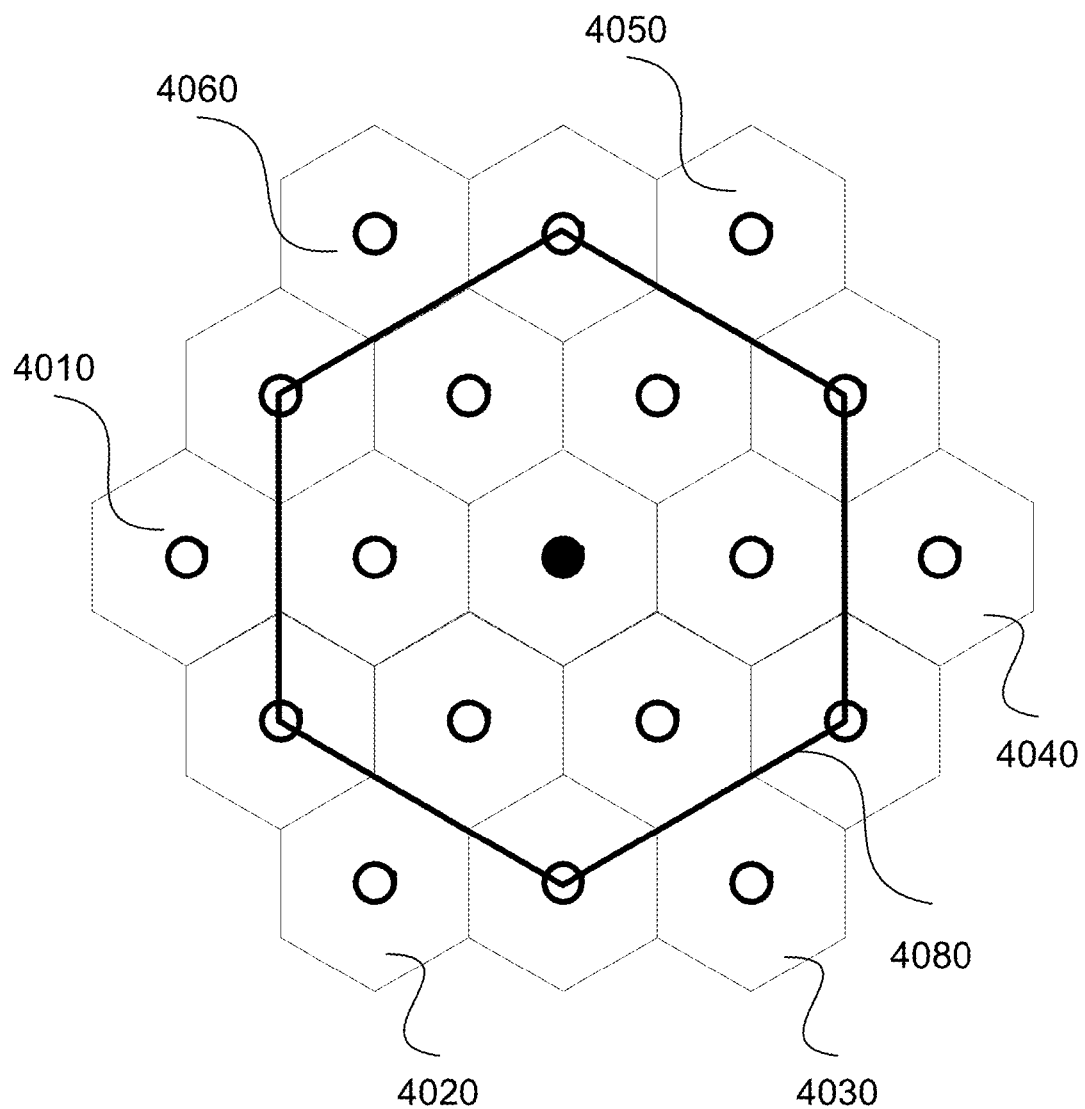
FIG. 40 shows Voronoi cells of an inflated super-lattice with a Voronoi cell of a sub-lattice of the inflated super-lattice of FIG. 38.
Figure 41:
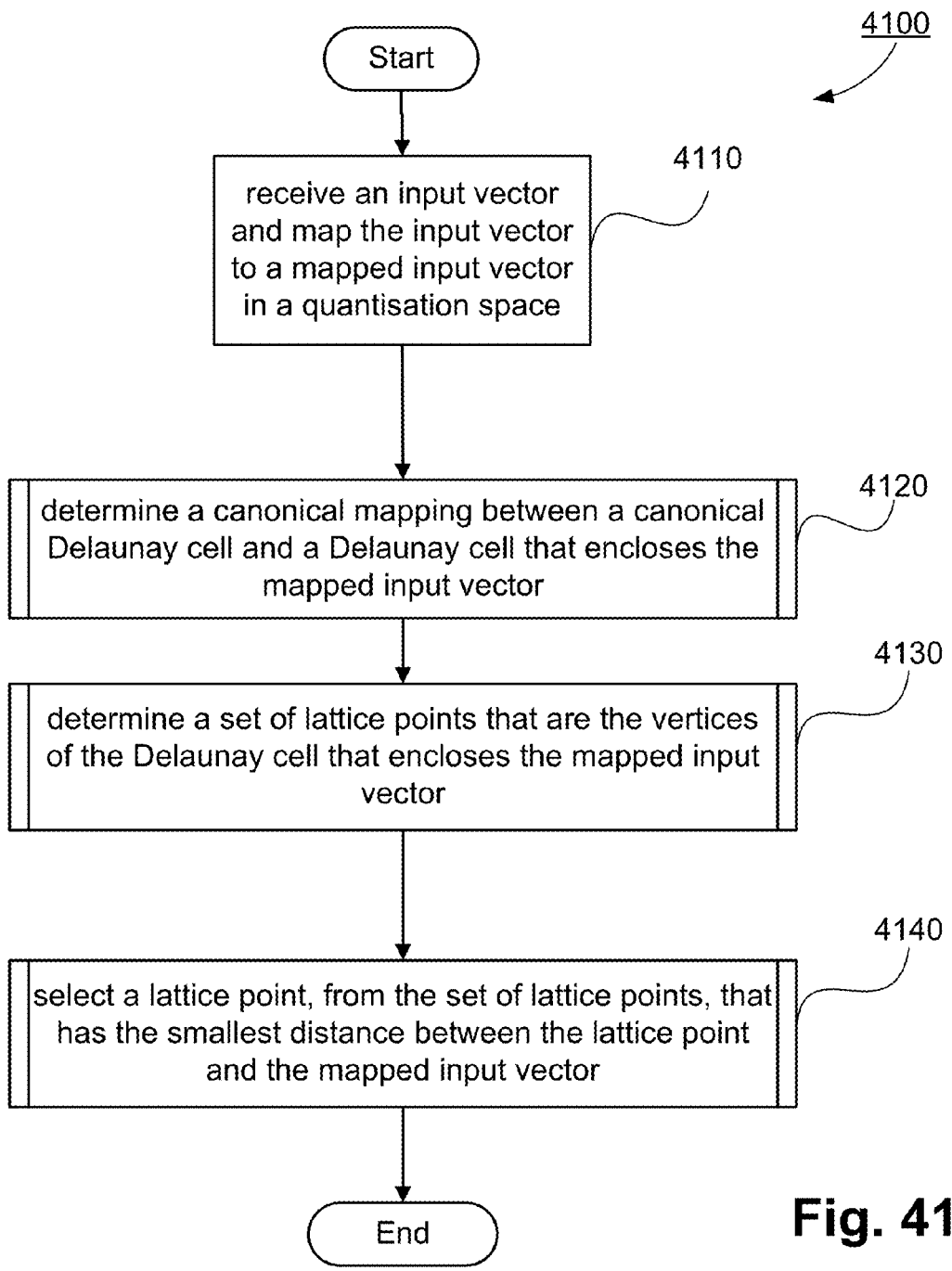
FIG. 41 is a schematic flow diagram showing a method of determining a lattice point of a Voronoi cell that contains an input vector.

Problems at the boundary of the Voronoi cell of the sub-lattice may be addressed by inflating the super-lattice, or equivalently shrinking the sub-lattice, to ensure that the problematic boundary effects are avoided. For example, FIG. 40 shows a sub-lattice Voronoi cell 4080 scaled to exclude six super-lattice Voronoi cells 4010 to 4060 of a super-lattice in an $A_2^*$ lattice with a nesting factor (k) of four. The super-lattice is been inflated by $(k-1)/k$ to exclude problematic super-lattice points near the boundary of the sub-lattice Voronoi cell. Inflation results in wasted label space and a wasted quantisation volume of the labelled super-lattice Voronoi cell volumes located outside of the sub-lattice Voronoi cell. The result is that errors due to ambiguous labels are avoided, but there is slightly greater quantisation error for a given bit budget.

Inflating the super-lattice by a factor of $(k-1)/k$ ensures that the Voronoi cells of the problematic super-lattice points near the boundary do not intersect with the sub-lattice Voronoi cell. Therefore errors resulting from ambiguous labels are avoided. A boundary-corrected compression method is shown in the pseudo code (3), as follows:

| pseudo code (3) |
| --- |
| Given input vector x, find the nearest lattice point p and super-lattice label l.<br>let p = Q(x)<br>let z = G* Q((k−1)(x−p))<br>let l = sum i = 0 to n−1, (z[i] mod k) << (i b)<br>return p and l |

The boundary-corrected decompression method will have the pseudo code (4), as follows:

| pseudo code (4) |
| --- |
| Given the nearest lattice point p and super-lattice label l, determine an approximation to the vector x.<br>for i = 0 to n−1<br>    let z[i] = (l >> (i b)) mod k<br>let x = G z<br>let x = x − Q(x)<br>let x = p + (1/(k−1)) x<br>return x |

The boundary-corrected compression and decompression methods may be efficiently implemented when the lattice is A* as Q, G and G* are fast and simple to apply. The boundary-corrected compression and decompression methods are particularly efficient when nb is a multiple of CPU word size (e.g. 32 bits) as the encoded offset vector packs well into memory such as the memory 1506.

Using $k=2^b$, the number of reachable labels within a super lattice Voronoi cell is $(2^b-1)^n$. The number of encoding bits is nb so the wasted information due to inflation is $nb - n\ln_2(2^b 1)$, which proportionally is $$\frac{nb - n\ln_2(2^b - 1)}{nb} = 1 - \frac{1}{b}\ln_2(2^b - 1)$$

For b=1 the waste is 100%, ergo using b=1 provides no benefit. The waste rapidly diminishes as b grows, with zero loss in the limit Some sample values are shown in the Table 1, below:

TABLE 1

| bits per dimension, b | proportional waste, $1 - \frac{1}{b}\ln_2(2^b - 1)$ |
| --- | --- |
| 1 | 100% |
| 2 | 21% |
| 3 | 6% |
| 4 | 2% |

The described boundary-corrected compression and decompression methods work well since an input vector is in a sub-lattice Voronoi cell of a lattice point used for hashing. Such is not the case for a Balanced A* indexing method where a hash code may be generated from any lattice point forming the Delaunay cell about the point representing a feature descriptor vector. However, the same super-lattice inflation method may be used to ensure that the encoding super-lattice points cover all Voronoi cells each centred on a vertex of an enclosing Delaunay cell. A simple geometric argument may be used to show that the union of Voronoi cells touching a Delaunay cell of a lattice A are contained within a Voronoi cell of a translated lattice 2Λ. Therefore inflating a super-lattice by two (2) makes the encoding applicable to the Balanced A* indexing method. The cost is one bit per dimension, i.e. $b=\alpha$ for A* Voronoi indexing is equivalent to $b=\alpha+1$ for A* Balanced indexing. A Balanced A* version of super-lattice compression for balanced hashing is provided in the pseudo code (5), as follows:

| pseudo code (5) |
| --- |
| Given input vector x, find the nearest lattice point p and super-lattice label l.<br>let p = Q(x)<br>let z = G* Q((k/2−1)(x−p))<br>let l = sum i = 0 to n−1, (z[i] mod k) << (i b)<br>return p and l |

A corresponding boundary-correct super-lattice decompression method for Balanced A* hashing is provided in the pseudo code (6), as follows:

| pseudo code (6) |
| --- |
| Given the nearest lattice point p and super-lattice label l, determine an approximation to the vector x.<br>for i = 0 to n−1<br>    let z[i] = (l >> (i b)) mod k<br>let x = G z<br>let x = x − Q(x)<br>let x = p + (1/(k/2−1)) x<br>return x |

Encoding a Lattice Point Descriptor

A method for encoding a lattice point descriptor as described above in relation to FIG. 36 is described in more detail below.

There are many methods of representing a lattice point to generate a lattice point descriptor. For example a lattice point may be represented: (a) as an array of floating point numbers, representing Euclidean coordinates of the lattice point in the quantisation space; (b) as an array of integers, representing Euclidean coordinates of the lattice point in the lattice representation space; (c) as an array of integers, representing basis coordinates of the lattice point; (d) as an arbitrary precision integer label, where there is some ordering over the lattice points; or (e) as a large hash code.

The labelling method (d) may be efficient in memory if small labels are associated with frequently used lattice points and the arbitrary precision integer label does not store leading zeroes. In general, a labelling approach can be computationally expensive to encode and decode. However, disclosed is a labelling method that is efficient to compute for A* lattices and which uses fewer bits to label a lattice point than the bits to label another lattice point which is further from the origin of the lattice representation space.

The labelling method performs four steps. Firstly, the input lattice point p is represented as an array of integers, z, in basis coordinates i.e., z=G*p. Secondly, each coordinate z[i] is unambiguously transformed to y[i] to ensure no negative coordinates in accordance with Equation (8), as follows:

$$y[i] = \begin{cases} 2z[i], & \text{when } z[i] \geq 0 \\ -2z[i] - 1, & \text{otherwise} \end{cases} \quad (8)$$

Thirdly, the transformed coordinates, y, are treated as a bit matrix. Re-writing the matrix in column order is equivalent to transposing the bit matrix represented by y to get y'. The effect is that the closer p is to the origin, the more leading zeros there are in y'. A final, fourth step is to trim the leading zeros from y'. Thus y' is a unique lattice point descriptor (a.k.a. label) for lattice point p.

For the described arrangements, a lattice quantiser, Q, is an A* lattice quantiser that represents a resulting lattice point, p, in the form c such that p=(n+1)c+k1 where 1 is a vector in which each coordinate set to 1, and k is an integer from 0 to n−1 (the value of k indicates an A lattice coset of an A* lattice). Such a representation makes a method of computing G*p very efficient, as outlined in pseudo code (7), as follows:

```
pseudo code (7)
```

Given c being an array of integers representing an $A_n$* lattice point, p = (n+1)c+k1, determine basis coordinates z = G* p.
for i = 0 to n
    z[i] = c[0] − c[n−i]
return z The method of computing G* p may be directly incorporated into the four labelling steps described above and results in the following method for encoding an A* lattice point for hashing according to the pseudo code (8), as follows:

```
pseudo code (8)
```

Given c being an array of integers representing an $A_n$* lattice point, p = (n+1)c+k1, determine label q.

```
pseudo code (8)
``` let q be a bit array initia;ized to zero
let v = c[0]
for i = 0 to n
    let x = v − c[n − i]
    set x = (x ≥ 0) ? 2x : −(2x + 1)
    set b = 0
    while x ≠ 0
        set bit (b + i) of q to (x mod 2)
        set b = b + n
        set x = x div 2
return q A de-labelling algorithm may also be provided. However, such a de-labelling algorithm may not be required as the corresponding vector representation of the lattice point may be available at query time from the processed query image.

The following provides an analysis of memory requirements for super-lattice compression advantages.

A model, used for calculating memory requirements, is shown below:

```
struct Bucket
{
    next              : Bucket pointer
    entries           : Entry pointer
    descriptorLength  : int
    descriptor        : int [...]
}
struct Entry
{
    next       : Entry pointer
    recordId   : int
    key        : int[n * b / sizeof(int)]
}
```

For the analysis of memory requirements, thirty-two (32) bit integers and pointers are assumed. A hash table (array of pointers) is common across hash-based index methods. A hash table with a load factor of 0.8 leads to an additional 5 kbytes per image. assuming an average of 1000 image features per image. If the hash table is resized by doubling, then the worst case is that the hash table requires 10 kbytes per image.

A summary of the analysis of memory requirements is shown in Table 2, below:

TABLE 2

|  | Binomial coefficients (labelled descriptor) | Super-lattice (labelled descriptor) | Super-lattice (8 byte hashed descriptor) | Super-lattice (4 byte hashed descriptor) |
| --- | --- | --- | --- | --- |
| Per bucket | 24 | 24 | 16 | 12 |
| Per entry | 40 | 16 | 16 | 16 |
| Per image | 64k | 40k | 32k | 28k |
| Hash table |  |  | 10k |  |
| Java overhead |  |  | 16k |  |
| Total per image | 70k | 66k | 58k | 54k |

For the analysis of performance, hash buckets may be modelled as a linked list. Each element of the list includes a pointer to corresponding index entries and embeds the encoded lattice point (lattice point descriptor) as a variable array of integers. Each index entry is modelled as a linked list where each has an integer record identifier and a fixed length array of integers storing an encoded super-lattice offset.

Experiments using super-lattice compression of SIFT image feature descriptors have provided relatively good accuracy results for n=32 and b=2, and result in a typical lattice point descriptor length of three thirty-two (32) bit integers. Therefore the average size of a hash bucket is twenty-four (24) bytes and the average size of an index entry is 16 bytes. In the worst case there is one hash bucket and one entry per database feature vector, such that forty (40) kbytes per image may be required for a super-lattice index.

In alternate arrangements, a lattice point description may be hashed to a standard four (4) byte hash code, or a large eight (8) byte hash code. Using hash codes can reduce the storage requirements even further to twenty-eight (28) kbytes or thirty-two (32) kbytes per image (as shown in the Table 2 above). Using a hash code to represent a lattice point descriptor may introduce errors in the form of false positive matches. The errors may be acceptable if the image match scoring function is robust to false positive matches and/or if the occurrence of false positive matches is low.

False positive matches may occur due to hash code collisions. That is, two or more different lattice points may be represented using the same hash code.

Even though collisions may occasionally happen, the expected impact of the collisions on resulting image match-scores is negligible. A collision may only make a query vector seem more similar to a database vector than the query vector truly is actually similar to the database vector. Such a collision increases an image match-score. However, each image may have many local image features, so even the occasional collision is not expected to have a big impact on a final image match-score.

A well behaved hash function will distribute hash codes uniformly over the space of possible codes. The chance of zero hash collisions in a set of m lattice points using a large hash code (64 bits) may be determined in accordance with Equation (9) below:

$$Pr[\text{zero collisions}] = \prod_{i=0}^{m-1} \left(1 - \frac{i}{2^{64}}\right) \quad (9)$$

$$= \frac{2^{64}!}{(2^{64} - m)!} 2^{-64m}$$

Assuming that the number of database vectors $m < 2^{64}$ then Equation (9) may be approximated using a 'Birthday Attack' analysis, to provide Equation (10), as follows:

$$Pr[\text{zero collisions}] \cong e^{-m^2/2^{65}} \quad (10)$$

For example, if the number of database vectors is approximately four (4) billion (from approximately four (4) million database images) then approximately $m=2^{32}$. Thus, for such an example, probability of zero collisions is approximately 0.6, and therefore, the probability of one or more collisions over the whole database is low (<50%) while there are less than four (4) billion distinct lattice points in use. Based on the above analysis, the number of bits required for <50% collision probability is approximately $2 \log_2 m$.

Any implementation of an index also includes other overheads. For example, a Java implementation includes class identifiers for every object and array that may result in an extra 16k bytes per image. Example overheads are shown in the above Table 2. For reference, the Table 2 above also shows a method which stores compressed vector data using binomial coefficients.

Industrial Applicability

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of retrieving feature vectors located within a predetermined search radius, the feature vectors being associated with lattice points of a multidimensional permutohedral lattice, the method comprising:
    receiving a query vector extracted from a query image and representing a feature vector to be matched by feature vectors associated with lattice points of the multidimensional permutohedral lattice, the feature vectors being stored in records in a database and representing features of images in the database, the lattice points corresponding to hash values of the feature vectors, wherein the hash values are stored in a memory;
    locating, from the memory, a first plurality of lattice points of the multidimensional permutohedral lattice that form an enclosing region around the query vector;
    determining a canonical mapping between at least one of the lattice points of the enclosing region and a canonical representation of the enclosing region;
    selecting, from the memory, a second plurality of lattice points using the canonical mapping, the second plurality of lattice points being located within the predetermined search radius of a lattice hole of the enclosing region and being distinct to the first plurality of lattice points, wherein the predetermined search radius defines the feature vectors associated with lattice points of the multidimensional permutohedral lattice that are considered a match to the query vector; and
    retrieving the feature vectors from the first and second plurality of lattice points as matching feature vectors.

2. The method according to claim 1, wherein the second plurality of lattice points are arranged in shells around the enclosing region.

3. The method according to claim 1, wherein the permutohedral lattice is A* lattice.

4. An apparatus for retrieving feature vectors located within a predetermined search radius, the feature vectors being associated with lattice points of a multidimensional permutohedral lattice, the apparatus comprising:
    means for receiving a query vector extracted from a query image and representing a feature vector to be matched by feature vectors associated with lattice points of the multidimensional permutohedral lattice, the feature vectors being stored in records in a database and representing features of images in the database, the lattice points corresponding to hash values of the feature vectors, wherein the hash values are stored in a memory;
    means for locating, from the memory, a first plurality of lattice points of the multidimensional permutohedral lattice that form an enclosing region around the query vector;

means for determining a canonical mapping between at least one of the lattice points of the enclosing region and a canonical representation of the enclosing region;

means for selecting, from the memory, a second plurality of lattice points using the canonical mapping, the second plurality of lattice points being located within the predetermined search radius of a lattice hole of the enclosing region and being distinct to the first plurality of lattice points, wherein the predetermined search radius defines the feature vectors associated with lattice points of the multidimensional permutohedral lattice that are considered a match to the query vector; and means for retrieving the feature vectors from the first and second plurality of lattice points as matching feature vectors.

5. A system for retrieving feature vectors located within a predetermined search radius, the feature vectors being associated with lattice points of a multidimensional permutohedral lattice, the system comprising:

a memory for storing data and a computer program;

a processor coupled to said memory for executing said computer program, said computer program comprising instructions for:

receiving a query vector extracted from a query image and representing a feature vector to be matched by feature vectors associated with lattice points of the multidimensional permutohedral lattice, the feature vectors being stored in records in a database and representing features of images in the database, the lattice points corresponding to hash values of the feature vectors, wherein the hash values are stored in the memory;

locating, from the memory, a first plurality of lattice points of the multidimensional permutohedral lattice that form an enclosing region around the query vector;

determining a canonical mapping between at least one of the lattice points of the enclosing region and a canonical representation of the enclosing region;

selecting, from the memory, a second plurality of lattice points using the canonical mapping, the second plurality of lattice points being located within the predetermined search radius of a lattice hole of the enclosing region and being distinct to the first plurality of lattice points, wherein the predetermined search radius defines the feature vectors associated with lattice points of the multidimensional permutohedral lattice that are considered a match to the query vector; and retrieving the feature vectors from the first and second plurality of lattice points as matching feature vectors.

6. A non-transitory computer readable medium having a computer program stored thereon for retrieving feature vectors located within a predetermined search radius, the feature vectors being associated with lattice points of a multidimensional permutohedral lattice, the program comprising:

code for receiving a query vector extracted from a query image and representing a feature vector to be matched by feature vectors associated with lattice points of the multidimensional permutohedral lattice, the feature vectors being stored in records in a database and representing features of images in the database, the lattice points corresponding to hash values of the feature vectors, wherein the hash values are stored in a memory;

code for locating, from the memory, a first plurality of lattice points of the multidimensional permutohedral lattice that form an enclosing region around the query vector;

code for determining a canonical mapping between at least one of the lattice points of the enclosing region and a canonical representation of the enclosing region;

code for selecting, from the memory, a second plurality of lattice points using the canonical mapping, the second plurality of lattice points being located within the predetermined search radius of a lattice hole of the enclosing region and being distinct to the first plurality of lattice points, wherein the predetermined search radius defines the feature vectors associated with lattice points of the multidimensional permutohedral lattice that are considered a match to the query vector; and code for retrieving the feature vectors from the first and second plurality of lattice points as matching feature vectors.

* * * * *